US010051799B1

(12) United States Patent
    Van Wingerden

(10) Patent No.: US 10,051,799 B1
(45) Date of Patent: Aug. 21, 2018

(54) GUTTER FOR A HYDROPONIC GROWING SYSTEM

(71) Applicant: Johannes Cornelious Van Wingerden, Stevensburg, VA (US)

(72) Inventor: Johannes Cornelious Van Wingerden, Stevensburg, VA (US)

(*) Notice: Subject to any disclaimer, the term of this patent is extended or adjusted under 35 U.S.C. 154(b) by 0 days.

(21) Appl. No.: 15/660,808

(22) Filed: Jul. 26, 2017

(51) Int. Cl.
    *A01G 31/02* (2006.01)
    *A01G 31/00* (2018.01)
    *A01G 24/00* (2018.01)

(52) U.S. Cl.
    CPC ............. *A01G 31/02* (2013.01); *A01G 24/00* (2018.02); *A01G 31/001* (2013.01)

(58) Field of Classification Search
    CPC ..... E04D 13/064; E04D 13/076; E04D 13/04; E04D 13/0404; E04D 13/0445; E04D 13/048; E04D 13/0725; E04D 13/0727; A01G 31/02; A01G 31/06; A01G 31/00; A01G 9/047; A01G 9/1476; A01G 24/00; B01D 2221/12; C02F 3/327
    See application file for complete search history.

(56) References Cited

U.S. PATENT DOCUMENTS

| D24,929 S | 11/1895 | Nichols |
| D32,585 S | 4/1900 | Pessano |
| 1,601,259 A | 9/1926 | Pettigrew |
| 1,690,910 A | 11/1928 | Shapiro |
| 1,778,150 A | 10/1930 | Store |
| D82,957 S | 12/1930 | Rachlin |
| D102,968 S | 1/1937 | Farber |
| 2,090,325 A | 8/1937 | Deubel |
| 2,164,060 A | 6/1939 | Gerner |
| 2,205,303 A | 6/1940 | Munsell |
| 2,231,749 A | 2/1941 | Damerell |
| RE21,820 E | 6/1941 | Munsell |
| 2,276,376 A | 3/1942 | Deubel |
| 2,312,582 A | 3/1943 | Patrick |
| 2,548,910 A | 4/1951 | Rylander |

(Continued)

FOREIGN PATENT DOCUMENTS

DE 4020116101516-0001    4/2017
EP           1407987 A1   4/2004

(Continued)

OTHER PUBLICATIONS

English-language translation of WO 2014/199917 A1 (Year: 2014).

(Continued)

*Primary Examiner* — Kathleen I Alker
(74) *Attorney, Agent, or Firm* — Ali Sharifzadeh

(57) ABSTRACT

The hydroponic growing system may include a gutter assembly configured to manage flow of a liquid solution to one or more components of the hydroponic growing system. Further, the hydroponic growing system may include at least one growing trough movably engaged to the gutter assembly and configured to hold one or more plants. Moreover, the hydroponic growing system may include an automation assembly movably engaged with the at least one growing trough and configured to move the at least one trough from a first position on the gutter assembly to a second position on the gutter assembly via one or more engagement devices.

20 Claims, 34 Drawing Sheets

(56) References Cited

U.S. PATENT DOCUMENTS

| | | | |
|---|---|---|---|
| 2,639,549 A * | 5/1953 | Wubben | A01G 31/02 137/563 |
| 2,747,331 A * | 5/1956 | Steiner | A01G 31/02 47/62 C |
| 2,770,957 A | 11/1956 | Bronson | |
| 2,791,273 A | 5/1957 | Brownell | |
| D187,184 S | 2/1960 | Tangney | |
| 3,199,250 A | 8/1965 | Sawyer | |
| 3,288,340 A | 11/1966 | Shapiro et al. | |
| 3,300,895 A | 1/1967 | Dosedla et al. | |
| D217,247 S | 4/1970 | Brown | |
| 3,581,880 A | 6/1971 | Iversen | |
| 3,650,521 A | 3/1972 | Meli | |
| 3,717,953 A | 2/1973 | Kuhn et al. | |
| 3,766,684 A | 10/1973 | Kato | |
| 3,826,349 A | 7/1974 | Stevenson | |
| 3,850,287 A | 11/1974 | Petro | |
| 3,879,889 A | 4/1975 | Schmid | |
| 3,911,632 A * | 10/1975 | Bryfogle | A01G 9/1476 52/13 |
| 3,913,758 A | 10/1975 | Faircloth et al. | |
| 3,965,616 A | 6/1976 | Ridgeway | |
| 3,975,860 A | 8/1976 | Harned et al. | |
| 3,973,353 A | 10/1976 | Dedolph | |
| 4,006,557 A | 2/1977 | Sawyer | |
| 4,028,847 A | 6/1977 | Davis et al. | |
| 4,035,950 A * | 7/1977 | Anselm | A01G 31/06 47/39 |
| 4,044,886 A | 8/1977 | Sender | |
| 4,048,754 A | 9/1977 | Laux | |
| 4,057,931 A | 11/1977 | Stutelberg et al. | |
| 4,118,891 A * | 10/1978 | Kehl | A01G 31/02 47/59 R |
| 4,145,841 A | 3/1979 | Woolpert | |
| 4,160,342 A | 7/1979 | Dryer | |
| 4,179,846 A | 12/1979 | Carlisle | |
| 4,198,784 A | 4/1980 | Sukert | |
| 4,216,618 A * | 8/1980 | Haub | A01G 31/045 47/39 |
| 4,236,353 A | 12/1980 | Sorenson | |
| 4,279,101 A | 7/1981 | Leroux | |
| 4,312,152 A | 1/1982 | Drury et al. | |
| 4,315,382 A | 2/1982 | Kay et al. | |
| D263,291 S | 3/1982 | Paton | |
| 4,324,069 A | 4/1982 | Flagg | |
| 4,407,092 A | 10/1983 | Ware | |
| 4,476,651 A * | 10/1984 | Drury | A01G 31/042 47/65 |
| 4,557,070 A | 12/1985 | Oyama | |
| 4,578,898 A * | 4/1986 | Greenbaum | A01G 25/00 47/48.5 |
| 4,604,837 A * | 8/1986 | Beam | E04D 13/076 52/12 |
| 4,715,144 A | 12/1987 | Lee | |
| 4,837,973 A | 6/1989 | Snekkenes | |
| D311,589 S | 10/1990 | Benchimol | |
| 4,978,023 A | 12/1990 | Behlmann et al. | |
| 4,989,365 A | 2/1991 | Roger | |
| 5,010,686 A | 4/1991 | Rivest | |
| 5,048,434 A | 9/1991 | Forster et al. | |
| 5,117,581 A | 6/1992 | Green et al. | |
| 5,125,184 A | 6/1992 | Anderson | |
| 5,131,185 A | 7/1992 | Van Wingerden | |
| 5,168,664 A | 12/1992 | Deutschmann, Sr. | |
| 5,201,141 A * | 4/1993 | Ahm | A01G 31/02 47/59 R |
| 5,225,342 A | 7/1993 | Farrell | |
| 5,282,335 A | 2/1994 | Holtkamp, Jr. | |
| 5,323,567 A | 6/1994 | Nakayama et al. | |
| D351,668 S | 10/1994 | Lim et al. | |
| 5,385,589 A | 1/1995 | Kratky | |
| 5,459,960 A | 10/1995 | Manlove | |
| 5,491,998 A * | 2/1996 | Hansen | B21D 5/08 52/12 |
| 5,533,299 A | 7/1996 | Kratky | |
| D376,307 S | 12/1996 | Burgasser et al. | |
| 5,586,656 A | 12/1996 | Abrums | |
| D385,507 S | 10/1997 | Hulsebus | |
| 5,761,848 A | 6/1998 | Manlove | |
| D395,822 S | 7/1998 | Keal et al. | |
| 5,806,241 A | 9/1998 | Byland et al. | |
| 5,826,375 A | 10/1998 | Black | |
| 5,911,659 A | 6/1999 | Serano | |
| 5,930,951 A | 8/1999 | Wong | |
| D414,413 S | 9/1999 | Brown | |
| 6,070,360 A | 6/2000 | Liao et al. | |
| 6,138,411 A | 10/2000 | Lin | |
| 6,161,332 A | 12/2000 | Avot | |
| 6,233,870 B1 | 5/2001 | Horibata | |
| D446,157 S | 8/2001 | Glenn | |
| D448,862 S | 10/2001 | Kieffer | |
| 6,298,600 B1 | 10/2001 | Feldman | |
| 6,336,292 B1 | 1/2002 | Boxsell | |
| D454,180 S | 3/2002 | Wessels | |
| D468,812 S | 1/2003 | Doyle et al. | |
| 6,526,693 B2 | 3/2003 | Cochran | |
| 6,574,917 B2 | 6/2003 | Boxsell | |
| D483,443 S | 12/2003 | Forsberg | |
| D489,209 S | 5/2004 | Goldberg | |
| 6,814,250 B1 | 11/2004 | Madsen | |
| D507,204 S | 7/2005 | Chang | |
| 6,928,772 B2 * | 8/2005 | Bai | A01G 9/126 47/46 |
| 6,948,349 B2 * | 9/2005 | Gorski | B21D 5/08 72/181 |
| 6,964,128 B2 | 11/2005 | Yasuda | |
| D512,877 S | 12/2005 | Vovan | |
| 7,000,351 B2 | 2/2006 | Baumann | |
| 7,076,921 B2 * | 7/2006 | Spradlin | E04D 13/0641 248/48.1 |
| 7,171,781 B1 | 2/2007 | Southern | |
| 7,171,783 B1 | 2/2007 | Fidotti | |
| D541,148 S | 4/2007 | Gross et al. | |
| 7,210,266 B2 | 5/2007 | Henry et al. | |
| 7,263,781 B2 | 9/2007 | Sielemann | |
| D552,218 S | 10/2007 | Alldredge | |
| 7,340,863 B1 * | 3/2008 | Dressler | E04D 13/076 248/48.1 |
| 7,412,798 B2 | 8/2008 | Boxsell | |
| 7,506,472 B2 | 3/2009 | Leyns et al. | |
| 7,533,493 B2 | 5/2009 | Brusatore | |
| 7,587,930 B2 | 9/2009 | Leclerc et al. | |
| 7,610,717 B2 | 11/2009 | Luken et al. | |
| 7,624,535 B2 | 12/2009 | Schmidt | |
| D612,732 S | 3/2010 | Takata et al. | |
| 7,690,150 B2 | 4/2010 | Orschulik | |
| D614,994 S | 5/2010 | Dipaolo et al. | |
| 7,730,672 B2 * | 6/2010 | Knudson | E04D 13/076 248/48.1 |
| 7,832,144 B2 * | 11/2010 | Corradi | A01G 31/02 47/59 S |
| D628,443 S | 12/2010 | McTaggart | |
| 7,874,102 B2 | 1/2011 | Hilbert | |
| D631,683 S | 2/2011 | Ash et al. | |
| 7,972,840 B2 | 7/2011 | Hasegawa et al. | |
| D666,524 S | 9/2012 | Aoyama | |
| D673,054 S | 12/2012 | Kim et al. | |
| D674,889 S | 1/2013 | Mims | |
| D677,156 S | 3/2013 | Wu | |
| D684,857 S | 6/2013 | Zhen | |
| 8,474,179 B2 | 7/2013 | Jung | |
| D688,891 S | 9/2013 | Caruso | |
| 8,549,788 B2 | 10/2013 | Bryan, III | |
| D694,586 S | 12/2013 | Miller et al. | |
| D697,801 S | 1/2014 | Rapparini | |
| D708,506 S | 7/2014 | Wu | |
| D718,847 S | 12/2014 | Haley et al. | |
| D718,876 S | 12/2014 | Smedberg | |
| D719,084 S | 12/2014 | Kruse | |
| 8,984,807 B2 | 3/2015 | Hansen et al. | |
| D726,888 S | 4/2015 | Johansen | |
| 9,038,312 B2 | 5/2015 | Harbaugh | |
| D736,900 S | 8/2015 | Frelier | |

(56) References Cited

U.S. PATENT DOCUMENTS

| | | | |
|---|---|---|---|
| 9,220,207 | B2 | 12/2015 | Storey |
| 9,266,517 | B2 | 2/2016 | Knechtges et al. |
| 9,341,266 | B1 | 5/2016 | Vivatson |
| 9,510,524 | B2 | 12/2016 | Anderson et al. |
| 9,534,391 | B2 * | 1/2017 | Haley ................. E04D 13/0641 |
| 9,534,842 | B1 | 1/2017 | Rivera et al. |
| D789,499 | S | 6/2017 | Slorach |
| 9,795,089 | B2 | 10/2017 | Kantola et al. |
| 2005/0086861 | A1 | 4/2005 | Atchley |
| 2005/0274073 | A1 | 12/2005 | Brooke et al. |
| 2006/0150497 | A1 | 7/2006 | Kaprielian |
| 2006/0288640 | A1 | 12/2006 | Leithold |
| 2008/0230010 | A1 | 9/2008 | Buck |
| 2008/0302010 | A1 | 12/2008 | Cordon |
| 2009/0056215 | A1 | 3/2009 | Yang |
| 2009/0151269 | A1 | 6/2009 | Eiger et al. |
| 2009/0166369 | A1 | 7/2009 | Savicki |
| 2009/0241417 | A1 | 10/2009 | Smith |
| 2009/0278641 | A1 | 11/2009 | Hedayat |
| 2010/0147848 | A1 | 6/2010 | Rider, Jr. et al. |
| 2010/0170154 | A1 | 6/2010 | Ahn |
| 2011/0114800 | A1 | 5/2011 | Gramling |
| 2011/0138698 | A1 * | 6/2011 | Neumann ............. E04D 13/076 52/12 |
| 2012/0180818 | A1 | 7/2012 | Janesky |
| 2012/0324787 | A1 | 12/2012 | Daas et al. |
| 2013/0056475 | A1 | 3/2013 | Buck |
| 2013/0133252 | A1 | 5/2013 | Harbaugh |
| 2014/0041297 | A1 | 2/2014 | Miel et al. |
| 2014/0215919 | A1 | 8/2014 | Harbaugh |
| 2014/0223818 | A1 | 8/2014 | Coghlan |
| 2015/0040474 | A1 | 2/2015 | Lee et al. |
| 2015/0068121 | A1 | 3/2015 | Probst et al. |
| 2015/0082692 | A1 | 3/2015 | Wardenburg et al. |
| 2015/0184393 | A1 | 7/2015 | Conner |
| 2015/0216131 | A1 | 8/2015 | Van Wingerden |
| 2015/0237807 | A1 | 8/2015 | Valiquette |
| 2015/0305261 | A1 * | 10/2015 | Wilson .................. A01G 7/045 47/62 A |
| 2015/0342127 | A1 | 12/2015 | Gallant |
| 2016/0136831 | A1 | 3/2016 | Bonnet et al. |
| 2016/0100535 | A1 | 4/2016 | Daugirdas |
| 2016/0183486 | A1 | 6/2016 | Kabakov |
| 2016/0192607 | A1 | 7/2016 | Kitagawa |
| 2016/0223418 | A1 | 8/2016 | Wüest et al. |
| 2016/0376790 | A1 | 12/2016 | Yildiz |
| 2017/0086399 | A1 * | 3/2017 | Anderson .............. A01G 29/00 |
| 2017/0119971 | A1 | 5/2017 | Marsh et al. |
| 2017/0231167 | A1 | 8/2017 | Storey |
| 2017/0254088 | A1 * | 9/2017 | Axford ................ E04D 13/076 |

FOREIGN PATENT DOCUMENTS

| | | |
|---|---|---|
| EP | 001257786-0001 | 2/2011 |
| GB | 2077082 A | 12/1981 |
| JP | H03 127919 A | 5/1991 |
| WO | WO-2014/199917 A1 | 12/2014 |

OTHER PUBLICATIONS

Large and Small Mask Clicker Dies from ScrapWorksArmory on Etsy Studio, website 2017, https://www.etsystudio.com/listing/231288759/large-and-small-mask-clicker-dies, [visited Sep. 11, 2017].

Old-Fashioned Cast Iron Shelf Bracket—Signature Hardware, http://www.signaturehardware.com/old-fashioned-cast-iron-shelf-bracket.html#pr-header-back-to-top-link, [visited Sep. 11, 2017].

Steel Rule Dies & Clicker Dies, website 2006, http://swansondie.com/clicker.htm, [visited Sep. 11, 2017].

Autopot Irrigation Watering System Parts/Spare Accessories Connectors Hydro IWS | eBay, http://www.ebay.com/itm/Autopot-Irrigation-Watering-System-Parts-Accessories-Connectors-Hydroponic-/121502209218, [visited Sep. 15, 2017].

"International Search Report and Written Opinion Issued in PCT Application No. PCT/US2017/044031", dated Apr. 20, 2018, 14 Pages.

* cited by examiner

2400

2402

Receive, from at least one growing trough detection component, an indication representing a removal of at least one growing trough from a support portion of a gutter of the hydroponic growing system

2404

Trigger, by an automation component, an actuator component to move at least one elongated member of the hydroponic growing system between a first member position and a second member position, the at least one elongated member supporting one or more engagement devices configured to engage with the at least one growing trough

2406

Move, by an actuator component, the at least one elongated member between the first member position and the second member position

FIG. 24

GUTTER FOR A HYDROPONIC GROWING SYSTEM

BACKGROUND

The present disclosure generally relates to a hydroponic growing system, and more particularly, to automating growing of plants in a hydroponic growing system.

As the Earth's climate continues to change, traditional farming may be at risk from uncertain weather patterns that may result in unpredictable crop yields. However, plants may be grown indoors when outdoor environments do not allow for, or are non-ideal for plant growth. For example, outdoor conditions such as below-freezing temperatures and/or drought may not allow for adequate plant growth. Specifically, plant growth may be facilitated by providing nutrients, water, and light to plants. Nonetheless, the ideal growing conditions for plants may vary from species to species. Also, some plants may be temperamental and may have different growing constraints at different times depending on various environmental factors. For instance, some plants may be damaged by inadequate amounts of nutrients, moisture, and/or light.

Further, growing space may be limited for plants grown indoors. As such, providing similar yields for such plants as compared to plants grown outdoors may prove difficult. Further, it may often be difficult to provide appropriate amounts of nutrients, moisture, and light when plants are removed from their natural environments and grown indoors. Additionally, many indoor plants may not be left unattended for long periods of time without causing significant damage to the plant.

As demand for plants and/or plant products continues to increase, however, further improvements in hydroponic growing systems may be desired.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. The purpose is to present some concepts of one or more implementations in a simplified form as a prelude to the more detailed description that is presented later.

In one example, a hydroponic growing system is described. The hydroponic growing system may include a base configured to support one or more components. The hydroponic growing system may further include a gutter assembly removably attached the base, the gutter assembly configured to manage flow of a liquid solution to the one or more components of the hydroponic growing system. The hydroponic growing system may include at least one growing trough movably engaged to the gutter assembly and configured to hold one or more plants, the at least one growing trough movable along a direction perpendicular to a flow direction of the liquid solution in the at least one growing trough. Moreover, the hydroponic growing system may include an automation assembly movably engaged with the at least one growing trough, the automation assembly configured to move the at least one trough from a first position on the gutter assembly to a second position on the gutter assembly.

In another example, an automation assembly may include an actuator component configured to move at least one elongated member supporting one or more engagement devices between a first member position and a second member position. The automation assembly may further include an automation component removably attached to the actuator component, the automation component configured to trigger the actuator component to move the at least one elongated member between the first member position and the second member position.

In a further example, an automation assembly for facilitating movement of at least one growing trough within a hydroponic growing system is described. The automation assembly may include at least one sensing component configured to detect a removal of at least one growing trough from a support portion of a gutter of the hydroponic growing system. The automation assembly may further include an actuator component configured to move at least one elongated member supporting one or more engagement devices between a first member position and a second member position. Additionally, the automation assembly may further include an automation component removably attached to the actuator component, the automation component configured to cause the actuator component to move the at least one elongated member between the first member position and the second member position in response to detecting the removal of the at least one growing trough from the support portion of the gutter.

In another example, a method of moving at least one trough in a hydroponic growing system may include triggering, by an automation component, an actuator component to move at least one elongated member of the hydroponic growing system between a first member position and a second member position, the at least one elongated member supporting one or more engagement devices configured to engage with the at least one growing trough. The method may further include moving, by an actuator component, the at least one elongated member between the first member position and the second member position.

In yet another example, a gutter may include a base including an interior portion configured to retain a liquid solution. The gutter may further include a support portion attached to the base and configured to provide support for at least one growing trough. Moreover, the gutter may include a cover attached to the base and configured to minimize light exposure into the interior portion and at an end portion of the at least one growing trough.

In another example, a gutter assembly may include a first gutter and a second gutter. The first gutter may be disposed at a first end of a growing system and includes a first base including an interior portion and configured to retain a liquid solution, a first support portion attached to the base and configured to provide support for a first end of at least one growing trough, and a first cover attached to the base and configured to minimize light exposure into the interior portion and at the first end portion of the at least one growing trough. The second gutter may be disposed at a second end opposite the first end of the growing system and includes a second base including an interior portion and configured to retain a liquid solution, a second support portion attached to the base and configured to provide support for a second end of at least one growing trough, and a second cover attached to the base and configured to minimize light exposure into the interior portion and at the second end portion of the at least one growing trough.

In a further example, a method of managing flow of a liquid solution in a growing system may include injecting the liquid solution into a first end of at least one trough supported by a first support portion attached to a base of a first gutter, the liquid solution injected by at least one tubing member removably attached to a cover of the first gutter. The method may further includes receiving the liquid solution at a base of a second gutter from a second end of the at least one trough supported by a second support portion attached to the base of the second gutter.

In yet another example, an engagement device is described. The engagement device may include a base configured to rotate about an axis. The engagement device may include a first portion of the base including a pivot member configured to engage with a securing component to rotate the base about the axis. The engagement device may further include a second portion of the base weighted greater than the first portion of the base. Moreover, the engagement device may include a capture member extending from the base, the capture member configured to engage with at least one trough during at least one of two movement events.

In another example, an apparatus may include an elongated member and at least one engagement device moveably attached to the elongated member. Each engagement device may include a base configured to rotate about an axis; a first portion of the base including a pivot member configured to engage with a securing component to rotate the based about the axis, a second portion of the base weighted greater than the first portion of the base, and a capture member extending from the base, the capture member configured to engage with at least one trough during at least one of two movement events.

In an additional example, an engagement device may include a base configured to rotate about an axis. The engagement device may include a pivot member configured to engage with a securing component to rotate the base about the axis. The engagement device may further include a first portion of the base having a mass greater than a second portion distinct from the first portion. Additionally, the engagement device may include a capture member extending from the base, the capture member configured to engage with at least one trough during at least one of two movement events.

In another example, a growing trough is described. The growing trough may include a base configured to provide support. The growing trough may further include a cover portion connected to the base and including one or more openings configured to hold at least a plant, the cover portion and the base forming an interior portion configured to support a flow of liquid solution. The growing trough may include a first end portion of the base providing access to the interior portion. Moreover, the growing trough may include a second end portion of the base opposite the first end portion and providing access to the interior portion.

In a further example, a growing trough may include a base configured to provide support, and a top portion connected to the base and including one or more openings each configured to receive at least one soil pod, the top portion and the base forming a hollow interior portion supporting a flow of water solution and including at least a portion of the at least one soil pod. The growing trough may further include a first end portion of the base providing access to the hollow interior portion, and a second end portion of the base opposite the first end portion and providing access to the hollow interior portion.

In another example, a growing trough may include a base configured to provide support, and a cover portion connected to the base and including at least one opening configured to receive and hold at least one plant, the cover portion and the base forming an interior portion permitting flow of a liquid solution and including at least a portion of the at least one plant within the interior portion. The growing trough may further include a first end portion of the base providing access to the interior portion, and a second end portion of the base opposite the first end portion and providing access to the interior portion.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The specific features, implementations, and advantages of the disclosure will become better understood with regard to the following description, appended claims, and accompanying drawings where:

FIG. 1-2 is an enlarged perspective view of one or more growing troughs at a backend of the hydroponic growing system in an initial position;

FIG. 1-3 is an enlarged perspective view of the one or more growing troughs at a frontend of the hydronic growing system in a harvest position;

FIG. 2-1 is a perspective view of a hydronic growing system employing at least two growing lines, where each growing line may include one or more components configured to enable plant growth, for example, by employing the techniques described herein;

FIG. 2-2 is an enlarged perspective view of an adjoining front area of the hydroponic growing system including one or more growing troughs;

FIG. 3 is a side view of a frontend of the hydroponic growing system illustrating the one or more growing troughs engaging with one or more engagement devices;

FIG. 11-1 is a perspective view of a portion of the gutter assembly including at least a cover;

FIG. 11-2 is a front or back side view of a portion of the gutter assembly for use within the hydroponic growing system;

FIG. 13-1 is a schematic diagram of a gutter assembly including a first gutter and at least one growing trough within a hydroponic growing system;

FIG. 13-2 is a schematic diagram of the gutter assembly including a second gutter and at least one growing trough within the hydroponic growing system;

FIG. 15-1 is a perspective view of a growing trough used in the hydroponic growing system;

FIG. 15-2 is a top down view of the growing trough used in the hydroponic growing system;

FIG. 15-3 is a front or back view of the growing trough used in the hydroponic growing system;

FIG. 16-1 is a perspective view of an engagement device configured to move a growing trough within the hydroponic growing system;

FIG. 16-2 is a side view of the engagement device configured to move the growing trough within the hydroponic growing system;

FIG. 24 is a flow diagram of an example of managing flow of a liquid solution in a growing system;

DETAILED DESCRIPTION

Figure 1:
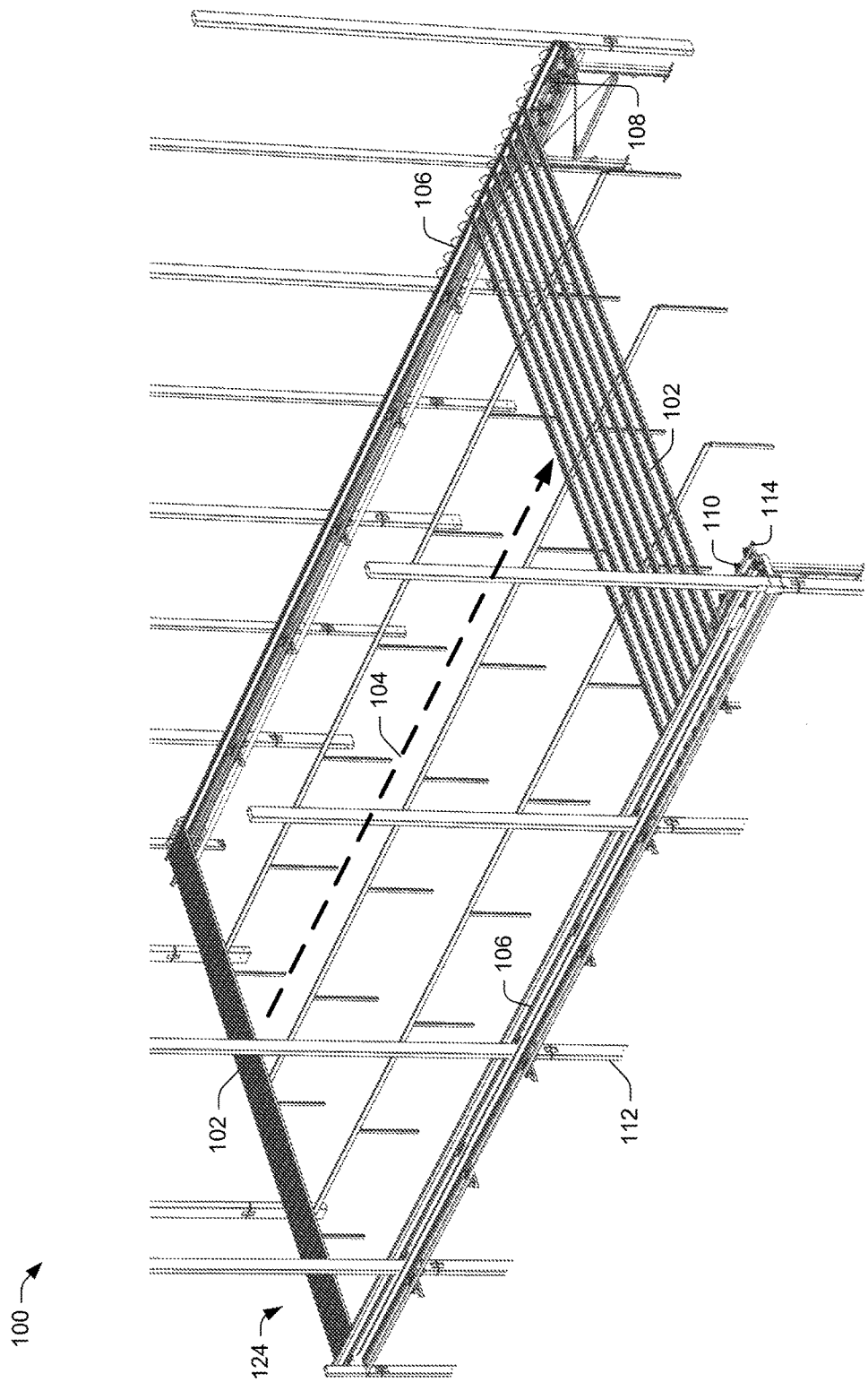
FIG. 1-1 is a perspective view of a hydroponic growing system including one or more components configured to enable plant growth, for example, by employing the techniques described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In some implementations, examples may be depicted with reference to one or more components and one or more methods that may perform the actions or operations described herein, where components and/or actions/operations in dashed line may be optional.

The present disclosure relates to a hydroponic growing system. Hydroponics may involve growing plants in or using a liquid or water based nutrient rich solution. Hydroponics allows for the growing of plants or crops in a controlled or semi-controlled environment so as to avoid or mitigate potential harsh weather patterns. For example, hydroponics may deliver adequate amounts of nutrients, water, and/or light to plants even in areas lacking any of such ingredients useful for plant growth. However, growing plants within a small area or as efficiently as traditional outdoor farming may present yield disparities. That is, the growing area available indoors or for a hydroponic growing system employed outdoors may generally be smaller relative to outdoor farming, thereby resulting in potentially lower plant or crop yields. Thus, a hydroponic growing system that allows for efficient growth of large amounts of plants or crops in an automated manner may be desirable.

As such, the present implementations provide a hydroponic growing system that may support plant growth in an automated manner. Specifically, the hydroponic growing system may provide a constant flow of nutrient solution to the roots of each plant arranged along one or more growing troughs (e.g., also known as a growing channel) via a continuous circulation pump. In particular, the nutrient solution is pumped, in an automated manner, into the one or more growing troughs on one end and flows over the roots of the plants, eventually draining back into a reservoir on the opposite end. The nutrient solution flows freely from one end to another end due to a varying slope of the growing channel. As the nutrient solution passes each plant, the corresponding roots may absorb at least some nutrients from the liquid solution, which may include, but are not limited to, nitrogen, potassium, and/or phosphate. Further, to provide efficient plant growth and harvesting, the hydroponic growing system may automatically move the one or more growing troughs in a direction along an axis as the plants grow.

The hydroponic growing system provides a constant flow of water in each growing channel in a circulatory manner so as to reduce contamination risk. Further, as the plant roots are exposed to water, oxygen, and nutrients, the hydroponic growing system may promote healthy plant growth using lower water and nutrient consumption. Further, the hydroponic growing system may provide higher yields of plants over an extended period of growing consistent with or outpacing outdoor grown plants. In some implementations, the hydroponic growing system may or may not use soil as part of the growing process.

In the following discussion, an example environment is first described that may employ the techniques described herein. Implementations discussed herein are not limited to the example environment, and the example environment is not limited to implementations discussed herein. Next, example device orientations are discussed in accordance with one or more implementations. Following this, example hydroponics growing systems are discussed in accordance with one or more implementations. Finally, an example system and device are discussed that may implement various techniques described herein.

FIG. 1-1 is a perspective view of a hydroponic growing system 100 including one or more components configured to enable or support plant growth. The hydroponic growing system 100 may include one or more components for growing of plants in an automated or semi-automated manner. For example, the hydroponic growing system 100 may include a single growing line 124 where one or more growing troughs 102 move or progress in a harvest direction 104, as further described herein at least with respect to FIGS. 1-2, 1-3, 2-1, 2-2, and 3.

The hydroponic growing system 100 may include a gutter assembly 106, which may be configured to control and/or manage flow of a liquid solution (e.g., water based nutrient mix) to the one or more components within the hydroponic growing system 100, notably to and from the one or more growing troughs 102. Further implementations of the gutter assembly 106 are described herein at least with respect to FIGS. 10 to 14.

In addition, the hydroponic growing system 100 may include the one or more growing troughs 102, which may be configured to receive, hold, and/or support one or more plants and traverse along the growing line in the harvest direction 104. Further implementations of the one or more growing troughs 102 are described herein at least with respect to FIGS. 15-1 to 15-3 and 17 to 23.

The hydroponic growing system 100 may include at least one engagement device 110, which may be configured to engage with and/or move the one or more growing troughs 102 in the harvest direction 104. Further implementations of the at least one engagement device 110 are described herein at least with respect to FIGS. 16-1 to 23.

The hydroponic growing system 100 may further include an automation assembly 108, which may be configured to automatically move the one or more growing troughs 102 from a first position on the gutter assembly 106 to a second position on the gutter assembly 106, and which is further described herein at least with respect to FIGS. 4 to 9.

Moreover, hydroponic growing system 100 may include at least one elongated member 114, which may be removably attached to the automation assembly 108 and configured to support the at least one engagement device 110 and/or the one or more growing troughs 102. Further implementations of the at least one elongated member 114 are described herein at least with respect to FIGS. 3 to 9.

The hydroponic growing system 100 may include a base 112, which may be configured to structurally support the one or more components of the hydroponic growing system 100. Further implementations of the base 112 are described herein at least with respect to FIGS. 2-1, 2-2, 3, 10, 13-1, and 13-2.

Figures 1, 2:
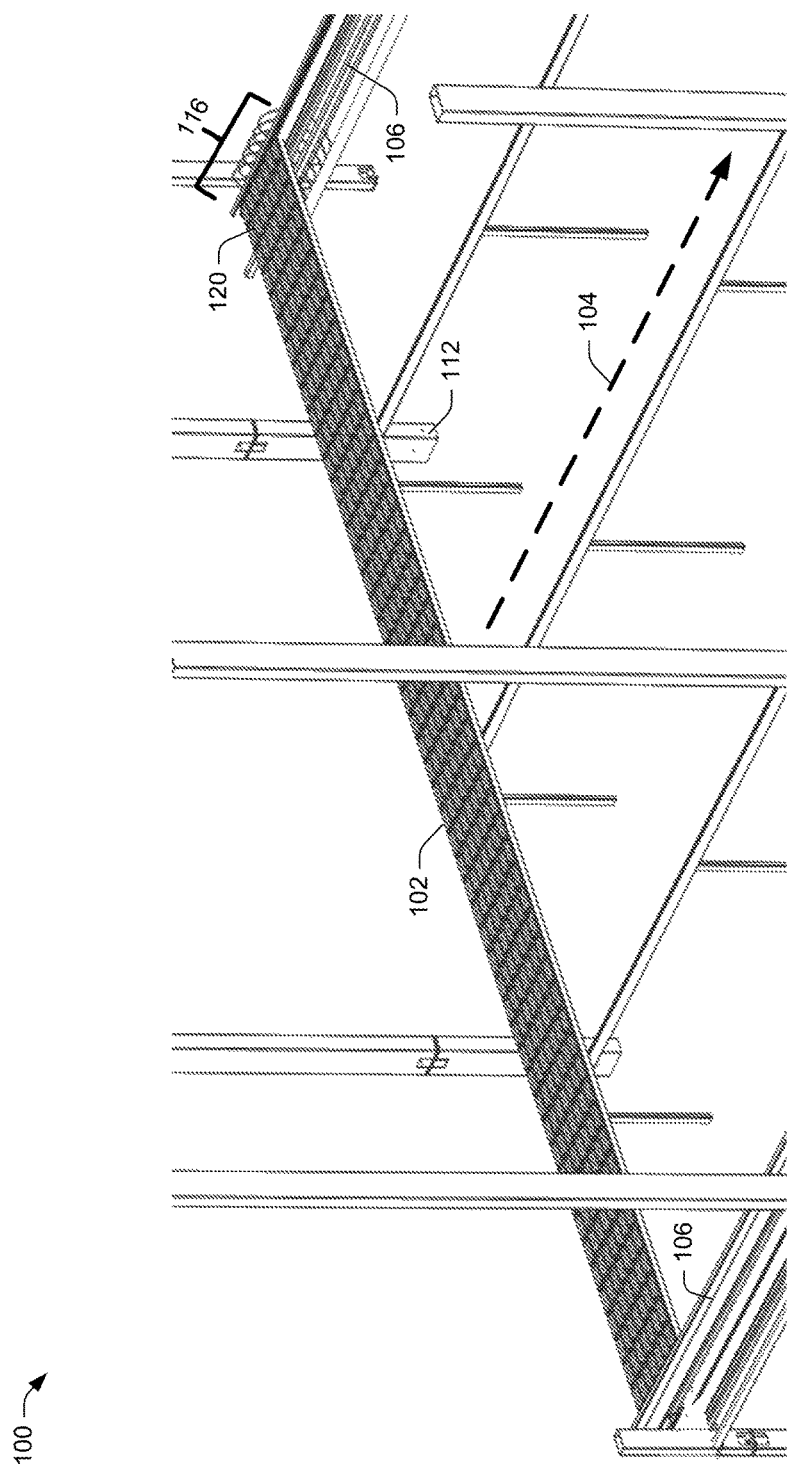

FIG. 1-2 depicts an enlarged perspective view of the one or more growing troughs 102 in an initial position 116. For example, the one or more growing troughs 102 may initially be placed at a backend of the hydroponic growing system 100. In operation, the one or more growing troughs 102, which may include at least one young plant, may be initially placed at a backend of the hydroponic growing system 100. The one or more growing troughs 102 may be moved, by one or more components of the hydroponic growing system 100 such as, but not limited to, the automation assembly 108 and/or the at least one engagement device 110, in the harvest direction 104 (e.g., as the plants mature). In some implementations, the spacing between the one or more growing troughs 102 may be of a first length 120, for example, as the young plants do not exceed the width of a growing trough on which they are contained. That is, the spacing or distance between at least one of the one or more growing troughs 102 may be of a first length.

Figures 1, 2, 3:
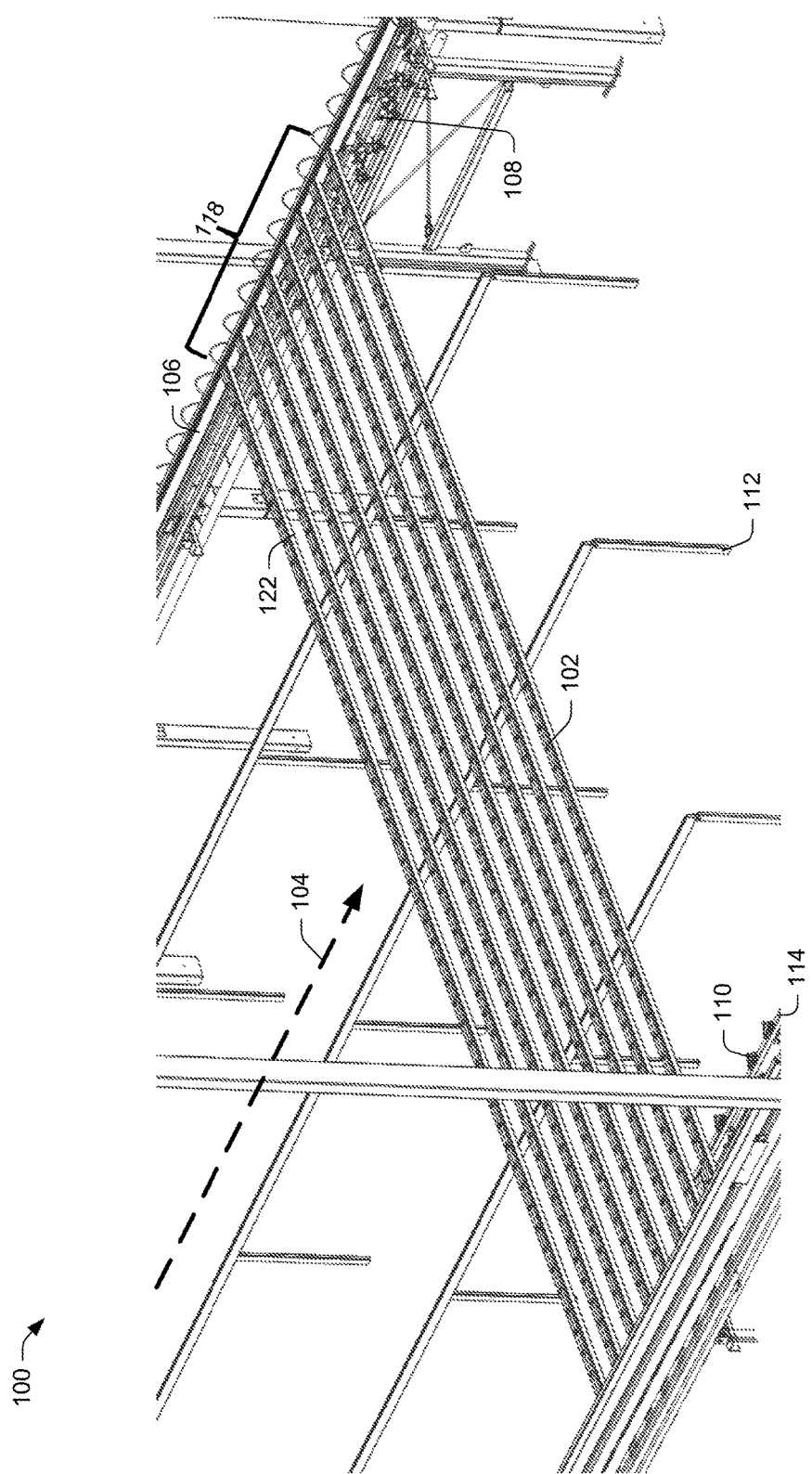
Figures 1, 2:
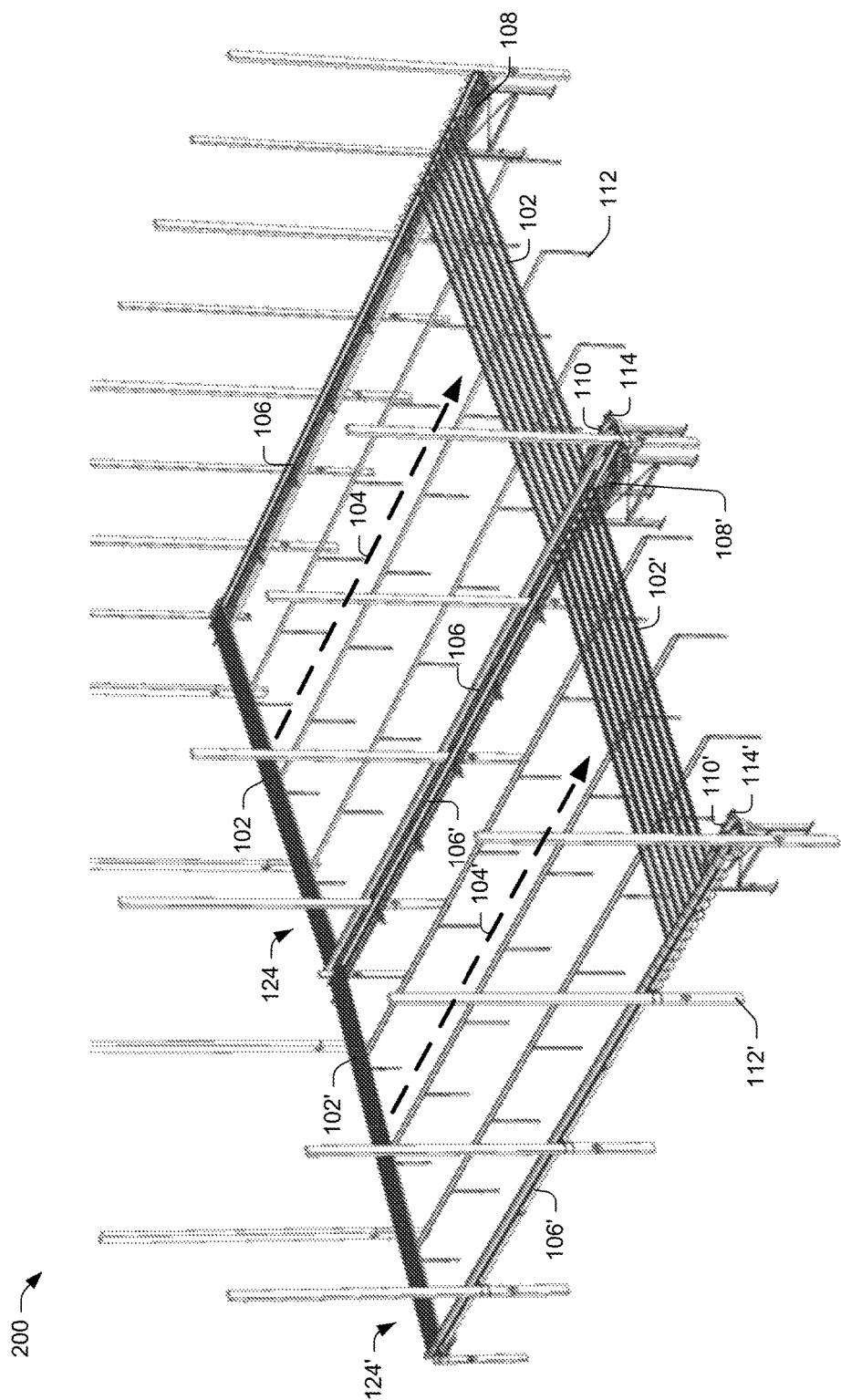
Figure 2:
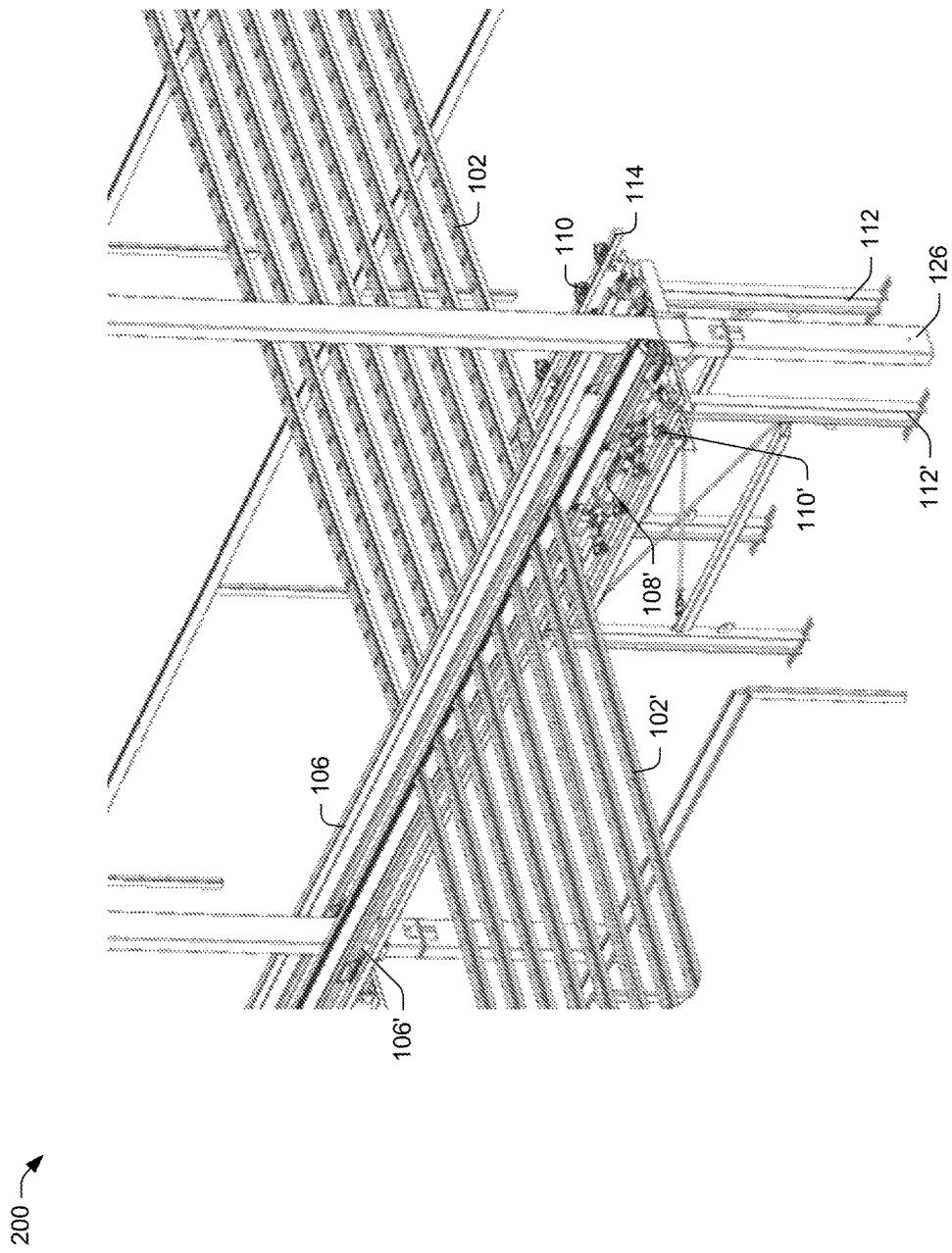
Figure 3:
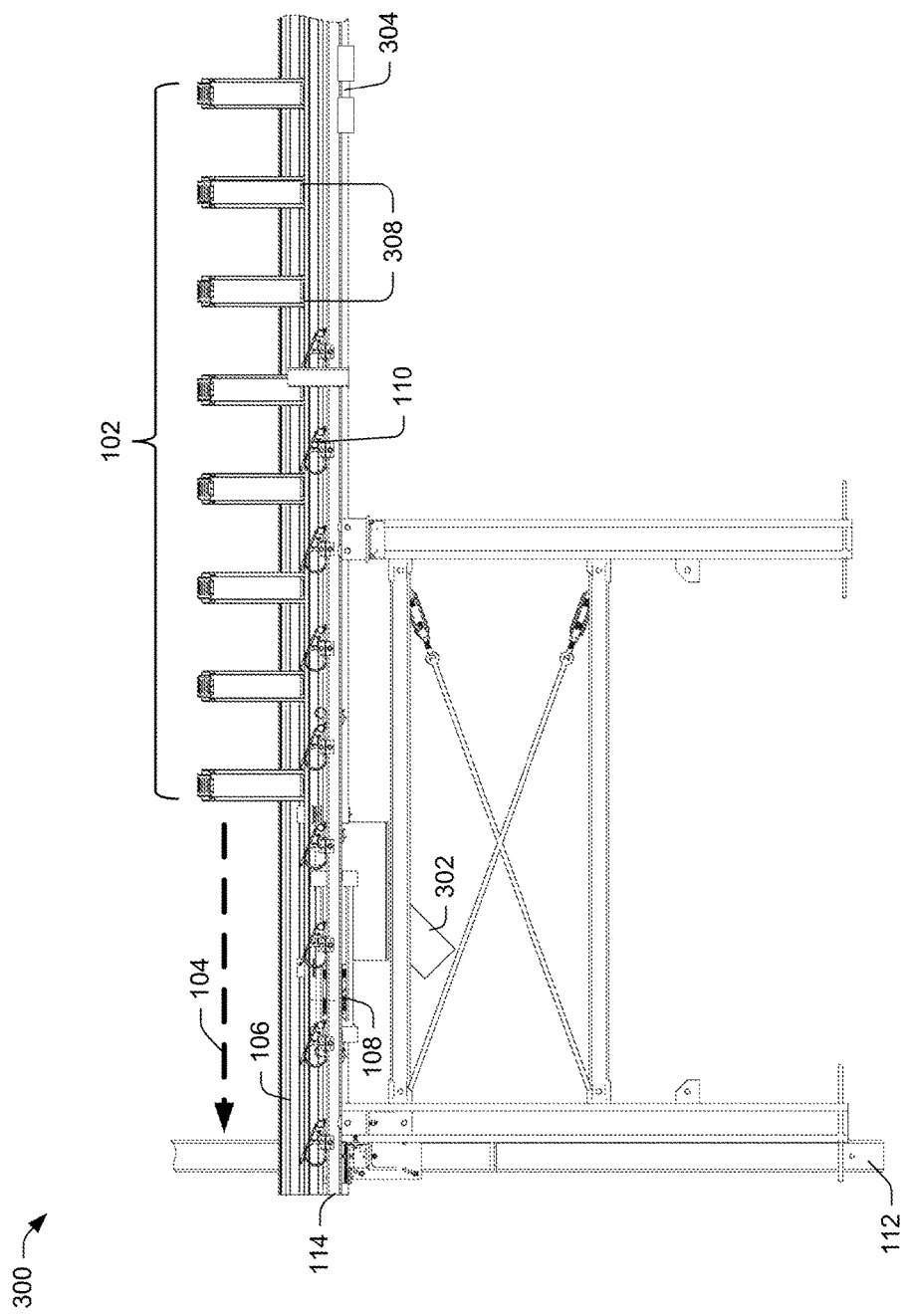

FIG. 1-3 depicts an enlarged perspective view of the one or more growing troughs at a frontend of the hydroponic growing system 100 in a harvest position 118. Specifically, as the one or more growing troughs 102 traverse or move along the hydroponic growing system 100 in the harvest direction 104 and towards the harvest position 118, the spacing between troughs may progressively or gradually increase. The increase in the space or distance between two troughs may be a function of one or more characteristics of a plant, plant variety, and/or plant species. As such, upon reaching the harvest position 118, the spacing or distance between at least one of the one or more growing troughs, which may contain at least one mature plant, may be of a second length 122 greater than the first length 120. In some implementations, the spacing or distance between any two of the one or more growing troughs 102 may be distinct. Upon removing and harvesting the plant or crop from at least one of the one or more growing troughs 102 from the hydroponic growing system 100, the at least one growing trough may be replanted with one or more plants and placed on the hydroponic growing system 100 in the initial position 116. While implementations presented herein are discussed in the context of a greenhouses, it is to be appreciated that various other types and form factors of devices may be utilized in accordance with the claimed implementations. Thus, the hydroponic growing system 100 may operate in a variety of growing environments both indoors and/or outdoors.

FIG. 2-1 is a perspective view of a hydroponic growing system 200 employing at least two growing lines. The hydroponic growing system 200 may include one or more components for growing of plants in an automated or semi-automated manner. The hydroponic growing system 200 may include one or more growing lines 124 and 124'. For example, growing line 124 of the hydroponic growing system 200 may include an example of a base 112, a gutter assembly 106, one or more growing troughs 102, and an automation assembly 108. Similarly, growing line 124' of the hydroponic growing system 100 may include an example of a base 112', a gutter component 106', one or more growing troughs 102', and an automation assembly 108'. In some implementations, the growing lines 124 and 124' may share or include a single component or single set of components for both growing lines 124 and 124'. For example, in some implementations, the growing lines 124 and 124' may include a single automation assembly 108.

FIG. 2-2 is an enlarged perspective view of an adjoining front area of the hydroponic growing system 100 including two or more growing lines. In some implementations, the growing lines 124 and 124' may share a common support structure 126. The support structure 126 may be part of base 112 of growing line 124 and/or base 112' of growing line 124'. The growing lines 124 and 124' may operate independently such that the one or more growing troughs 102 of the growing line 124 may move or traverse independently of the one or more growing troughs 102' of the growing line 124'. For example, the one or more growing troughs 102 of the growing line 124 may contain a first plant or plant species whereas the one or more growing troughs 102' of the growing line 124' contain a second plant or plant species different from the first plant or plant species, thereby having different maturity times (e.g., corresponding to different harvest times).

FIG. 3 is a side view of a frontend of the hydroponic growing system 100 illustrating the one or more growing troughs 102 engaging with one or more engagement devices 110. The one or more engagement devices may be supported by or removably attached to at least one elongated member 114. The at least one elongated member 114 may be configured to move, via the automation assembly 108, between at least two positions to correspondingly shift or move the one or more engagement devices 110. In some implementations, the elongated member 114 may be a galvanized or coated pipe or shaft having a geometrical shape. Accordingly, the one or more engagement devices 110 may each be configured to move the one or more growing troughs 102 in a harvest direction 104. Specifically, the one or more engagement devices 110 may initially be moved or shifted in a direction opposite the harvest direction 104 and behind the one or more growing troughs 102. The one or more engagement devices 110 may then move or effectively drive the one or more growing troughs 102 towards the harvest direction 104 by a defined distance.

The automation assembly 108 may be configured to move or shift the elongated member 114 supporting or including the one or more engagement devices 110, which in turn moves or shifts the one or more growing troughs 102 in the harvest direction 104. The at least one elongated member 114 may include at least one gap portion component 304, which may be configured to extend a spacing distance 308 between two or more growing troughs. In some implementations, the gap portion component 304 may include a retractable element that moves between a first retractable position and a second retractable position. The hydroponic growing system 100 may also include a drain component 302 of the gutter assembly 106, which may be configured to guide the liquid solution received from an end of the one or more growing troughs 102 into a reservoir.

Figure 4:
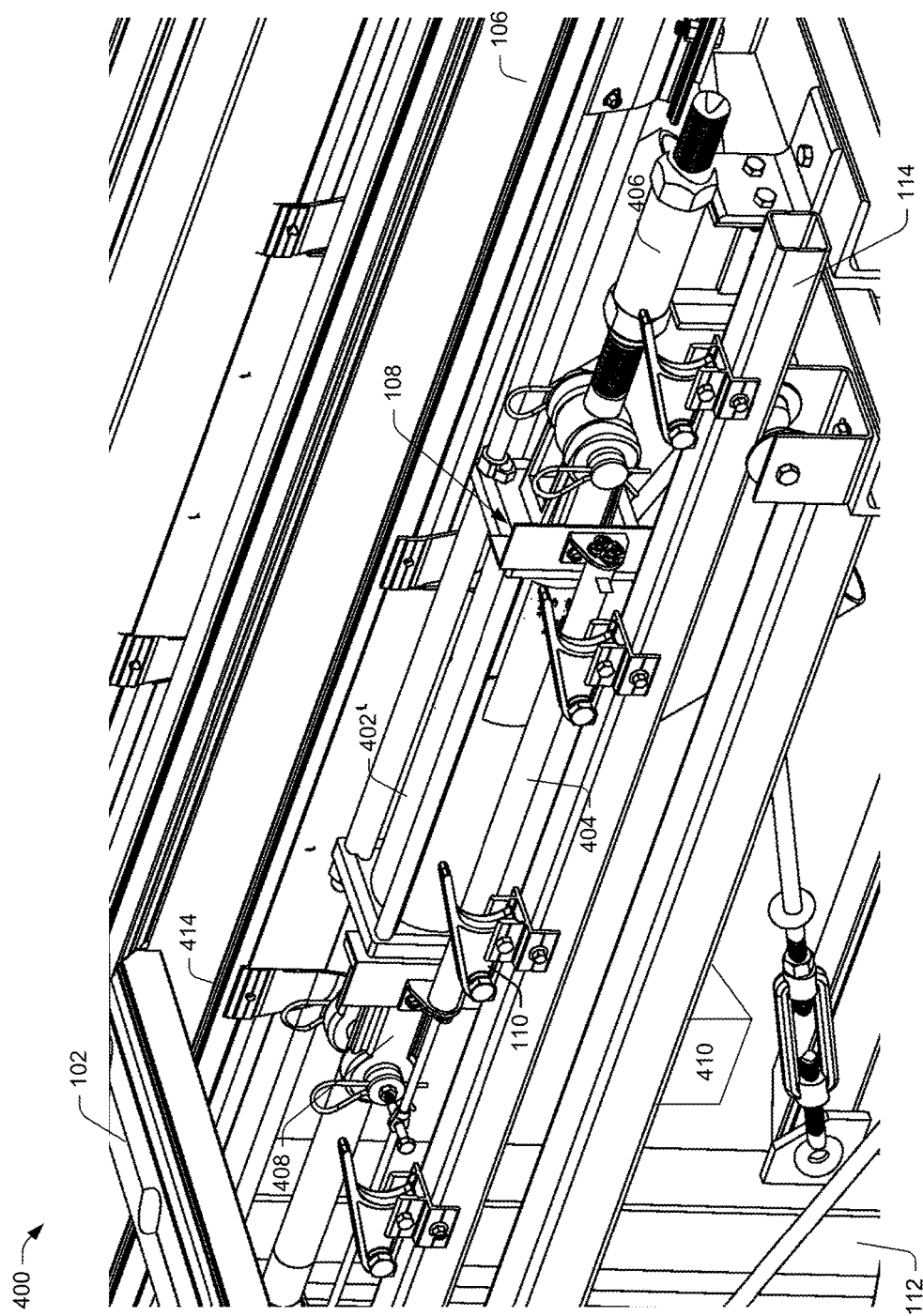
FIG. 4 is an enlarged view of an actuator assembly of the hydroponic growing system configured to move at least one elongated member supporting the one or more growing troughs.

FIG. 4 is an enlarged view of an automation assembly 108 of the hydroponic growing system 100 configured to move or shift the one or more growing troughs 102 in the harvest direction 104 via the one or more engagement devices 110 situated on the elongated member 114. Specifically, the automation assembly 108 may include an actuator component 402 configured to move or shift the elongated member 114 supporting the one or more engagement devices 110 between a first member position and a second member position. For example, the first member position may correspond to a location in front of a growing trough to be engaged with and moved by at least one of the one or more engagement devices 110 following movement to a second member position behind at least a portion of the growing trough. In some implementations, the actuator component 402 may correspond to at least one of a hydraulic cylinder component, a pneumatic cylinder component, and/or an electromechanical actuator. A variety of different configurations can be employed for attaching the automation assembly 108 and/or the actuator component 402 to base 112 in accordance with various implementations. For example, the automation assembly 108 and/or the actuator component 402 may be removably attached to the base 112 via support portion 406.

The automation assembly 108 may further include an automation component 410 removably attached to the actuator component 402, and configured to trigger the actuator component 402 to move the at least one elongated member 114 between the first member position and the second member position. In an example, the automation component 410 may receive an indication causing or triggering the automation component 410 to trigger the actuator component 402 to move or shift the elongated member 114 between the first member position and the second member position by moving or shifting a support portion, such as shaft 408, as described in further detail herein. In some implementations, the indication may be received from an automated triggering component 520, which may be configured to detect or sense a removal of at least one growing trough from a gutter 414 of the gutter assembly 106. The automated triggering component 520 may include be a light sensor, a weight sensor, a proximity sensor, and/or a magnetic sensor.

In some implementations, the automation component 410 may correspond to a hydraulic pump configured to provide liquid to the actuator component 402 to move or shift the elongated member 114, and thereby the one or more engagement devices 110 disposed or removably attached thereon, between the first member position and the second member position. In some implementations, the automation component 410 may correspond to an air or pneumatic pump configured to provide gas (e.g., air) to the actuator component 402 to move or shift the elongated member 114, and thereby the one or more engagement devices 110 disposed or removably attached thereon, between the first member position and the second member position.

The automation assembly 108 may also include at least one sensor component 404 removably attached to the actuator component 402. In particular, the at least one sensor component 404 may be configured to cease or halt movement of the actuator component 402 based on a determination that the actuator component 402 satisfies a movement threshold representing a maximum displacement distance of the actuator component 402 during the movement. For example, the actuator component 402 may include at least one magnetic element slidably engaged with the actuator component 402. The at least one sensor component 404 may be configured to cease or stop movement of the actuator component when the actuator component 402 satisfies the movement threshold based on a location of the at least one magnet or magnetic element with respect to the actuator component 402.

In some implementations, the actuator component 402 may automatically return to an original state corresponding to the first member position upon the actuator component 402 satisfying the movement threshold. For example, the actuator component 402 may begin in a compressed or contracted state prior to receiving an indication to move or shift the elongated member 114. Upon receiving the indication, the actuator component 402 may be triggered to move or shift the shaft 408 and/or the elongated member 114 supporting or including the one or more engagement devices 110 by a defined distance corresponding to the movement threshold, which may be a displacement distance of a retractable component of the actuator component 402.

Moving or shifting the at least one elongated member between the first member position and the second member position may cause the one or more engagement devices 110 to slidably engage with the at least one growing trough when moving from the first member position to the second member position. Further, moving the elongated member 114 between the first member position and the second member position may cause or trigger at least one growing trough from the one or more growing troughs 102 to move or shift from a first position on a gutter 414 of the gutter assembly 106 to a second position on the gutter 414 of the gutter assembly 106 towards the harvest direction 104. In some implementations, moving the elongated member 114 between the first member position and the second member position may cause or trigger the one or more engagement devices 110 to engage with the at least one growing trough of the one or more growing troughs 102 to move the at least one growing trough from a first position on a gutter 414 of the gutter assembly 106 to a second position on the gutter 414 of the gutter assembly 106 when moving the one or more engagement devices 110 from the second member position to the first member position.

As shown in FIG. 3, the elongated member 114 may include at least one gap portion component 304 configured to extend a spacing distance between two or more growing troughs. In some implementations, the gap portion component 304 may include a retractable element that moves between a first retractable position and a second retractable position.

Figure 5:
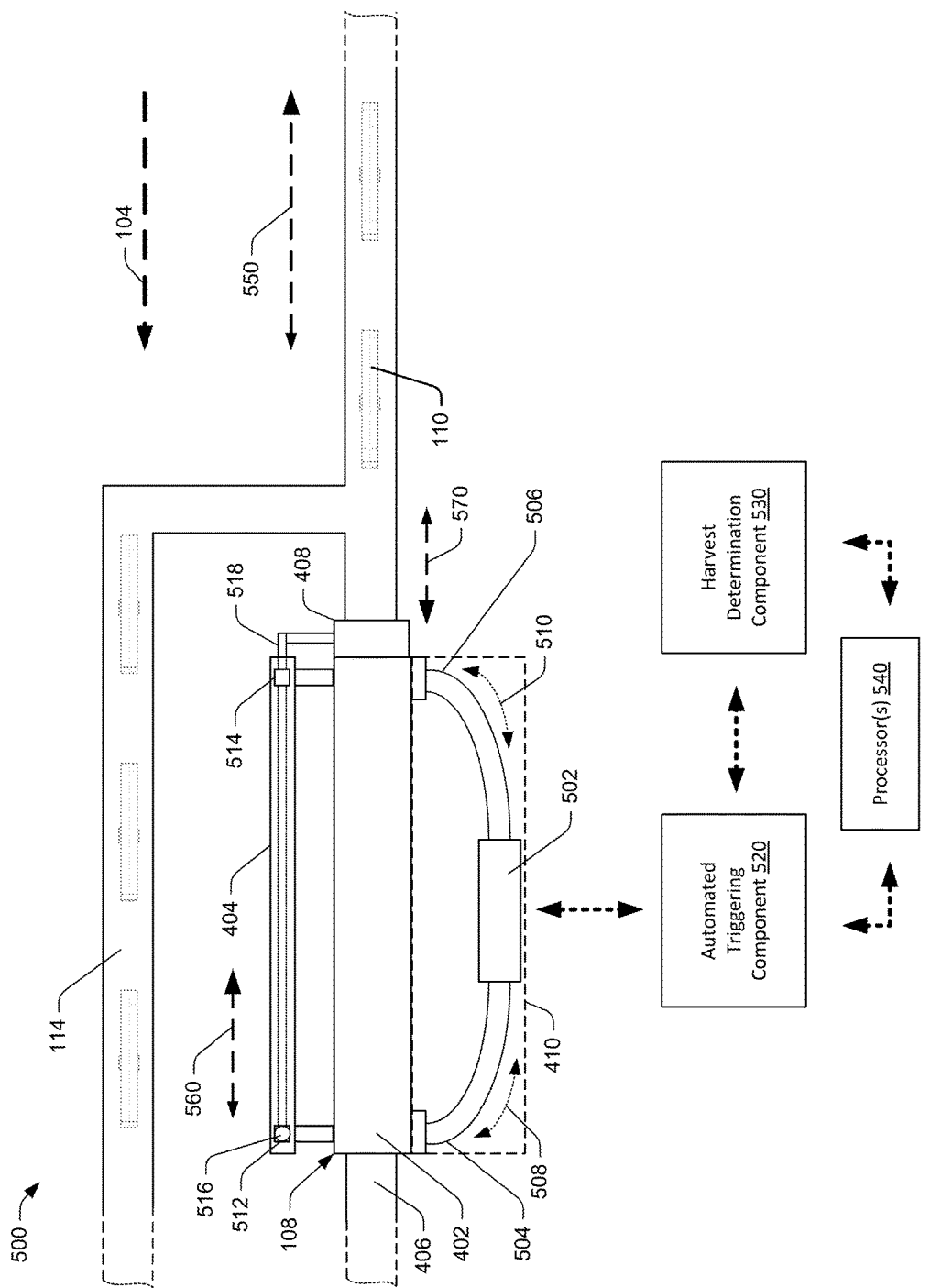
FIG. 5 is a schematic diagram of the actuator assembly attached to and in communication with one or more components of the hydroponic growing system.

FIG. 5 depicts a schematic view 500 of an automation assembly 108 including an enlarged schematic view of an actuator component 402 engaged with an elongated member 114 supporting at least one engagement device 110 in accordance with one or more implementations. Generally, the schematic view 500 depicted in FIG. 5 represents the automation assembly 108 in a first position, such as the position 602 depicted in FIG. 6. The schematic view illustrates the automation assembly 108 with various other components of the hydroponic growing system 100, including the support portion 406, shaft 408, automation component 410, elongated member 114, the at least one engagement device 110, and at least one sensor component 404. Additionally, the hydroponic growing system 100 and/or the automation assembly 108 may include at least one of automated triggering component 520, the harvest determination component 530, and the processor(s) 540. According to various implementations, the actuator component 402 represents a portion of the automation assembly 108 that includes the shaft 408, and to which a moveable component, such as the elongated member 114, can be attached. For instance, the shaft 408 can be attached to the elongated member 114 to enable movement of the elongated member 114 between a first member position and a second member position such that the one or more engagement devices 110 engage with the one or more growing troughs 102 to move at least one growing trough from a first position on the gutter assembly 106 to a second position on the gutter assembly 106 in the harvest direction 104. Moreover, as will be explained in detail below, the shaft 408 may slidably engage with the actuator component 402 as the actuator component 402 is triggered by the automation component 410.

As illustrated, the elongated member 114 supports the at least one engagement device 110. A variety of different configurations can be employed for attaching the elongated member 114 to the shaft 408 in accordance with various implementations. For instance, in this implementation, the elongated member 114 at least partially extends around the automation assembly 108.

Further depicted in FIG. 5 is the automation component 410 which may be removably attached to the actuator component 402. For instance, the automation component 410 may be configured to trigger the actuator component 402 to move the elongated member 114 between the first member position and the second member position. According to various implementations, the automation component 410 may trigger the actuator component 402 based on a plurality of mechanisms including, but not limited to a mechanical component, an electro-mechanical component, a hydraulic component, or pneumatic component. Correspondingly, the actuator component 402 may correspond to at least one of a mechanical cylinder component, electro-mechanical component, hydraulic component, and/or pneumatic component.

As illustrated in this implementation, the automation component 410 may include a hydraulic pump 502 configured to provide liquid to the actuator component 402 (i.e., configured as a hydraulic cylinder) to engage the shaft 408 to move the elongated member 114 between the first member position and the second member position. As shown, the hydraulic pump 502 is removably attached to the actuator component 402 via a first tube 504 and a second tube 506. Hydraulic liquid may flow 508 between the actuator component 402 and the hydraulic pump 502 through the first tube 504, and hydraulic liquid may flow 510 between the actuator component 402 and the hydraulic pump 502 through the second tube 506. The hydraulic pump 502 may control the amount (i.e., pressure) and direction of the flows 508 and/or 510.

In an implementation, a sensor component 404 may be removably attached to the actuator component 402, and may be configured to cease movement of the actuator component 402 and/or the shaft 408 when the actuator component 402 satisfies a movement threshold representing a maximum displacement distance of the actuator component 402 during the movement. A variety of different sensors can be employed for ceasing movement of the actuator component 402 in accordance with various implementations. An example of the sensor component 404 employing a magnetic element 516 is discussed below.

For instance, the sensor component 404 may include a first sensor 512 located at a first end of the sensor component 404 and a second sensor 514 located at a second end of the sensor component 404. As shown, the sensor component 404 may be substantially the same length as the actuator component 402 such that the first end and the second end of the sensor component 404 line up with a first end and second end of the actuator component 402, respectively. Moreover, the sensor component 404 may include a connection component 518 attached to both the magnetic element 516 and the shaft 408. As further detailed below, sensor component 404 may be configured to communicate with the automation component 410 to return the actuator component 402 to an original state corresponding to the first member position.

As described herein, the actuator component 402 may be configured as a hydraulic cylinder including a shaft 408 partially inside the actuator component 402. For instance, the shaft 408 may correspond to a rod and/or shaft with a surface that slidably engages with the interior surface of the actuator component 402. Moreover, the actuator component 402 may include a piston (not shown) that is attached to the shaft 408 and engages the shaft 408 through the actuator component 402 once the actuator component 402 is triggered by the automation component 410 based at least on the pressure level inside the actuator component 402.

In various implementations, the actuator component 402 transitions between an original state to a second state, such that, the shaft 408 slidably engages with the actuator component 402 in directions 570. For instance, the hydraulic pump 502 injects liquid at a first pressure level through the first tube 504 and into the actuator component 402, and drains the liquid at a second pressure level through the second tube 506. The injected liquid increases the pressure required to force the shaft 408 to slidably engage with the actuator component 402 to move the elongated member 114 from the first member position towards the second member position. As the hydraulic pump 502 injects more liquid into the actuator component 402 through first tube 504, the shaft 408 moves towards the second member position. As the shaft 408 moves in directions 570, the connection component 518 slidably engages with the sensor component 404 in directions 560, respectively. Moreover, as the shaft 408 moves in directions 570, the elongated member 114 moves in directions 550 between a first member position and a second member position, respectively. Correspondingly, as further detailed below, when the elongated member 114 moves between the first member position and the second member position, the at least one engagement device 110 engages with at least one growing trough of the one or more growing troughs 102.

In at least some implementations, the length between the first member position and the second member position corresponds to the length between the shaft 408 in the original state and the second state. Similarly, the length between the first sensor 512 and the second sensor 514 corresponds to the length between the shaft 408 in the original state and the second state.

In an implementation, when the magnetic element 516 reaches the second sensor 514, the sensor component 404 triggers the automation component 410 to halt flow 508 of the liquid through the first tube 504, and to drain the liquid from the actuator component 402 through the second tube 506. For instance, when the sensor component 404 triggers the automation component 410 and/or the hydraulic pump 502, the liquid flows 510 through the second tube 506 releasing/decreasing the pressure in the actuator component 402. As the pressure in the actuator component 402 decreases, the shaft 408 returns to the original state. Further, as the shaft 408 returns to the original state, the connection component 518 slidably engages with the sensor component 404 to move the magnetic element 516 back to the first sensor 512.

In an implementation, the hydroponic growing system 100 may include the automated triggering component 520, which may be communicatively coupled to the automation assembly 108. Generally, the automation assembly 108 may be configured to automatically move at least one growing trough of the one or more growing troughs 102 from the first position on the gutter assembly 106 to the second position on the gutter assembly 106 in response to receiving a triggering signal from the automated triggering component 520. For example, the automated triggering component 520 may be configured to determine whether at least one growing trough of the one or more growing troughs 102 is removed from the hydroponic growing system 100, and transmit the triggering signal to the automation assembly 108 to automatically move a second growing trough of the one or more growing troughs 102 from the first position on the gutter assembly 106 to the second position on the gutter assembly 106 based on a determination that the at least one growing trough of the one or more growing troughs 102 is removed from the hydroponic growing system 100. The automated triggering component 520 may include a light sensor, a weight sensor, a proximity sensor, and/or a magnetic sensor in order to detect the removable of at least one of the one or more growing troughs 102.

In an implementation, hydroponic growing system 100 may include a harvest determination component 530, which may be in communication with or communicatively coupled connected to the automated triggering component 520. For example, the harvest determination component 530 configured to monitor the one or more plants and/or determine whether to prompt the automated triggering component 520 to transmit the triggering signal to the automation assembly 108. Specifically, the harvest determination component 530 may determine that a weight or shape of at least one plant in or supported by the at least one growing trough of the one or more growing troughs 102 satisfies a harvesting condition or threshold. The harvesting condition may be a weight, shape, and/or at least one detectable characteristic of the plant. In accordance with a determination that at least one detectable characteristic of the plant satisfies the harvest condition or threshold, the automated triggering component 520 may be triggered to transmit the triggering signal to the automation assembly. A variety of different configurations can be employed for configuring the automated triggering component 520 and the harvest determination component 530 in accordance with various implementations. For example, the automated triggering component 520 and harvest determination component 530 may be configured to communicate with one or more processor(s) 540.

Figure 6:
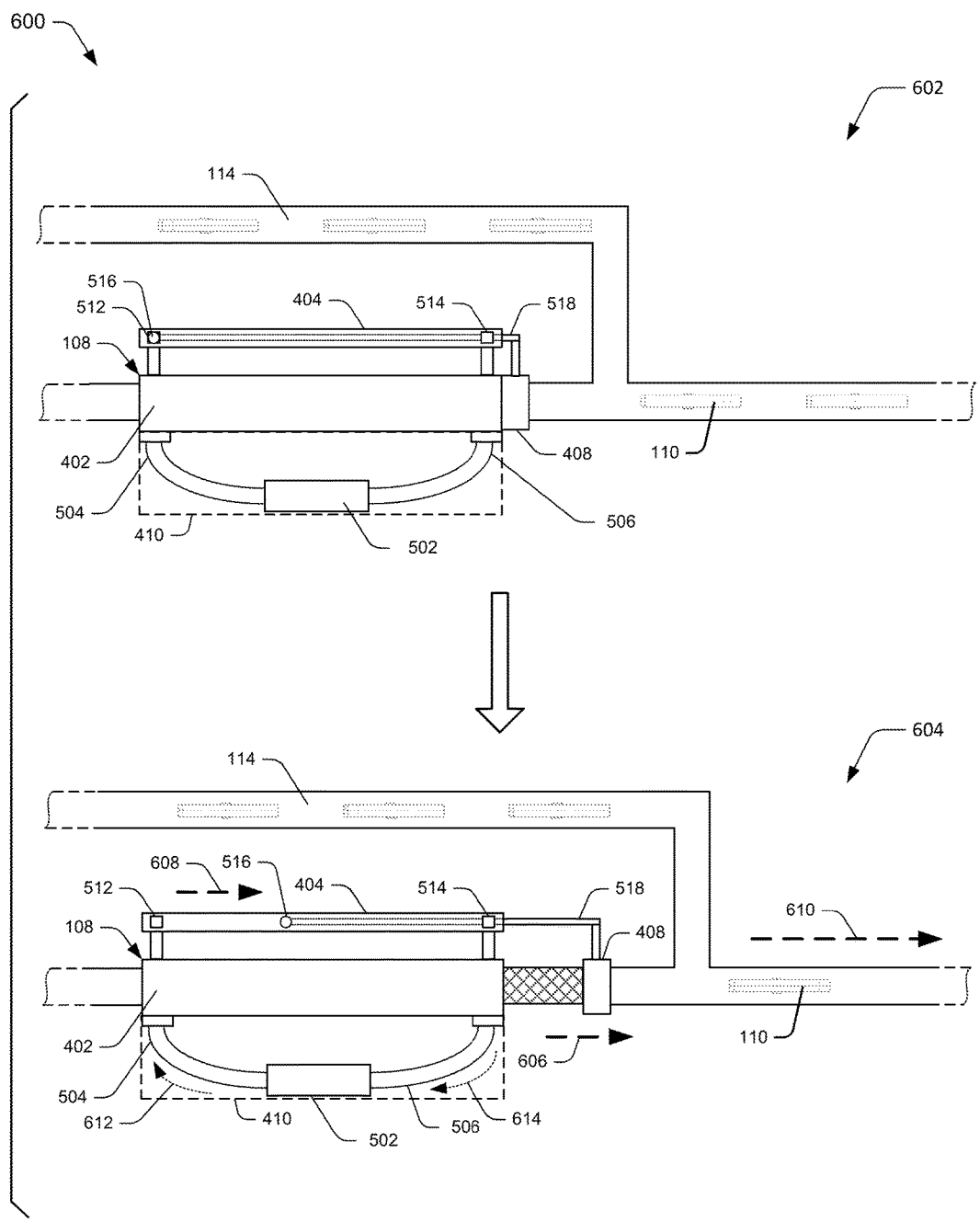
FIG. 6 is a schematic diagram illustrating a first state of the actuator assembly of the hydroponic growing system prior to a triggering of an actuator component.

FIG. 6 depicts schematic views in an implementation scenario for triggering of an example actuator component 402 in accordance with one or more implementations. The depictions of the automation assembly 108 in the scenario 600 show a schematic view of the actuator component 402 and the automation component 410.

In scenario 600, the actuator component 402 moves from an original state, such as the position 602, to a transitioning state, such as the position 604, e.g., introduced with reference to FIG. 5. For instance, the automation component 410 triggers the actuator component 402 such that the shaft 408 moves in a direction 606. Notice that as the shaft 408 moves in the direction 606, the elongated member 114 simultaneously moves in the direction 610. Further, the connection component 518 that is connected to shaft 408 simultaneously engages the sensor component 404 such that the magnetic element 516 moves in the direction 608.

As described herein, the automation component 410 may include a hydraulic pump 502 that initiates a flow 612 of liquid through the first tube 504 and into the actuator component 402 and a flow 614 of liquid through second tube 506 and into hydraulic pump 502. As a result of the liquid flowing into the actuator component 402, the piston (not shown) that is attached to the shaft 408 engages the shaft 408 due to the pressure within the actuator component 402. The pressure from the liquid flowing from the first tube 504 causes the actuator component 402 to change from the original state to the transitioning state by applying a force (i.e., pressure) on the piston engaged with the shaft 408, which in turn, causes the shaft 408 to move in direction 606.

During movement of the shaft 408, the shaft 408 engages with the elongated member 114, which in turn, causes the elongated member 114 to move from a first member position to a second member position in direction 610. Accordingly, the connection component 518 engaged with the magnetic element 516 and connected to shaft 408 moves magnetic element 516 from first sensor 512 towards direction 608. As mentioned above, the movements of the shaft 408, the elongated member 114, and the magnetic element 516 occur simultaneously, and include a relatively same amount of displacement from their original positions.

For instance, in this case of scenario 600, movement of the shaft 408 from the position 602 to position 604 causes movement of the shaft 408 such that the shaft 408 slides within actuator component 402. In various implementations, the interior of actuator component 402 has a level or zero slope relative to the direction of movement of shaft 408, such that the movement of shaft 408 from the position 602 to the position 604 is associated with a substantially constant sliding friction. In other words, the interior of actuator component 402 has a substantially level surface, so the linear movement of shaft 408 along actuator component 402 does not increase the engagement force and/or the friction force. This substantially constant amount of sliding friction enables the linear movements of the shaft 408, the elongated member 114, and the magnetic element 516.

Figure 7:
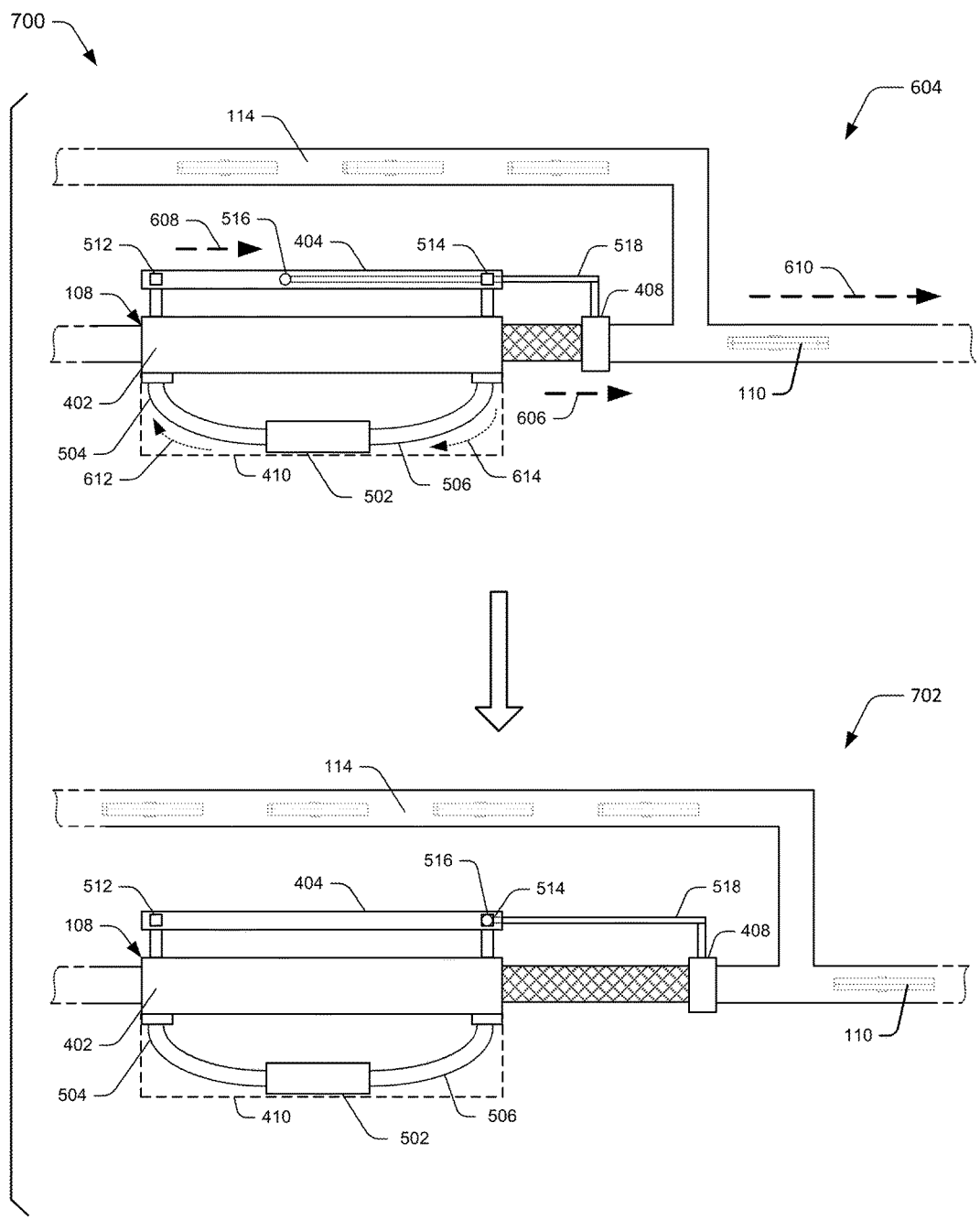
FIG. 7 is a schematic diagram illustrating a second state of the actuator assembly of the hydroponic growing system following triggering of the actuator component.

FIG. 7 depicts an implementation scenario 700 for further movement of the shaft 408 in accordance with one or more implementations. The depictions of the automation assembly 108 in the scenario 700 show a schematic view of the automation assembly 108. In at least some implementations, the scenario 700 represents a continuation of the scenario 600, described above.

In the scenario 700, the shaft 408 further moves in direction 606 from position 604, introduced above with reference to FIG. 6, to the position 702. As the shaft 408 further moves in direction 606, the elongated member 114 further moves in direction 610 and reaches the second member position.

In various implementations, the flow 612 of the liquid through the first tube 504 from the hydraulic pump 502 and into the actuator component 402 may continue. As a result of the liquid continually flowing into the actuator component 402, the piston (not shown) that is attached to the shaft 408 continually engages the shaft 408 due to the increased pressure within the actuator component 402 from the direction of the first tube 504. In an example, the pressure level of the liquid flowing 612 into the actuator component 402 is greater than the pressure level of the liquid flowing 614 out of actuator component 402 through second tube 506. The pressure from the liquid causes the actuator component 402 to continue in the transitioning state by applying a force (i.e., pressure) on the piston engaged with the shaft 408, which in turn, causes the shaft 408 to continue moving in direction 606.

During movement of the shaft 408 in the scenario 700, the shaft 408 further engages with the elongated member 114, which in turn, causes the elongated member 114 to move in direction 610 to a second member position. Accordingly, the connection component 518 engaged with the magnetic element 516 and connected to the shaft 408 moves magnetic element 516 in direction 608 towards the second sensor 514. As described further herein, when shaft 408 reaches the position 702, the magnetic element 516 will overlap with the second sensor 514, which in turn, will cause the sensor component 404 to indicate to the automation component 410 and/or the hydraulic pump 502 to cease the flow 612 of the liquid through the first tube 504 and the flow 614 through the second tube 506, and to begin the process of draining the liquid from actuator component 402, so as to return the actuator component 402 to its original state.

Figure 8:
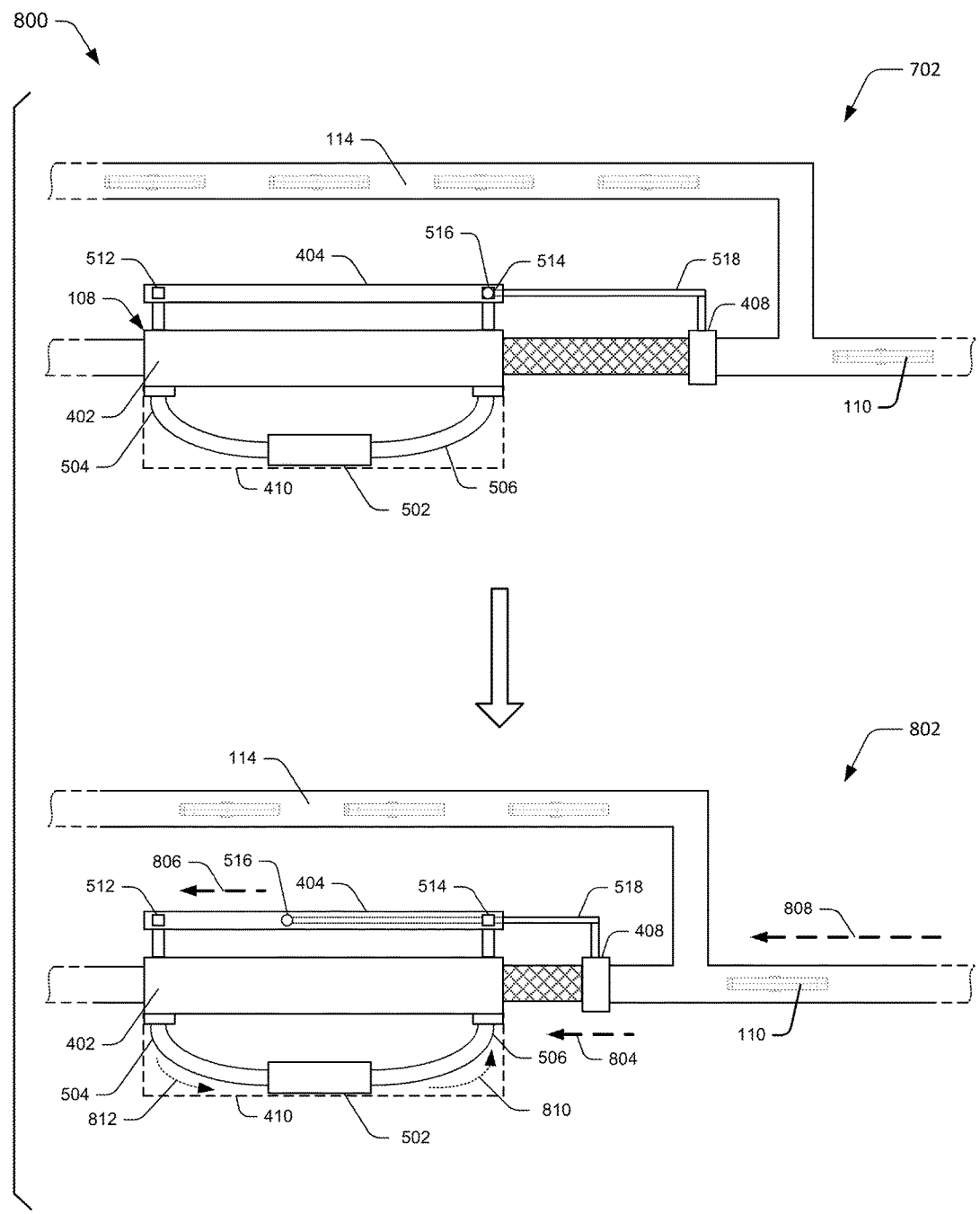
FIG. 8 is a schematic diagram illustrating a third state of the actuator assembly of the hydroponic growing system following triggering of the actuator component.

FIG. 8 depicts an example scenario 800 for returning the actuator component 402 to its original state in accordance with one or more implementations. The scenario 800, for instance, represents a scenario where the shaft 408 moves from the second state, such as the position 702, to the transitioning state, such as the position 802. For instance, the automation component 410 triggers the actuator component 402 such that the shaft 408 moves in direction 804. As the automation assembly 108 moves from the position 702 to the position 802, the elongated member 114 moves in direction 808 from the second member position towards the first member position. Further, as the shaft 408 moves in direction 804, the connection component 518 slidably engages with the sensor component 404 to move the magnetic element 516 in direction 806 back towards the first sensor 512.

As illustrated in the upper portion of the scenario 800, when shaft 408 reaches the position 702, the magnetic element 516 will overlap with the second sensor 514, which in turn, will cause the sensor component 404 to indicate to the automation component 410 and/or the hydraulic pump 502 to cease the flows 612 and 614 of the liquid through the first tube 504 and the second tube 506, respectively, and to begin the process of draining the liquid from actuator component 402, so as to return the actuator component 402 to its original state. For instance, the second sensor 514 senses the magnetic element 516, and transmits a signal to the automation component 410 and/or the hydraulic pump 502 to cease pumping the liquid, and to begin draining the liquid from the actuator component 402.

In various implementations, the automation component 410 and/or the hydraulic pump 502 may trigger the flow 810 of the liquid through second tube 506 to actuator component 402 and from the hydraulic pump 502. As a result of the liquid entering the actuator component 402 from the direction of the second tube 506, the piston (not shown) that is attached to the shaft 408 engages the shaft 408 due to the pressure within the actuator component 402. In an example, the pressure level of the liquid flowing 810 into the actuator component 402 is greater than the pressure level of the liquid flowing 812 out of the actuator component 402 through the first tube 504. The pressure from the liquid causes the shaft 408 to move in direction 804.

During movement of the shaft 408, the shaft 408 engages with the elongated member 114, which in turn, causes the elongated member 114 to move from the second member position towards the first member position in direction 808. Accordingly, the connection component 518 engaged with the magnetic element 516 and connected to the shaft 408 moves the magnetic element 516 from the second sensor 514 towards direction 806. As mentioned above, the movements of the shaft 408, the elongated member 114, and the magnetic element 516 occur simultaneously, and include a relatively same amount of displacement from their original positions.

For instance, in this case of scenario 800, movement of the shaft 408 from the position 702 to the position 802 causes movement of the shaft 408 such that the shaft 408 slides within the actuator component 402. As described herein, the interior of the actuator component 402 has a level or zero slope relative to the direction of movement of shaft 408, such that the movement of the shaft 408 from the position 702 to the position 802 is associated with a substantially constant sliding friction. In other words, the interior of the actuator component 402 has a substantially level surface, so the linear movement of the shaft 408 along the actuator component 402 does not increase the engagement force and/or the friction force. This substantially constant amount of sliding friction enables the linear movements of the shaft 408, the elongated member 114, and the magnetic element 516.

Figure 9:
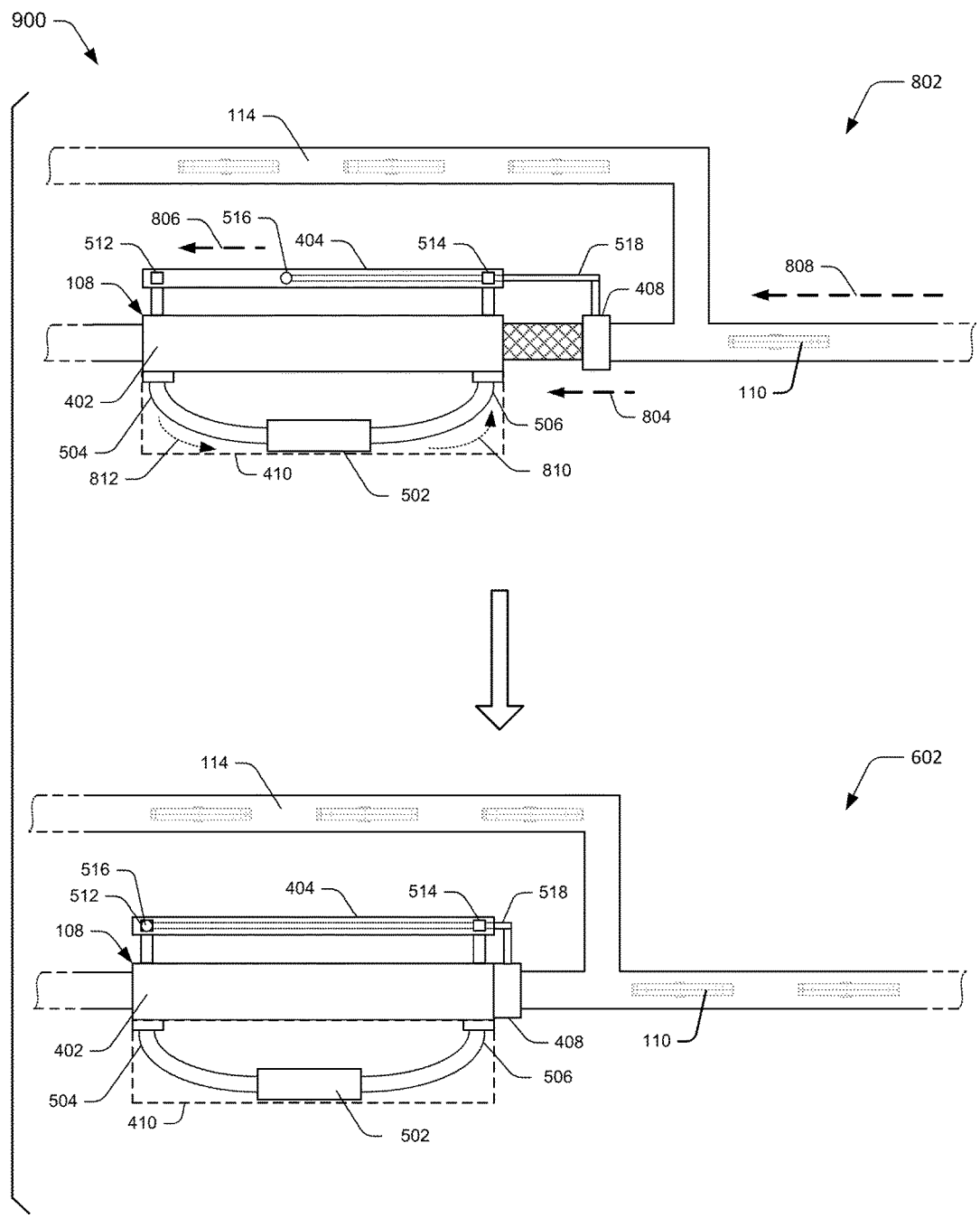
FIG. 9 is a schematic diagram illustrating a return to the first state of the actuator assembly of the hydroponic growing system following triggering of the actuator component.

FIG. 9 depicts an implementation scenario 900 for returning the automation assembly 108 to its original state in accordance with one or more implementations. The depictions of the automation assembly 108 in the scenario 900 show a schematic view of the automation assembly 108. In at least some implementations, the scenario 900 represents a continuation of the scenario 800, described above.

In the scenario 900, the shaft 408 further moves in direction 804 from position 802, introduced above with reference to FIG. 8, to the position 602. As the shaft 408 further moves in direction 804, the elongated member 114 further moves in direction 808 and reaches the first member position.

In various implementations, the flow 810 of the liquid through the second tube 506 to the actuator component 402 and from the hydraulic pump 502, and the flow 812 through the first tube 504 may continue. As a result of the liquid entering from the second tube 506 to the actuator component 402, the piston (not shown) that is attached to the shaft 408 engages the shaft 408 due to the pressure within the actuator component 402. The pressure from the liquid causes the shaft 408 to continue to move in direction 804.

During movement of the shaft 408 in the scenario 900, the shaft 408 further engages with the elongated member 114, which in turn, causes the elongated member 114 to move in direction 808 to the first member position. Accordingly, the connection component 518 engaged with the magnetic element 516 and connected to the shaft 408 moves the magnetic element 516 in direction 806 towards the first sensor 512. As described further herein, when the shaft 408 reaches the position 602, the magnetic element 516 will overlap with the first sensor 512, which in turn, will cause the sensor component 404 to indicate to the automation component 410 and/or the hydraulic pump 502 to cease flow 810 of the liquid through the second tube 506 and flow 812 of the liquid through the first tube 504. As a result, the actuator component 402 has returned to its original state in the position 602.

Figure 10:
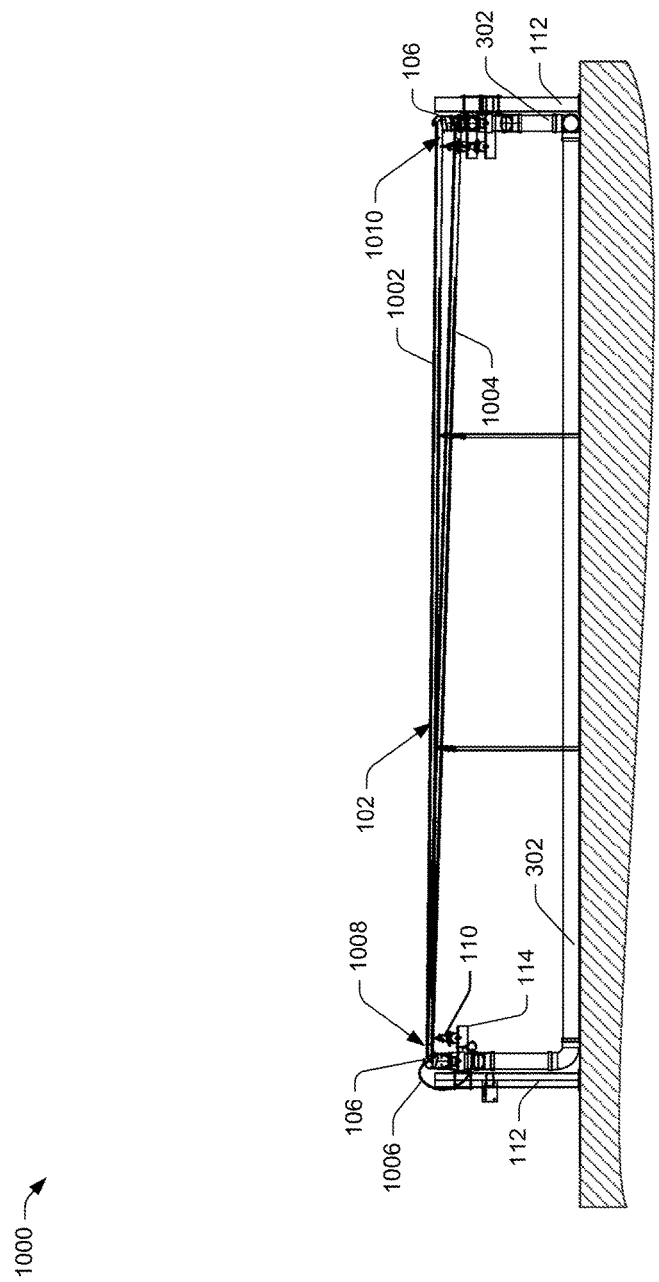
FIG. 10 is a front view of the hydroponic growing system including one or more troughs arranged at varying angles with respect to an axis.

FIG. 10 is a front view scenario 1000 of the hydroponic growing system 100 including the one or more growing troughs 102 arranged at varying angles with respect to an axis (e.g., horizontal axis). Specifically, the one or more growing troughs 102 may be or otherwise form a set of growing troughs, from which a number of subsets of growing troughs may be arranged at various angles as they traverse the hydroponic growing system 100. For example, as the plants contained in or on the one or more growing troughs 102 grow or mature, their roots may correspondingly increase in size and/or length. The roots of the plants may act as an impediment to a flow velocity of the liquid solution. As such, as the roots increase in size and/or length, the flow velocity may decrease if the one or more growing troughs 102 are maintained at a fixed angle along the harvest direction 104, thereby potentially preventing adequate amounts of liquid solution, if any, from reaching plants near and/or at a drain end 1010 of the one or more growing troughs 102. However, increasing an angle of the one or more growing troughs 102 below a horizontal axis may increase the flow velocity of the liquid solution, and allow the liquid solution containing nutrients useful for plant growth to reach plants located at or near a drain end 1010. That is, as the one or more growing troughs 102 are moved in the harvest direction 104, the angle at which the one or more growing troughs 102 are supported by the gutter assembly 106 may increase below the horizontal axis.

As the one or more growing troughs 102 traverse or move across the hydroponic growing system 100 (e.g., by the one or more engagement devices 110 via automation assembly 108), a subset of the growing troughs 1002 may be arranged or positioned at a first angle. In other words, the subset of growing troughs 1002 may be positioned at a slope (e.g., first angle) such that the liquid solution that is injected or provided into a liquid insertion side 1008 (e.g., via at least one tubing member 1006 of the gutter assembly 106) of the subset of growing troughs 1002, travels through and exits or discharges out a drain end 1010 and into a drain component 302 at a first velocity. In some implementations, the drain component 302 may be removably attached to the base 112 and configured to receive and drain the liquid solution from the one or more growing troughs 102. The subset of growing troughs 1004 may then move towards the harvest direction 104 and be arranged or positioned at a second angle greater than the first angle. Accordingly, the subset of growing troughs 1004 may be positioned at the second angle such that the liquid solution that is injected or provided into the liquid insertion side 1008 travels through and exits out of the drain end 1010 at a second velocity greater than a first velocity.

In some implementations, as the one or more growing troughs 102 traverse or move along the hydroponic growing system 100 in the harvest direction 104, the one or more growing troughs 102 may gradually decline below a horizontal axis (e.g., X-axis). In other words, a negative slope value of the one or more growing troughs 102 may increase as the one or more growing troughs 102 are shifted in the harvest direction 104. For example, the subset of growing troughs 1002 may have the first angle at '−X' degrees and the subset of growing troughs 1004 may have the second angle at '−Y' degrees, where Y is greater than X (e.g., Y>X). Alternatively, in some implementations, as the one or more growing troughs 102 traverse or move along the hydroponic growing system 100 in the harvest direction 104, an angle or slope of the one or more growing troughs 102 may gradually increase towards the horizontal axis (e.g., may increase in slope towards a zero value of the X-axis).

Figures 1, 11:
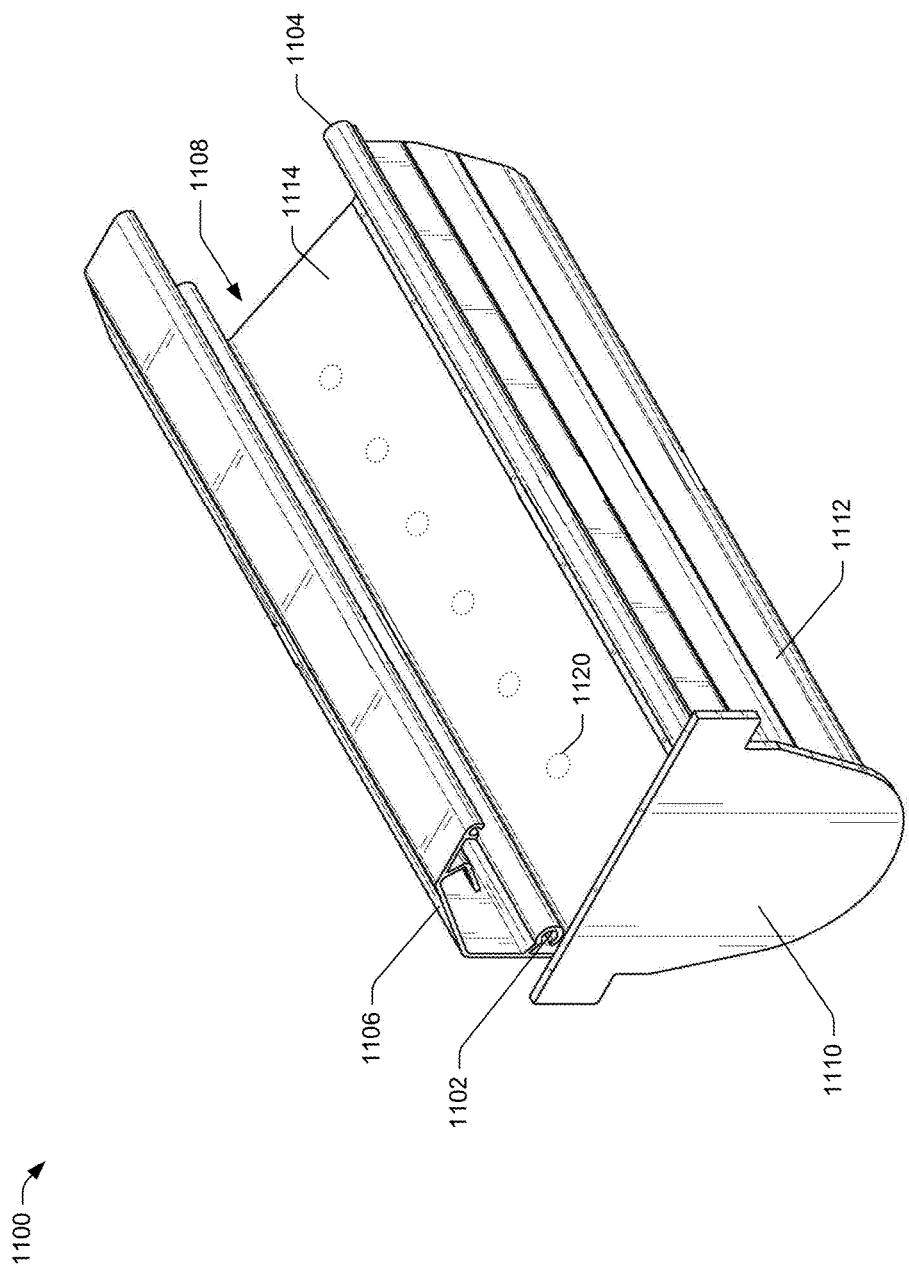
Figures 2, 11:
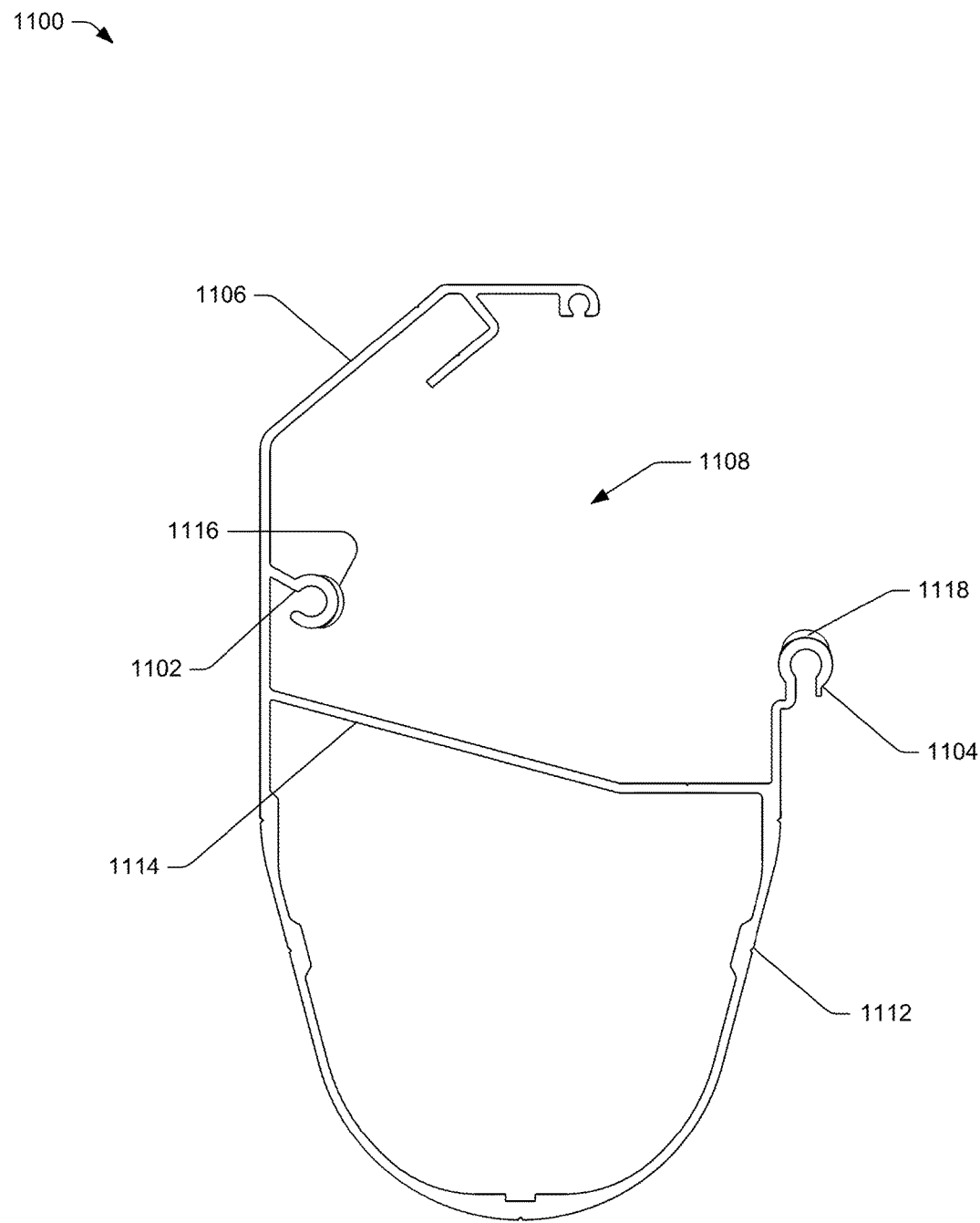

FIG. 11-1 is a perspective view of a gutter 1100 of the gutter assembly 106. FIG. 11-2 is a front or back side view of the gutter 1100 of the gutter assembly 106 for use within the hydroponic growing system 100. The gutter 1100 may include a base 1112 including or forming an interior portion 1108 configured to receive and/or retain the liquid solution. Further, the gutter 1100 may include a support portion 1104 configured to provide support for at least one growing trough of the one or more growing troughs 102, as further shown and described herein with respect to FIG. 12. In some implementations, the support portion 1104 may be attached to a first side of the base 1112 opposite a second side of the base including a cover 1106. The support portion 1104 may include a covered portion 1118 configured to permit smooth sliding or traversal of the one or more growing troughs 102 on the support portion 1104. For example, a portion of the support portion 1104 contacting or supporting the one or more growing troughs 102 may be covered in a material that allows for and does not restrict the one or more growing troughs 102 from sliding along the support portion 1104 in the harvest direction 104. In some implementations, the covered portion 1118 may be formed of or otherwise correspond to a plastic material, a fabric material, and/or a composite material.

The gutter 1100 may include a cover 1106 attached to the base 1112 and configured to minimize light exposure into the interior portion 1108 and at an end portion of the at least one growing trough of the one or more growing troughs 102. The gutter 1100 may also include a cover plate 1110 located at one or both ends of the gutter 1100 and configured to retain the liquid solution within the interior portion 1108. That is, the cover plate 1110 prevents water or liquid from exiting the gutter 1100 from the side ends. In some implementations, the base 1112 may include a respective cover or side plate for each end of the gutter 1100. In some implementations, a separate or distinct gutter 1100 may be provided at opposite ends of the hydroponic growing system 100, each of which may form the gutter assembly 106.

Figure 12:
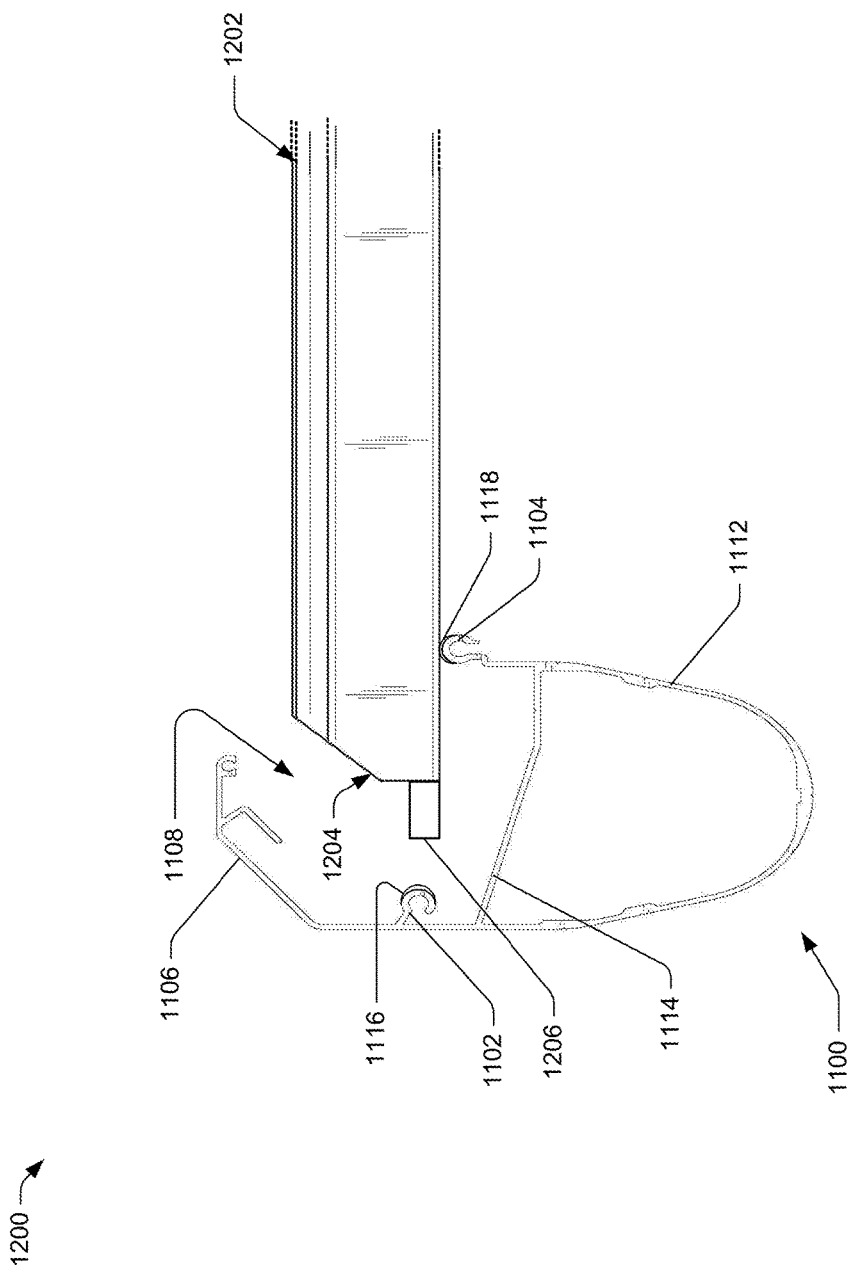
FIG. 12 is side view of the portion of the gutter assembly removably attached and supporting at least one growing trough.

The gutter may further include a stopper 1102 configured to form and/or maintain a gap between the cover 1106 and any component that contacts the stopper 1102, such as the one or more growing troughs 102, as further described herein with respect to FIG. 12. For instance, the stopper 1102 may engage an end of the at least one growing trough of the one or more growing troughs 102 to ensure a gap or spacing exists between the end of the at least one growing trough of the one or more growing troughs 102 and the cover 1106. Doing so mitigates a restriction of a flow of liquid solution from the one or more growing troughs 102 into the interior portion 1108 of the gutter 1100. That is, the gap or spacing formed by the stopper 1102 engaging the one or more growing troughs 102 allows for the liquid solution to flow out of the end of the one or more growing troughs 102 and into the interior portion 1108. In some implementations, the stopper 1102 may include a covered portion 1116 configured to engage an end of the one or more growing troughs 102 so as to mitigate undesirable noise from an engagement or clattering of metallic components (e.g., between the gutter 1100 and the one or more growing troughs 102).

The gutter 1100 may include a top cover 1114 configured to prevent or mitigate the entry of material or substances not including the liquid solution from entering the interior portion 1108 from the top end. Also, the top cover 1114 may mitigate the growth of algae or other organisms within the interior portion 1108 by inhibiting light from entering a bottom of the interior portion 1108 retaining the liquid solution. The top cover 1114 may include one or more cover openings 1120 to allow the liquid solution to enter and be retained within the interior portion 1108. For example, the one or more cover openings 1120 may be holes of distinct or identical shape spaced apart at varying or similar distances from one another on the top cover 1114.

FIG. 12 is a growing trough support scenario 1200 of the gutter 1100 supporting at least one growing trough 1202. The gutter 1100 may support, via the support portion 1104, the growing trough 1202 of the one or more growing troughs 102. Specifically, one end of the growing trough 1202 may be placed on the support portion 1104 of the gutter 1100. For example, as the growing trough 1202 moves or effectively slides along the harvest direction 104, the covered portion 1118 of the support portion 1104 may, alone or in combination with additional support members of the base 112, support one end of the growing trough 1202. In some implementations, the growing trough 1202 may traverse along the covered portion 1118 of the support portion 1104 in a horizontal direction with respect to the base 112.

Further, the support portion 1104 may align the growing trough 1202 such that the cover 1106 sufficiently shields the end portion 1204 of the growing trough 1202 from light. For example, the cover 1106 may at least minimize light exposure into the interior portion 1108 where at least a portion of the growing trough 1202 is situated such that the end portion 1204 of the growing trough 1202 receives little to no light exposure. Specifically, to mitigate the growth of foreign organisms (e.g., moss) relying on light for growth at the end portion 1204 of the growing trough 1202 (e.g., which may be part of the one or more growing troughs 102), the cover 1106 may block or mitigate light exposure on at least the end portion 1204 of the growing trough 1202.

Figures 1, 15:
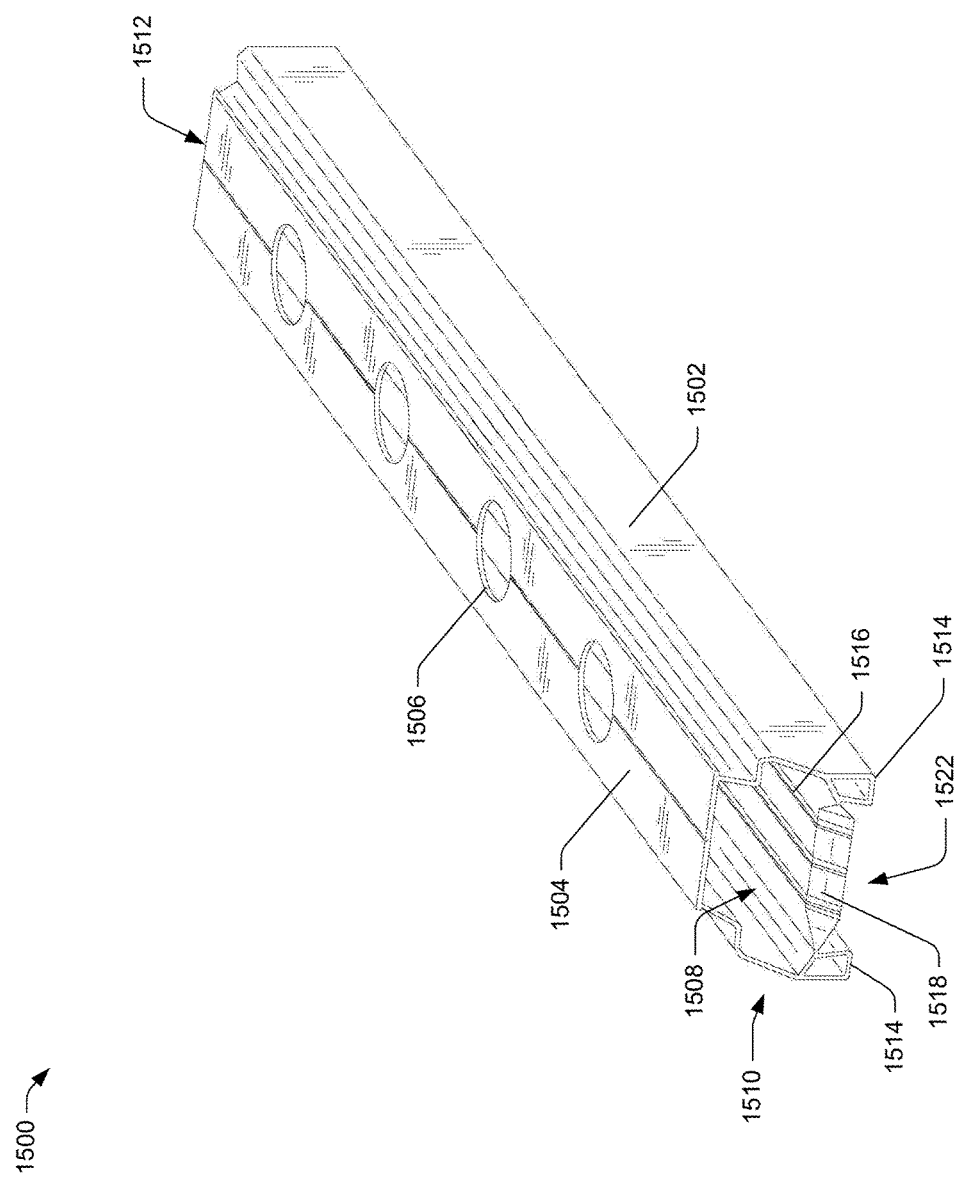
Figures 2, 15:
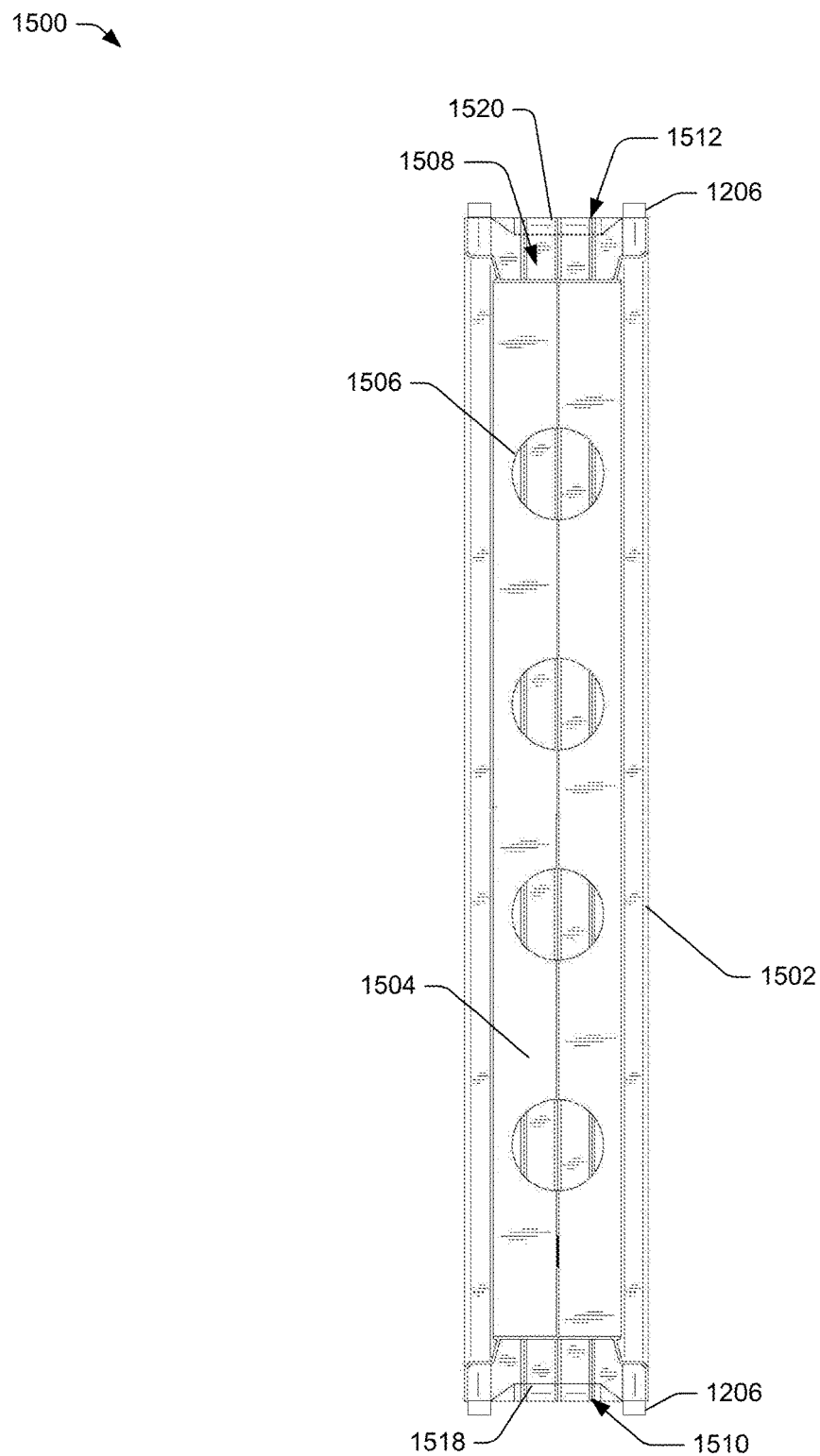
Figures 3, 15:
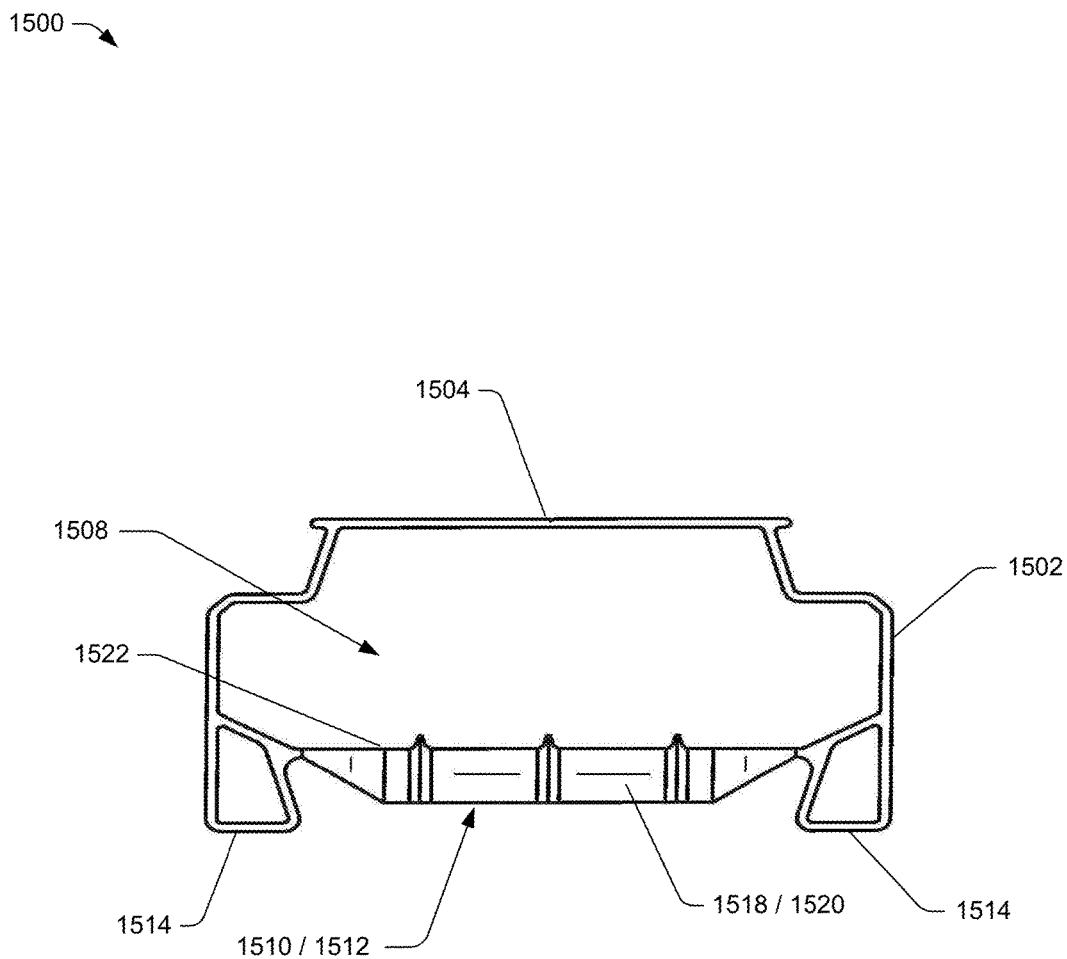

The growing trough 1202 may include at least one protrusion 1206 at one or both sides of each end, as further described herein with respect to FIG. 15-2. The protrusion 1206 may removably engage with the stopper 1102 so as to maintain a gap with the cover 1106. For example, to prevent accumulation of liquid solution within the interior of the growing trough 1202, and for the liquid solution to flow out of the growing trough 1202, a gap or spacing may be formed when the protrusion engages or contacts with the stopper 1102.

Figures 1, 13:
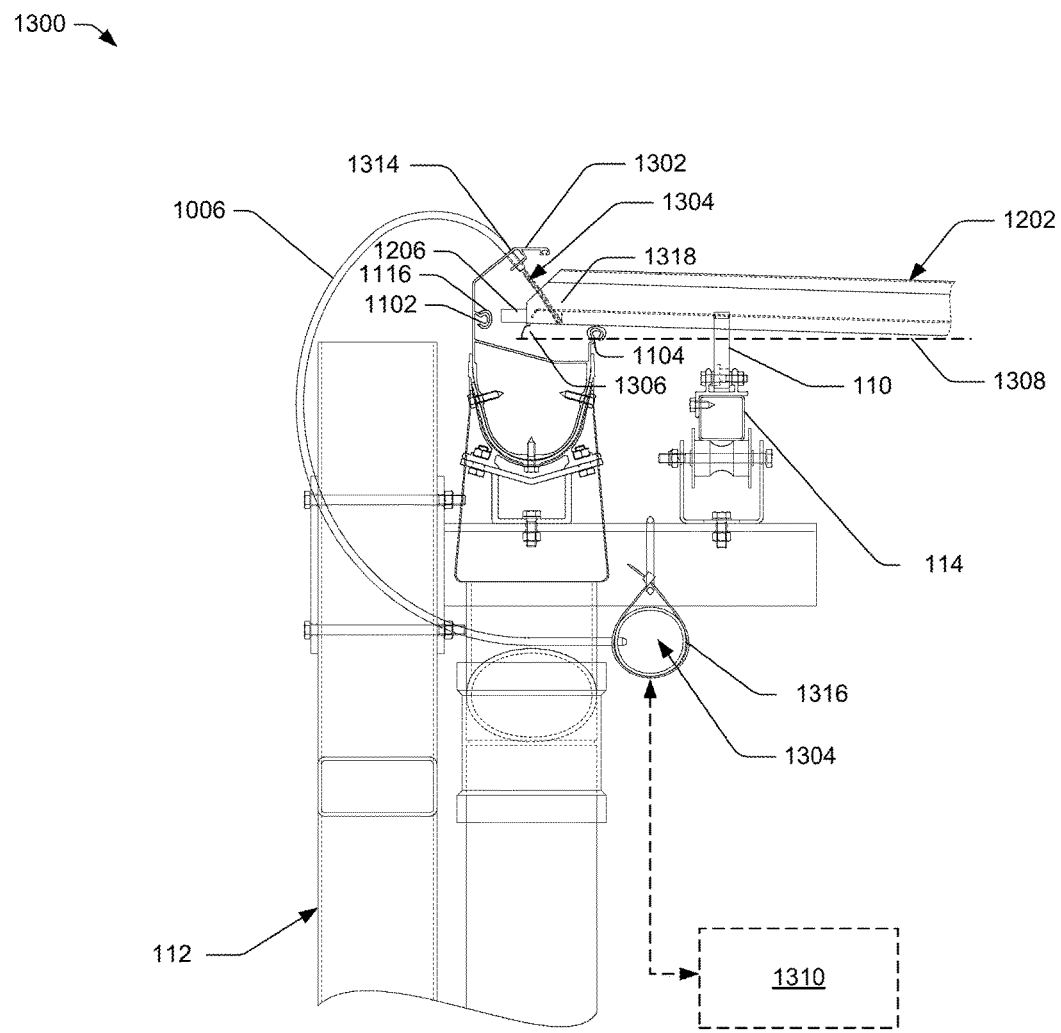
Figures 2, 13:
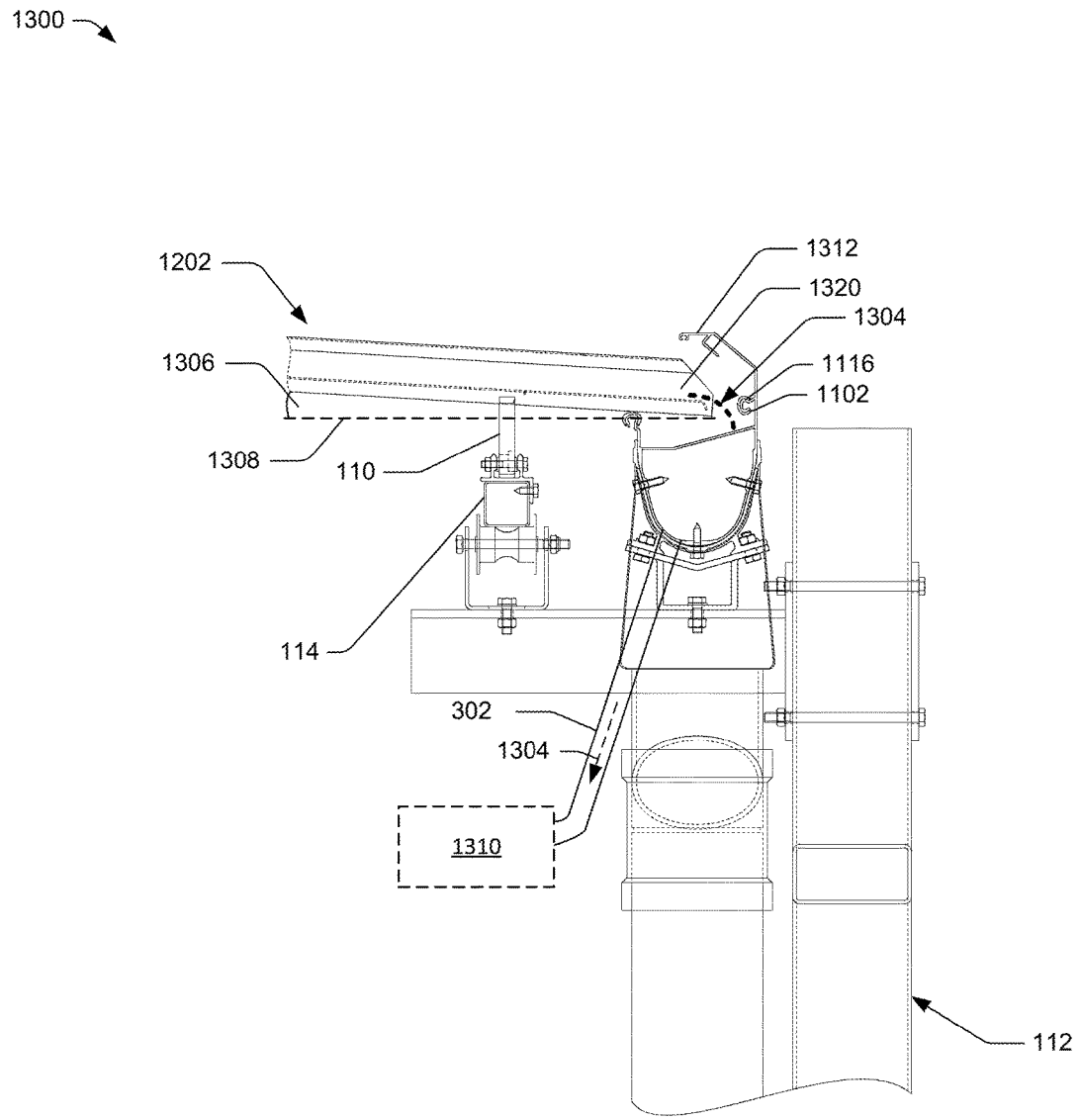

FIG. 13-1 is a schematic diagram of a gutter assembly 1300 including a first gutter 1302 supporting at least one growing trough 1202 within the hydroponic growing system 100. For example, the gutter assembly 1300 may be the same as or similar to the gutter assembly 106. Further, the gutter 1302 may be the same as or similar to gutter 1100. The gutter assembly 1300 may be removably attached to the base 112 of the hydroponic growing system 100. In some implementations, the gutter 1302 may be configured or disposed at an angle 1306 with respect to a horizontal axis 1308. That is, the gutter assembly 1300 may arrange the gutter 1302 at an angle such that the growing trough 1202, when placed or shifted along the hydroponic growing system 100 by the at least one engagement device 110 supported by the elongated member 114, to a position adjacent to at least one tubing member 1006, may be at a corresponding angle to allow the liquid solution 1304 that is injected or provided into the growing trough 1202 to flow from one side to an opposite side of the growing trough 1202.

The gutter assembly 1300 may include the gutter 1302 having at least one tubing member 1006 removably attached to the cover 1106. Specifically, the gutter assembly 1300 may include the at least one tubing member 1006 removably attached to the gutter 1302 and configured to provide the liquid solution 1304 to the growing trough 1202 at a receiving end 1318. For instance, the cover 1106 may include an opening 1314 for receiving the at least one tubing member 1006. The at least one tubing member 1006 may be removably fixed to the cover 1106 at the opening 1314 via a fastener or securing member. In some implementations, the at least one tubing member 1006 may be aligned with the growing trough 1202 such that the liquid solution 1304 may be received within an interior of the growing trough 1202 at a receiving end 1318. In some implementations, the at least one tubing member 1006 may be positioned or removably attached at an angle with respect to a vertical axis such that the liquid solution 1304 is injected into the growing trough 1202 at a corresponding angle (e.g., so as to provide increased flow or flow velocity of the liquid solution 1304). Further, by removably fixing the at least one tubing member 1006 at an angle, the gutter 1302 may capture the liquid solution 1304 with or without the growing trough 1202 being supported by the support portion 1104. That is, the gutter 1302 may capture the liquid solution 1304 injected by the at least one tubing member 1006 when the growing trough 1202 is not present by the side of the gutter 1302 including the support portion 1104.

The gutter assembly 1300 may further include a nutrient module 1316 removably attached to the at least one tubing member 1006, and may be configured to pump or otherwise provide the liquid solution 1304 through the at least one tubing member 1006 to the growing trough 1202. Specifically, the nutrient module 1316 may be a liquid retaining component removably attached to the base 112 and including or connected to a pumping component configured to pump the liquid solution 1304 to the one or more growing troughs 102 including the growing trough 1202. In some implementations, the nutrient module 1316 in conjunction with the reservoir 1310 may pump the liquid solution 1304 through the at least one tubing member 1006. For example, the reservoir 1310 may pump or otherwise provide a form of liquid (e.g., water nutrient solution) to the nutrient module 1316 via an opened valve located between the nutrient module 1316 and the reservoir 1310. The nutrient module 1316 may then pump or provide the liquid solution 1304 through one or more tubing members including the at least one tubing member 1006.

In some implementations, a single tubing member may correspond to a single growing trough such that the single tubing member provides the liquid solution 1304 to a single growing trough at a given point in time. In some implementations, two or more tubing members may correspond to a single growing trough such that at least two tubing members provide a portion of the liquid solution 1304 to a single growing trough (e.g., one tubing member provides nutrients and another tubing member provides water). In some implementations, a single tubing member may correspond to two or more growing troughs such that a single tubing member is configured to provide the liquid solution 1304 to at least two growing troughs.

FIG. 13-2 is a schematic diagram of the gutter assembly 1300 including a gutter 1312 and the growing trough 1202 within the hydroponic growing system 100. Gutter 1312 may be arranged or configured at a different side of the gutter assembly 106 opposite the gutter 1302. Gutter 1312 may be the same as or similar to gutter 1302. However, in some implementations, the gutter 1312 may not have any tubing members as the gutter 1312 receives the liquid solution 1304 injected at the gutter 1302. In some implementations, the gutter 1312 may include fewer tubing members than the gutter 1302. As the growing trough 1202 may be arranged at an angle 1306 with respect to the horizontal axis 1308, the liquid solution 1304 may flow from one end of the growing trough 1202 to a drain end 1320, where it may exit or drain into the gutter 1312. The liquid solution 1304 may be guided into the reservoir 1310 via the drain component 302, which may be one or more pipes.

For example, the liquid solution 1304 may flow from a receiving end 1318 of the growing trough 1202 to a drain end 1320 where the liquid solution 1304, after passing through or coming in contact with roots of at least one plant, exits or drains from the growing trough 1202 and into the drain component 302. As such, the gutter assembly 1300 may allow for recycling of the byproducts (e.g., water or nutrients) of the liquid solution 1304. In particular, as the liquid solution 1304 drains into the gutter 1312 and subsequently into the reservoir 1310, the liquid solution 1304, which may be substantially water after the plants absorb at least some of the nutrients when passing through the growing trough 1202, may be treated and mixed with additional nutrients to form or reform the liquid solution 1304. The liquid solution 1304 including water and plant nutrients (e.g., including various elements) may be provided to or formed within the nutrient module 1316. As such, the hydroponic growing system 100 may recycle a substantial amount of water and/or nutrients as the unused or unabsorbed liquid solution 1304 is returned to a reservoir 1310 and reused as liquid solution 1304 for the plants.

In some implementations, the gutter assembly 106 may include at least a first gutter (e.g., gutter 1302) at one side of the hydroponic growing system 100 and a second gutter (e.g., gutter 1312) at or on an opposite side of the hydroponic growing system 100 (e.g., as shown in FIG. 1-1). For example, the first gutter (e.g., gutter 1302) may include at least the tubing members 1406, which may be configured to inject or provide the liquid solution 1304 at one end of each of the one or more growing troughs 102. The second gutter (e.g., gutter 1312) may not include any tubing members and instead receives the liquid solution 1304 as the liquid solution 1304 exits or discharges from the opposite end of each of the one or more growing troughs 102. That is, the second gutter (e.g., gutter 1312) may act as or correspond to a collection plane. In some implementations, an entire length of the gutter 1302 and/or gutter 1312 may include tubing members each arranged at a defined distance with respect to another tubing member (e.g., a direction of the length corresponding to the harvest direction 104).

Figure 14:
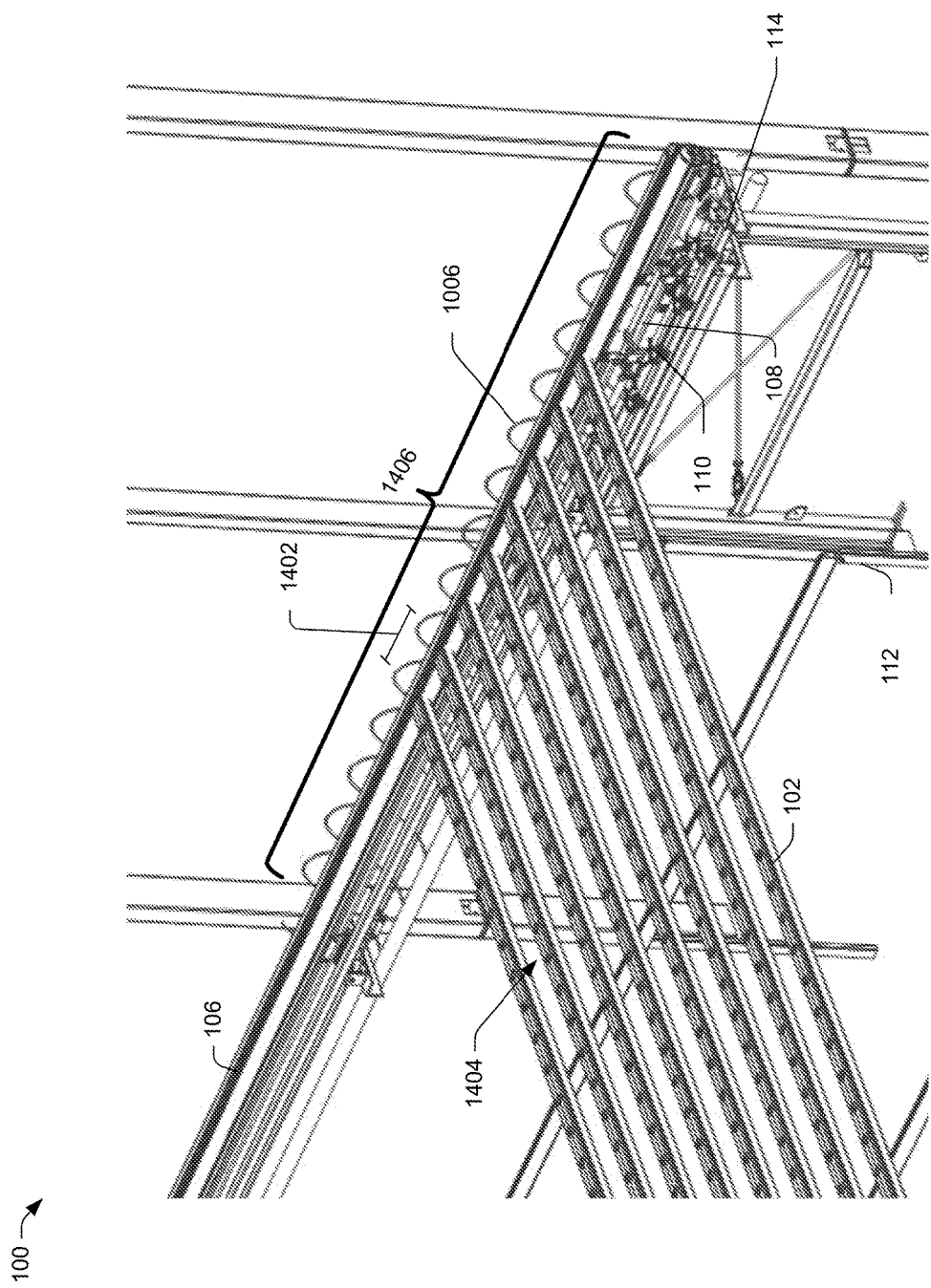
FIG. 14 is an enlarged perspective view of the hydroponic growing system showing some of one or more tubing members of the gutter assembly aligned with a corresponding one of the one or more growing troughs.

FIG. 14 is an enlarged perspective view of the hydroponic growing system 100 showing some of one or more tubing members 1406 of the gutter assembly 106 aligned with a corresponding one of the one or more growing troughs 102. As shown in FIG. 14, each tubing member of the one or more tubing members 1406 may be separated by a distance with respect to another tubing member. For example, a tubing member separation distance 1402 between a first tubing member and second tubing member may be the same as a growing trough separation distance 1404 between a first growing trough and second growing trough. As the one or more growing troughs 102 traverse the hydroponic growing system 100 in the harvest direction 104, they may be shifted to a position aligned with a respective tubing member. In some implementations, a first group or subset of tubing members of the one or more tubing members 1406 may be separated from each other at a first distance, and a second group or subset of tubing members of the one or more tubing members 1406 may be separated from each other at a second distance different or distinct from the first distance. For example, a separation distance between the one or more tubing members 1406 may increase towards the harvest direction 104. Hence, the separation or gap between the one or more tubing members 1406 may gradually increase as the one or more growing troughs 102 move in the harvest direction 104.

In some implementation, the one or more growing troughs 102 including the at least one growing trough 1202 may be arranged at an angle with respect to a support structure engaged with a base of the one or more growing troughs 102 such that the liquid solution flows from a first end portion a second end portion of each growing trough. The support structure may correspond to the gutter assembly 106. For example, the support structure may include the first gutter moveably engaged with a first underneath end portion of the at least one growing trough 1202 and a second gutter moveably engaged with the second underneath end portion of the at least one growing trough 1202. In some implementations, the one or more growing troughs 102, via a bottom portion of a base of each growing trough, may be configured to slide along the support structure in a direction perpendicular to a flow direction of the liquid solution 1304.

FIG. 15-1 is a perspective view of an example growing trough 1500 used in the hydroponic growing system 100. FIG. 15-2 is a top down view of the growing trough 1500. FIG. 15-3 is a front or back view of the growing trough 1500. In some implementations, the growing trough 1500 may be part of the one or more growing troughs 102. In some implementations, the growing trough 1500 may be the same as or similar to the at least one growing trough 1202.

The growing trough 1500 may include a base 1502 configured to provide structural support. The growing trough 1500 may further include a top cover portion 1504 connected to the base 1502 and including one or more openings 1506 each configured to receive, hold, and/or support at least one plant. The one or more openings 1506 may provide access to an interior 1508. The growing trough 1500 may include an underneath portion 1522. Specifically, the underneath portion 1522 may be an area forming a bottom exterior side of the base 1502. The growing trough 1500 may also include bottom edge or slope portions 1518 and 1520 on both sides and may not include the interior 1508 (e.g., which may be flat along a plane). For example, the bottom edge or slope portions 1518 and 1520 may be sloped downward to guide the liquid solution into a respective gutter of the gutter assembly 106.

In some implementations, a portion of the plant (e.g., bottom stem area) may be encapsulated in a soil pod. The top cover portion 1504 and the base 1502 may form the interior 1508 configured to support a flow of the liquid solution 1304. The interior 1508 may correspond to a hollow interior portion allowing a portion of the roots of the plants to be suspended and another portion contacting the underneath portion 1522 of the interior 1508 while the liquid solution 1304 travels from a first end 1510 to a second end 1512. In some implementations, each of the one or more openings 1506 may be or otherwise include a distinct or an identical geometrical shape, or a combination thereof. In some implementations, both ends of the growing trough 1500, being the first end 1510 and the second 1512, may be identical or distinct.

The first end 1510 of the base 1502 may provide access to the interior 1508 (e.g., for the at least one tubing member 1006 to inject the liquid solution 1304). Further, the second end 1512 of the base 1502 may be opposite the first end 1510 and also provides access to the interior 1508 (e.g., for allowing the liquid solution 1304 to drain or exit into a gutter such as gutter 1312). The interior 1508 may include at least one ridge 1516 configured to disperse, spread and/or distribute the flow of the liquid water solution along a width of a bottom of the interior 1508 of the growing trough 1500 so as to mitigate a concentration of flow of the liquid solution to a particular location or side of the interior 1508. For example, the at least one ridge 1516 may extend from the opening of the first end 1510 to the opening of the second end 1512. In some implementations, the at least one ridge 1516 may be uniform or distinct in height and/or size compared to another ridge. In some implementations, the at least one ridge 1516 may be arranged in a uniform or non-uniform pattern to direct the flow of the liquid solution along the bottom of the interior 1508 of the growing trough 1500.

The growing trough 1500 may be movable along a direction perpendicular to a flow direction of the liquid solution within the interior portion 1508. The opening of the first end 1510 and the second end 1512 may be perpendicular to and/or on a different plane with respect to the one or more openings 1506 of the top cover portion 1504 (e.g., the first end 1508 and the second end 1512 correspond to the y-plane and the one or more openings 1506 correspond to the x-plane). The base 1502 may include at least two elongated support members 1514 each located at opposite edges of the base 1502, and at one or both of the first end 1510 and/or second end 1512. In some implementations, each of the at least two elongated support members 1514 may include a respective protrusion 1206, where one or both of the first end 1510 and/or the second end 1512 may include the at least two elongated support members 1514.

In some implementations, one of the at least two elongated support members 1514 may be configured to contact and/or engage at least one engagement device 110 moving between a first position in front of or at one side of a growing trough 1500 to a second position behind or at another side of the growing trough 1500. The contact may occur when the at least one engagement device 110 moves from a first position to a second position while the growing trough 1500 maintains a position during the contact. The contact may occur when the at least one engagement device 110 moves from the second position toward the first position while the growing trough 1500 moves in a direction of the first position. In some implementations, the growing trough 1500 may stack with another growing trough such that the top cover portion 1504 of the growing trough 1500 engages with a bottom portion of a base of the other growing trough. In some implementations, the growing trough 1500 may be formed of a plastic material, a metal material (e.g., aluminum), and/or a composite material.

Figures 1, 16:
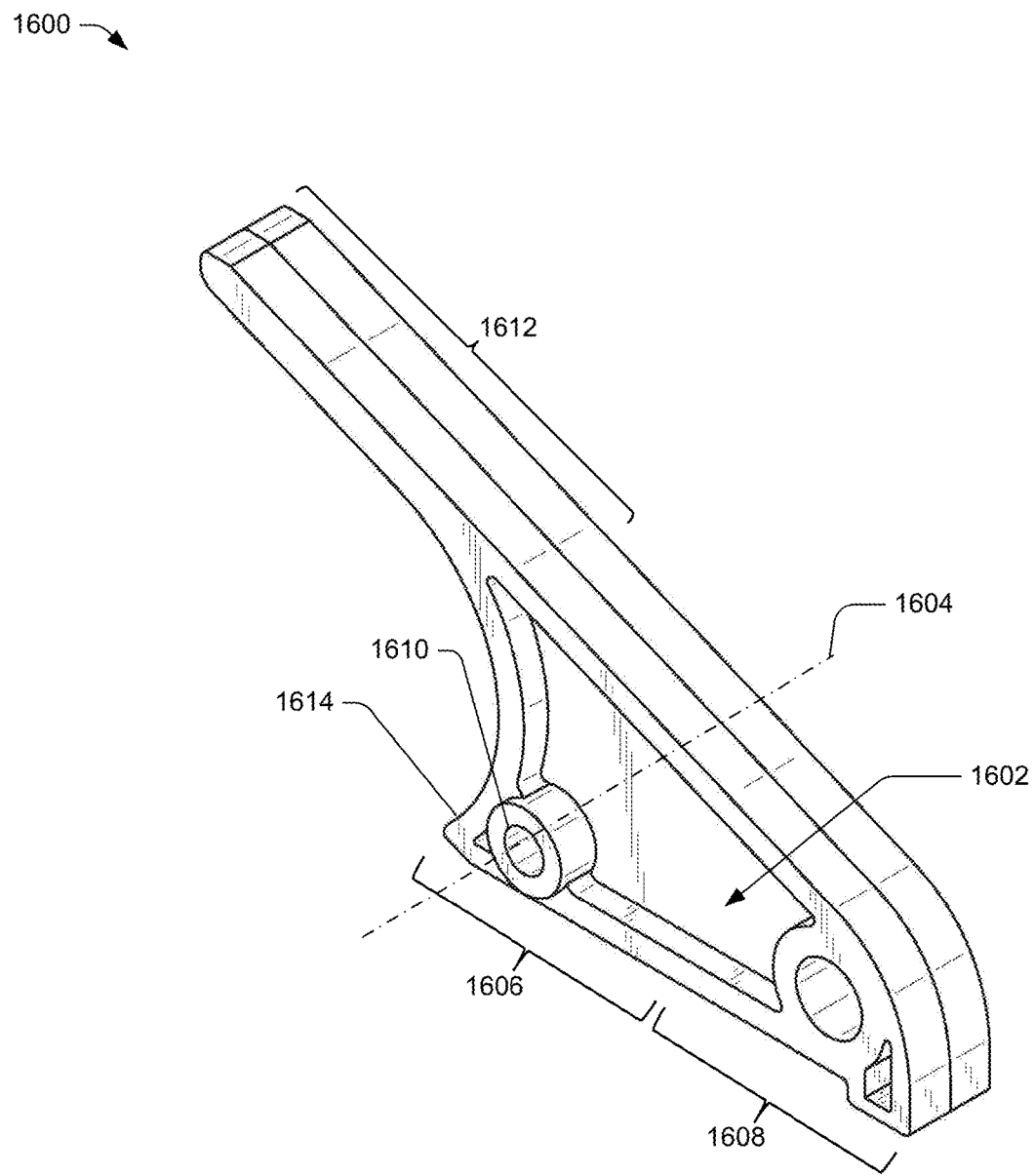
Figures 2, 16:
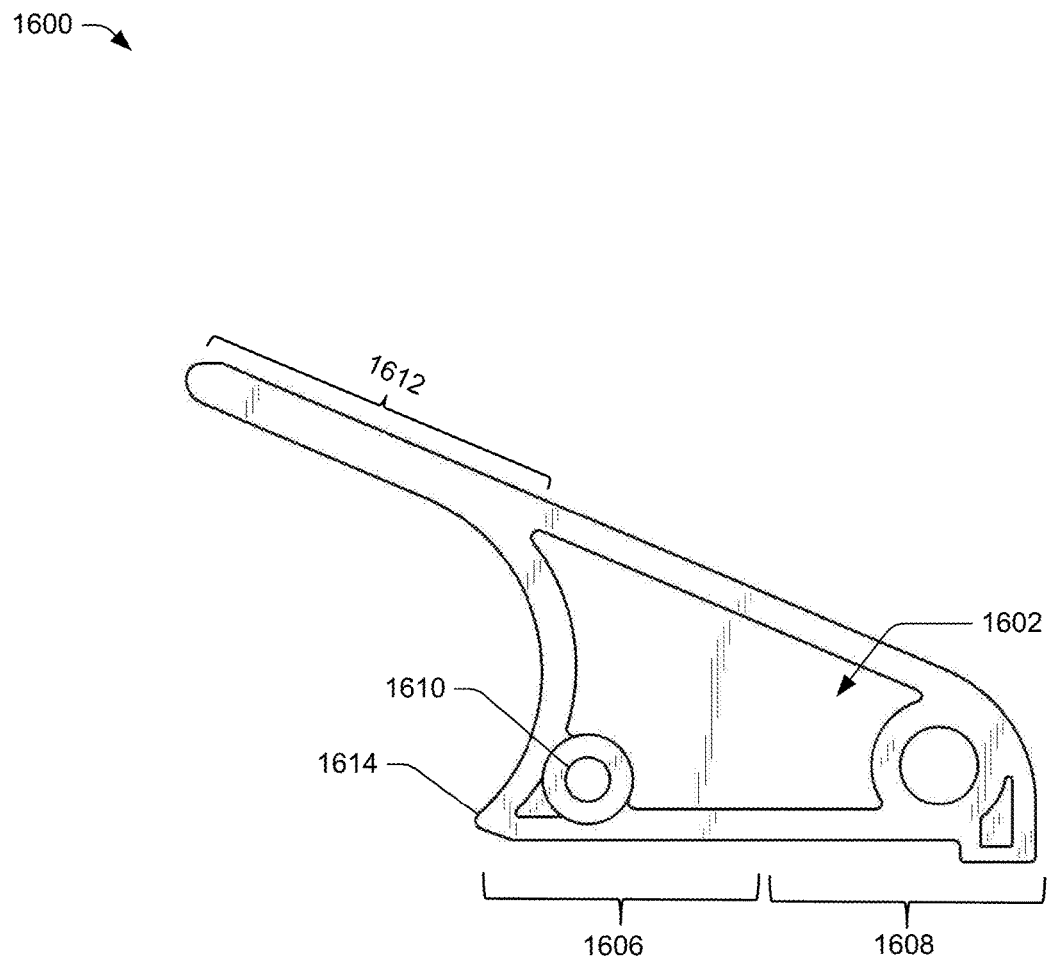

FIG. 16-1 is a perspective view of an engagement device 1600 configured to move a growing trough such as the one or more growing troughs 102 within the hydroponic growing system 100. FIG. 16-2 is a side view of the engagement device 1600. In some implementations, the engagement device 1600 may be the same as or similar to the at least one engagement device 110.

The engagement device 1600 may include a base 1602 configured to rotate about an axis 1604. The engagement device 1600 may further include a first portion 1606 of the base 1602 including a pivot member 1610 configured to engage with a securing component to rotate the base about an axis 1604, which may be a horizontal axis. In some implementations, the securing component may correspond to a rod or shaft having a geometrical shape such as, but not limited to a cylindrical shape removably attached to the pivot member 1610. Furthermore, the first portion 1606 may have or otherwise be of a first weight or mass.

The engagement device 1600 may also include a second portion 1608 of the base weighted greater than the first portion 1606 of the base and configured to apply a constant weighted force on the base so as to maintain a resting position/state based on an application of a force on the second portion 1608. That is, because the second portion 1608 of the base is weighted greater than the first portion 1606 (e.g., the weight/mass of the second portion 1608 is greater than the first portion 1606), without a constant force applied to engagement device. The engagement device 1600 may include a restrictor 1614 to restrict the rotation to a defined angle. In particular, upon reaching the defined angle, the restrictor 1614 may prevent further rotation of the engagement device 1600 by engaging with a surface of the elongated member 114. In some implementations, the second portion 1608 may or may not be in contact with the elongated member 114 when in a resting position/state. The engagement device 1600 may include capture member 1612 that extends from the base 1602. The capture member 1612 may be configured to contact and/or engage with at least one growing trough 1500 during at least one of two movement events.

For example, a first movement event may include moving or shifting the engagement device 1600 in a first direction opposite the harvest direction 104 causing the capture member 1612 to slide along or underneath a base 1502 of growing trough 1500. In some implementations, the sliding of the capture member 1612 may cause the pivot member 1610 to rotate downwards about the axis 1604 as the capture member 1612 slidably contacts the base 1502 of the growing trough 1500 (e.g., while the growing trough 1500 maintains a resting or non-moving position). Accordingly, rotating the pivot member 1610 may cause the second portion 1608 to rotate in an upward direction about the axis 1604.

Further, the rotation of the engagement device 1600 about the axis 1604 in the downward direction may not exceed a maximum downward rotation threshold configured to enable the second portion 1608 of the base 1602 to return to the resting position/state. That is, to prevent or mitigate the engagement device 1600 from rotating to a point where the weight or mass of the second portion 1608 effectively flips the engagement device below the axis 1604 (e.g., or another axis running perpendicular to the axis 1604). In some implementations, the maximum downward rotation threshold may correspond to a permitted maximum rotation angle of the engagement device 1600 with respect to the axis 1604. In some implementations the maximum rotation angle may be an angle at which the restrictor 1614 prevents further rotation of the engagement device 1600 about the axis 1604.

For example, a second movement event may include moving or shifting the engagement device 1600 in a second direction (e.g., the harvest direction 104) causing the capture member 1612 to engage or contact a portion of the base 1502 of the growing trough 1500 to apply an engagement force on the base 1502 of the growing trough 1500 so as to move the growing trough 1500 from an initial position to a subsequent position towards the harvest direction 104. In some implementations, the engagement force may prevent the pivot member 1610 from rotating about the axis 1604. In some implementations, a bottom surface of the second portion 1608 of the base 1602 may be configured to maintain the resting position/state while the engagement device 1600 is moved or moving in the direction along the harvest direction 104. In some implementations, a bottom surface of the second portion 1608 of the base 1602 may be configured in an elevated or raised position such that the second portion 1608 is not contacting the elongated member 114 while the engagement device 1600 is moved or moving the growing trough 1500 in the harvest direction 104.

The pivot member 1610 may removably attach the engagement device 1600 to an elongated member 114 via the same or different securing component. In some implementations, the elongated member 114 may be configured to move or shift the engagement device 1600 in at least one of a first direction backwards and underneath the base 1502 of the growing trough 1500 (e.g., and opposite the harvest direction 104), or a second direction along the harvest direction 104 and opposite the first direction (e.g. so as to shift the growing trough 1500 forward towards the harvest direction 104).

Further, the engagement device may be moved from the first position towards the growing trough 1500 located at the second position such that the capture member 1612 slides along the base 1502 of the growing trough 1500. In some implementations, moving in the second direction may include moving the engagement device 1600 towards the first position such that the capture member 1612 engages the base 1502 of the growing trough 1500 to move the at least one trough towards the first position (e.g., starting position of the engagement device 1600 prior to shifting towards the growing trough 1500). In some implementations, the engagement device 1600 may be configured to sequentially move in the first direction and then the second direction, where the second direction may correspond to a harvest direction 104. In some implementations, the resting position/state may correspond to a bottom surface of the second portion 1608 of the base 1602 contacting a surface of the elongated member 114. In some implementations, the resting position/state may correspond to a position underneath and proximate one of the at least two elongated support members 1514 of the growing trough 1500 following the second movement event.

Figure 17:
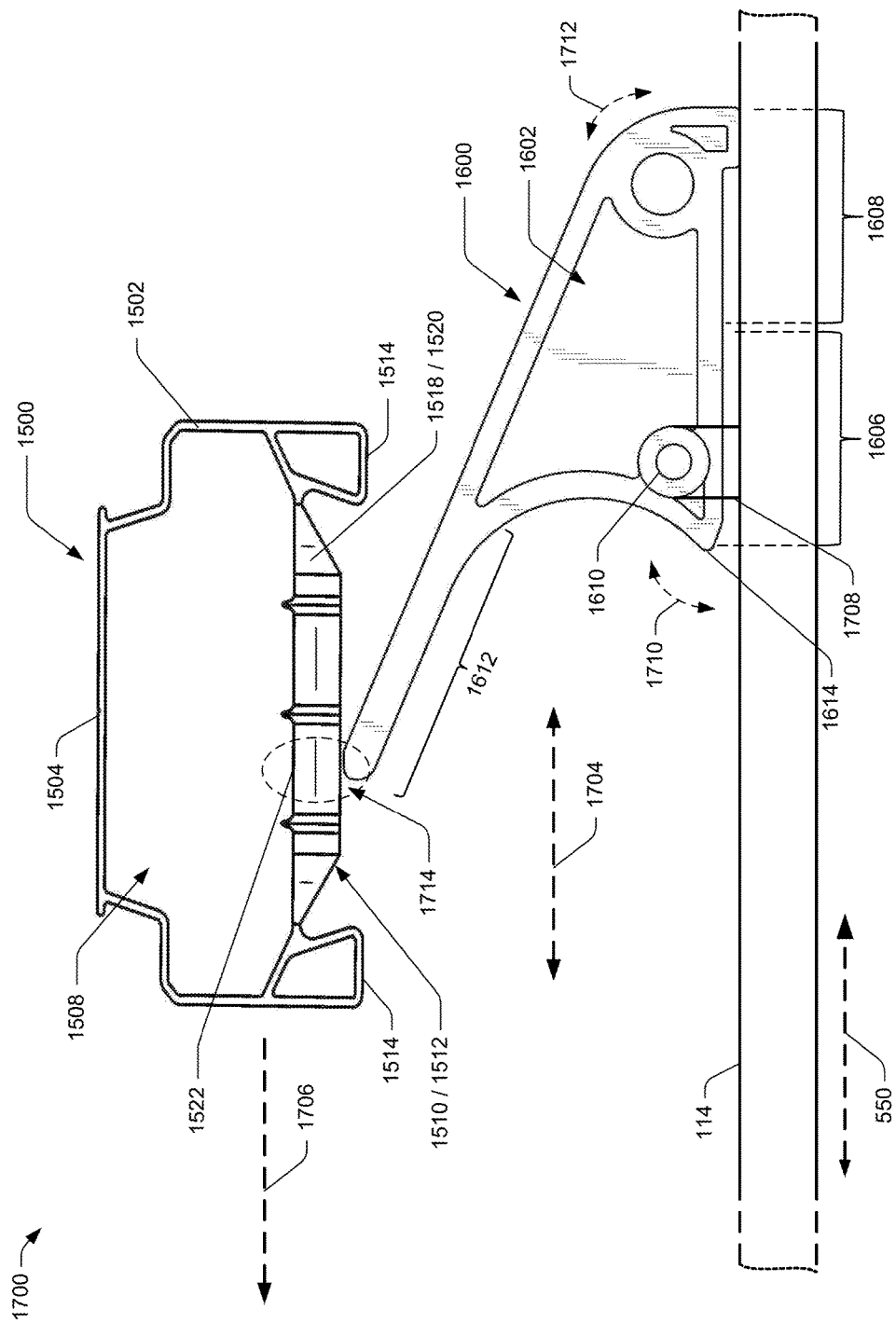
FIGS. 17 to 23 are schematic diagrams of the engagement device engaging with and moving the growing trough in a direction along an axis.

FIG. 17 depicts a schematic view 1700 of an engagement device, such as engagement device 1600, engaging with a growing trough, such as growing trough 1500 1600 in accordance with one or more implementations. Generally, the view 1700 depicted in FIG. 17 represents the engagement device 1600 supported by the elongated member 114 in a second member position, such as the position 2102 depicted in FIG. 21, engaging with the growing trough 1500 that is slidably engaged with a gutter assembly (not shown), such as the gutter assembly 106. The schematic view illustrates the interaction between the engagement device 1600 and the growing trough 1500 with various other components of the hydroponic growing system 100, including the elongated member 114, and the securing component 1708. As described herein, the hydroponic growing system 100 may include the automation assembly 108, which may be configured movably engage with one or more growing troughs 102, such as the growing trough 1500, by automatically moving one or more growing troughs 102, such as the growing trough 1500, from a first position on the gutter assembly 106 to a second position on the gutter assembly 106.

According to various implementations, the automation assembly 108 engages with the one or more growing troughs 102 by moving an elongated member 114 supporting one or more engagement devices, such as the engagement device 1600, between a first member position and a second member position. For instance, the shaft 408 of the automation assembly 108 can be attached to the elongated member 114 to enable movement of the elongated member 114 between a first member position and a second member position. Moreover, as will be explained in detail below, the engagement device 1600 may engage with the growing trough 1500 as the actuator component 402 is triggered by the automation component 410.

As illustrated, the elongated member 114 supports one or more engagement devices 1600. A variety of different configurations can be employed for attaching an engagement device 1600 to the elongated member 114 in accordance with various implementations. For instance, in this implementation, the pivot member 1610 of the engagement device 1600 removably attaches to the elongated member 114 via the securing component 1708 allowing for rotation of the base 1602 about the axis 1604.

As illustrated in this implementation, the elongated member 114 may move in directions 550 between a first member position and a second member position. As shown, the engagement device 1600 is removably attached to the elongated member 114 via the securing component 1708, and moves between the first member position and the second member position along with the elongated member 114 in directions 1704. Notice that as the elongated member 114 moves in directions 550, the engagement device 1600 simultaneously moves in directions 1704, and include a relatively same amount of displacement from their original positions.

As described herein, the support members 1514 that slidably engage with the gutter assembly 106 extend lower than the base 1502 of the growing trough 1500. Accordingly, when the engagement device 1600 moves from the first member position to the second member position, the capture member 1612 engages with at least one of the support members 1514 such that base 1602 rotates 1710/1712 about the axis 1604. For instance, rotating the pivot member 1610 causes the first portion 1606 of the base 1602 and the capture member 1612 to rotate in a downward direction about the axis 1604 and causes the second portion 1608 to rotate in an upward direction about the axis 1604.

In an implementation, the engagement between the capture member 1612 and at least one of the support members 1514 ceases as the engagement device 1600 moves towards the second member position. For instance, the second portion 1608 of the base 1602 is weighted greater than the first portion 1606 of the base 1602. The second portion 1608 is configured to apply a constant weighted force on the base 1602 so as to maintain a resting position based on an application of the weighted force on the second portion 1608. As further detailed below, once the engagement between the capture member 1612 and at least one of the support member s1514 ceases the first portion 1606 of the base 1602 and the capture member 1612 to rotate in an upward direction about the axis 1604 and the second portion 1608 rotates in a downward direction about the axis 1604 based on the weighted force on the second portion 1608.

Accordingly, the engagement device 1600 engages with the growing trough 1500 such that the engagement device 1600 slidably engages 1714 with the underneath portion 1522 of the growing trough 1500. The growing trough 1500 may be configured such that the capture member 1612 of the engagement device 1600 contacts the underneath portion 1522 of the growing trough 1500 without disturbing the position of the growing trough 1500 on the gutter assembly 106. Although the capture member 1612 is shown engaging with the slope portions 1518 and/or 1520, it should be noted that the capture member 1612 may be configured to engage with the underneath portion 1522 of the growing trough 1500. Accordingly, when the elongated member 114 and the engagement device 1600 move from the first member position to the second member position, the engagement device 1600 interacts with the growing trough 1500 in such a way so as to not disturb and/or alter the position of the growing trough 1500 on the gutter assembly 106. That is, the growing trough 1500 maintains a resting position as the capture member 1612 slides along the underneath portion 1522.

In an implementation, the engagement device 1600 engages with the growing trough 1500 such that the growing trough 1500 may move in direction 1706. For instance, when elongated member 114 moves from the second member position to the first member position, the engagement device 1600 simultaneous moves from the second member position to the first member position, which in turn, causes the capture member 1612 to engage with one of the support members 1514 and/or the underneath portion 1522 of the growing trough 1500. As further detailed below, the engagement device 1600 and/or the capture member 1612 applies an engagement force on at least one of the support members 1514 and/or the underneath portion 1522 of the growing trough 1500 to move the growing trough 1500 from a first position to a second position in direction 1706.

Figure 18:
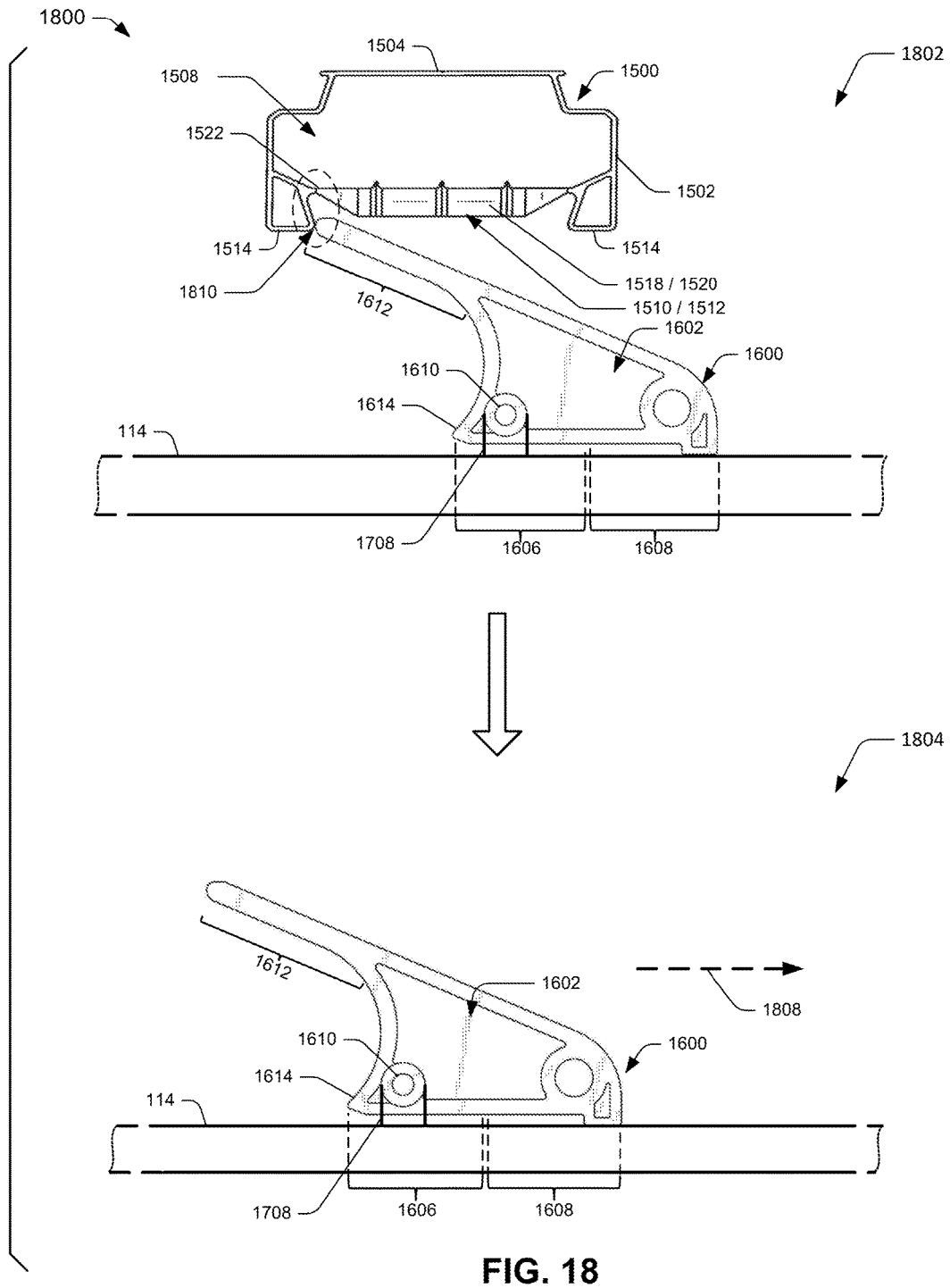

FIG. 18 depicts schematic views in an implementation scenario for removing a trough and moving an engagement device in accordance with one or more implementations. The depictions of the growing trough 1500 and the engagement device 1600 in the scenario 1800 show a schematic view of the growing trough 1500 and the engagement device 1600.

In scenario 1800, the engagement device 1600 begins moving in direction 1808 from the position 1802 to the position 1808 after the growing trough 1500 is removed. For instance, the growing trough 1500 may be located at or towards the front of the hydroponic growing system 100. Accordingly, the one or more plants on the growing trough 1500 may be ready for harvesting. Further, both the growing trough 1500 and the engagement device 1600 may be in a resting state, such that there is no (or minimal) force being applied at the point of contact 1810 by the capture member 1612 to at least one of the support members 1514. Although the capture member 1612 is shown engaging with at least one of the support members 1514 below the slope portions 1518 and/or 1520, it should be noted that the capture member 1612 may be configured to engage with the underneath portion 1522 of growing trough 1500. For example, the capture member 1612 may be configured at a length that enables it to reach the underneath portion 1522, such that the point of contact 1810 is located at a point on the underneath portion 1522 (e.g., within the dotted oval).

In various implementations, as described herein, the harvest determination component 530 may monitor the one or more plants on the growing trough 1500 and/or determine to prompt the automated triggering component 520 to transmit the triggering signal to the automation assembly 108. The hydroponic growing system 100 may include one or more mechanisms to automatically remove the growing trough 1500 from the gutter assembly 106, such as, but not limited to, an electromechanical device (e.g., robotic arm) that clasps and/or engages at least one growing trough of the one or more growing troughs 102 and lifts and/or removes the at least one growing trough of the one or more growing troughs 102 from the gutter assembly 106 of the hydroponic growing system 100. In another implementation, the growing trough 1500 may be manually removed from the gutter assembly 106. Moreover, as described herein, the automated triggering component 520 may determine that the growing trough 1500 is removed from the hydroponic growing system 100, and transmit the triggering signal to the automation assembly 108 to automatically move the growing trough 1500' to the previous position of the growing trough 1500 before it was removed. As mentioned above, the movements of the elongated member 114 and the engagement device 1600 occur simultaneously, and include a relatively same amount of displacement from their original positions.

In an implementation, the automation component 410 of the automation assembly 108 may be configured to trigger the actuator component 402 to move the elongated member 114 between the first member position and the second member position. Accordingly, as the elongated member 114 moves from the first member position, such as position 1802, towards the second member position, the engagement device 1600 moves in direction 1808. As illustrated, the engagement device 1600 is supported by the elongated member 114. For instance, the pivot member 1610 of the engagement device 1600 removably attaches to the elongated member 114 via the securing component 1708 allowing for rotation of the base 1602 about the axis 1604.

During movement of the engagement device 1600, the second portion 1608 of the base 1602 maintains the resting state. For instance, since the second portion 1608 of the base 1602 is weighted greater than the first portion 1606 of the base 1602, a constant weight force is being applied so as to maintain the resting state (i.e., no rotation occurs about the axis 1604).

Figure 19:
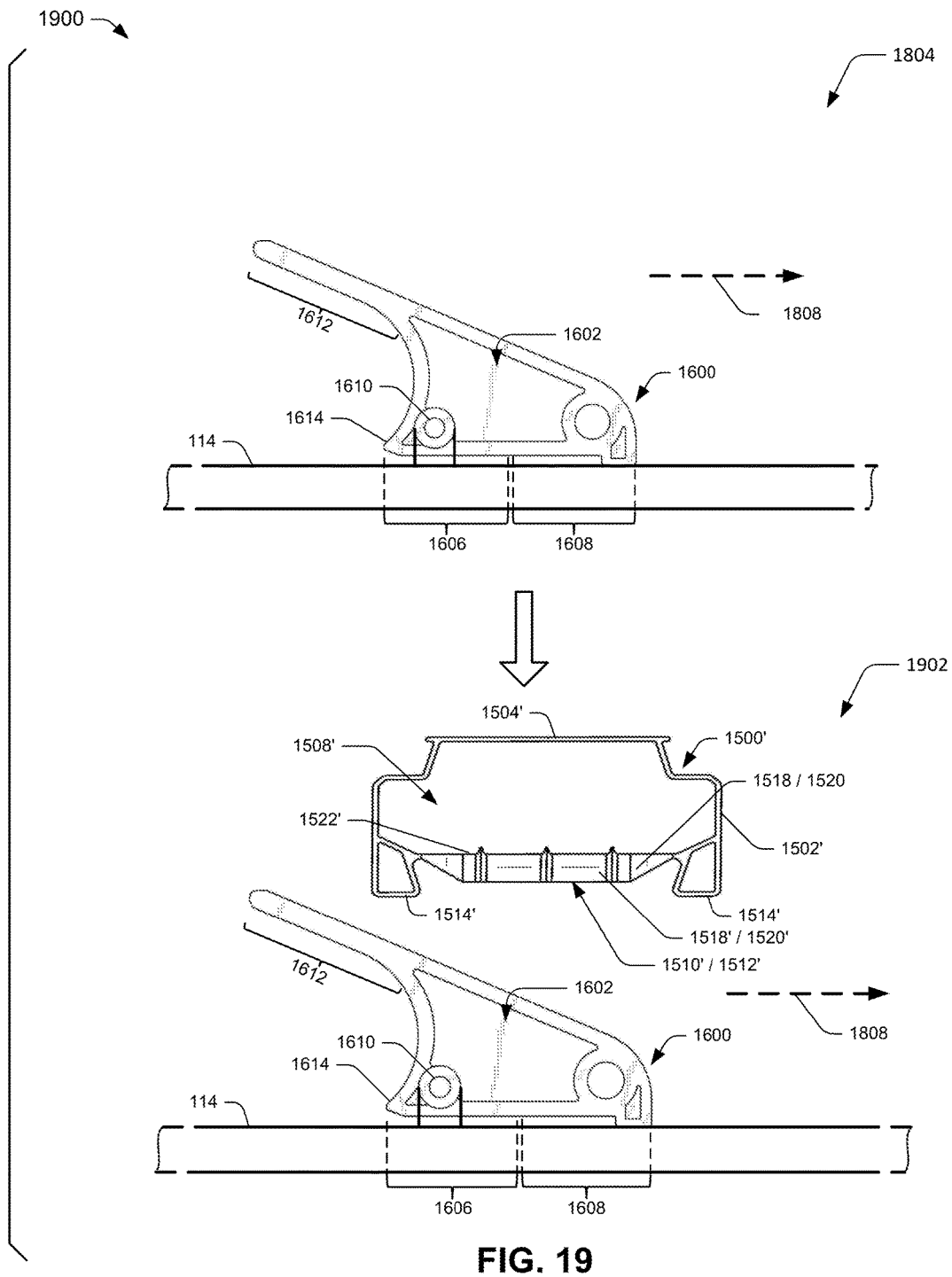

FIG. 19 depicts an implementation scenario 1900 for further movement of the engagement device 1600 in accordance with one or more implementations. The depictions of the growing trough 1500' and the engagement device 1600 in the scenario 1900 show a schematic view of the growing trough 1500' and the engagement device 1600. In at least some implementations, the scenario 1900 represents a continuation of the scenario 1800, described above.

In the scenario 1900, the engagement device 1600 further moves in direction 1808 from the position 1804, introduced above with reference to FIG. 18, to the position 1902. As the elongated member 114 further moves towards the second member position, the engagement device 1600 further moves in direction 1808.

During movement of the engagement device 1600 in scenario 1900, the engagement device 1600 approaches the growing trough 1500', as depicted in position 1902. For instance, the growing trough 1500' may be located on the gutter assembly 106 next to the growing trough 1500 prior to the removal of the growing trough 1500 from the gutter assembly 106 and/or the hydroponic growing system 100. Accordingly, after removal of the growing trough 1500 in scenario 1800, the growing trough 1500' is to be moved to the position on the gutter assembly 106 previously situated by the growing trough 1500.

As illustrated, during movement of the engagement device 1600, the second portion 1608 of the base 1602 maintains the resting state. For instance, since the second portion 1608 of the base 1602 is weighted greater than the first portion 1606 of the base 1602, a constant weight force is being applied so as to maintain the resting state (i.e., no rotation occurs about axis 1604).

Figure 20:
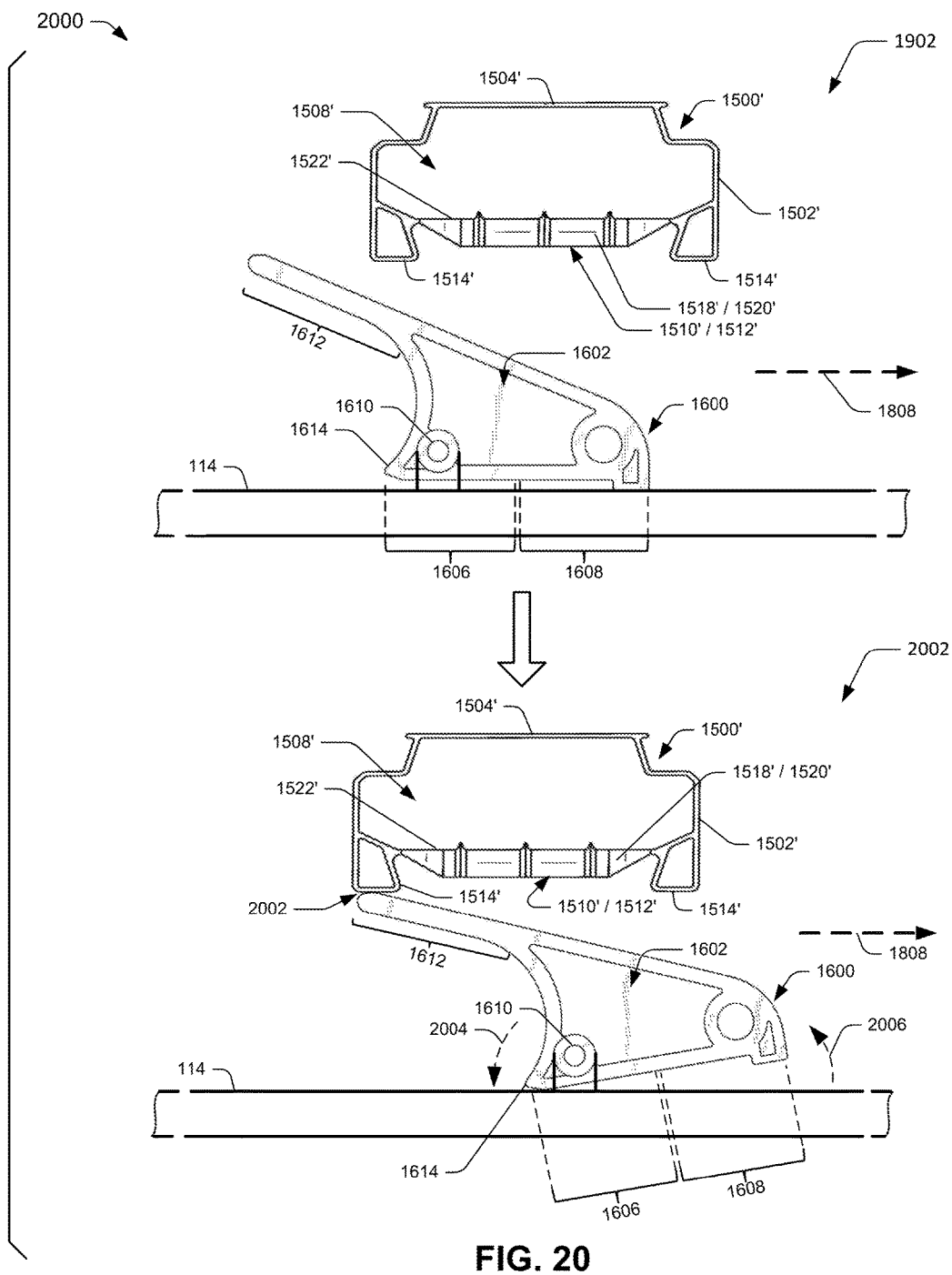

FIG. 20 depicts an implementation scenario 2000 for further movement of the engagement device 1600 and engagement with the growing trough 1500' in accordance with one or more implementations. The depictions of the growing trough 1500' and the engagement device 1600 in the scenario 2000 show a schematic view of the growing trough 1500' and the engagement device 1600. In at least some implementations, the scenario 2000 represents a continuation of the scenario 1900, described above.

In the scenario 2000, the engagement device 1600 further moves in direction 1808 from the position 1902, introduced above with reference to FIG. 19, to the position 2002. As the elongated member 114 further moves towards the second member position, the engagement device 1600 further moves in direction 1808.

During movement of the engagement device 1600 in scenario 2000, the engagement device 1600 engages the growing trough 1500', as depicted in the position 2002. For instance, when the engagement device 1600 moves from the first member position to the second member position, the capture member 1612 engages with at least one of the support members 1514' such that the base 1602 rotates about the axis 1604. For instance, rotating the pivot member 1610 causes the first portion 1606 of the base 1602 and the capture member 1612 to rotate in a downward direction 2004 about the axis 1604 and causes the second portion 1608 to rotate in an upward direction 2006 about the axis 1604. In various implementations, rotating in the downward direction 2004 does not exceed a maximum downward rotation threshold configured to enable the second portion 1608 of the base 1602 to return to the resting state (i.e., no rotation occurs about the axis 1604). Moreover, rotating in the upward direction 2006, causes the second portion 1608 of the base 1602 to lift off of the elongated member 114.

Figure 21:
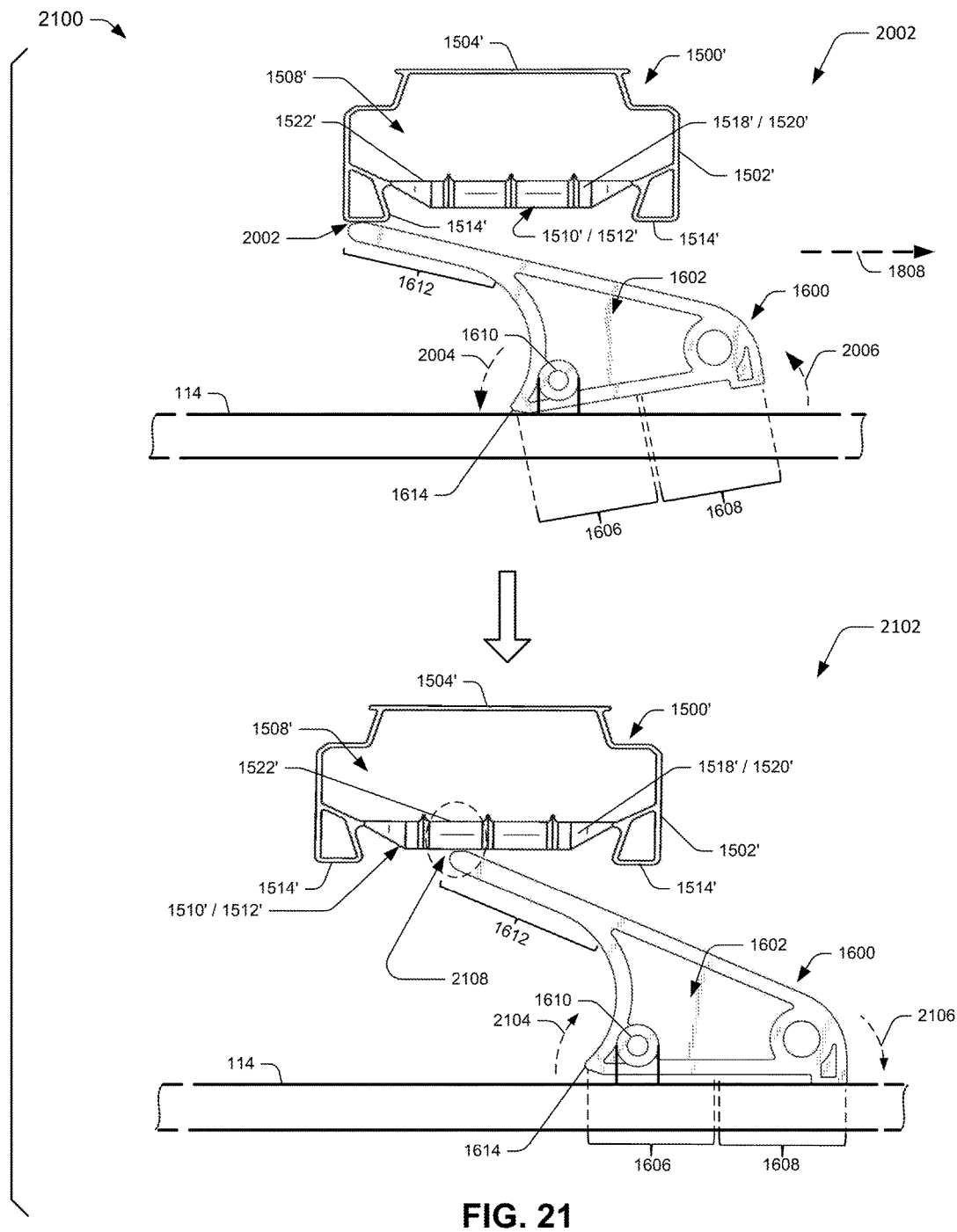

FIG. 21 depicts an implementation scenario 2100 for further movement of the engagement device 1600 and engagement with growing trough 1500' in accordance with one or more implementations. The depictions of the growing trough 1500' and the engagement device 1600 in the scenario 2100 show a schematic view of the growing trough 1500' and the engagement device 1600. In at least some implementations, the scenario 2100 represents a continuation of the scenario 2000, described above.

In the scenario 2100, the engagement device 1600 further moves in direction 1808 from the position 2002, introduced above with reference to FIG. 20, to the position 2102. As the elongated member 114 further moves towards the second member position, such the position 2102, the engagement device 1600 further moves in direction 1808.

During movement of the engagement device 1600 in scenario 2100, the engagement device 1600 engages the growing trough 1500', as depicted in position 2002. In particular, once the engagement between the capture member 1612 and at least one of the support members 1514 ceases as the engagement device 1600 moves in direction 1808, the engagement device 1600 returns to its resting position. For instance, the second portion 1608 of the base 1602 is weighted greater than the first portion 1606 of the base 1602. The second portion 1608 is configured to apply a constant weighted force on the base 1602 so as to maintain a resting position based on an application of the weighted force on the second portion 1608. As illustrated in the position 2102, once the engagement between the capture member 1612 and one of the support members 1514' ceases, the first portion 1606 of the base 1602 and the capture member 1612 to rotate in an upward direction 2104 about the axis 1604 and the second portion 1608 rotates in a downward direction 2106 about the axis 1604 based on the weighted force on the second portion 1608.

Accordingly, the engagement device 1600 engages with the growing trough 1500' such that the engagement device 1600 slidably engages 2108 with the growing trough 1500'. Growing trough 1500' may be configured such that the capture member 1612 of the engagement device 1600 contacts the base 1502' of the growing trough 1500' without disturbing the position of the growing trough 1500' on the gutter assembly 106. Although the capture member 1612 is shown engaging with the slope portions 1518' and/or 1520', it should be noted that the capture member 1612 may be configured to engage with the underneath portion 1522' of the growing trough 1500'. For example, the capture member 1612 may be configured at a length that enables it to reach the underneath portion 1522', such the engagement 2108 is located at a point on the underneath portion 1522' (e.g., within the dotted oval). Accordingly, when the elongated member 114 and the engagement device 1600 move from the first member position to the second member position, engagement device 1600 interacts with the growing trough 1500' in such a way so as to not disturb and/or alter the position of the growing trough 1500' on gutter assembly 106. That is, the growing trough 1500' maintains a resting position as the capture member 1612 either engages at least one of the support members 1514' and/or slides along the base 1502'.

Figure 22:
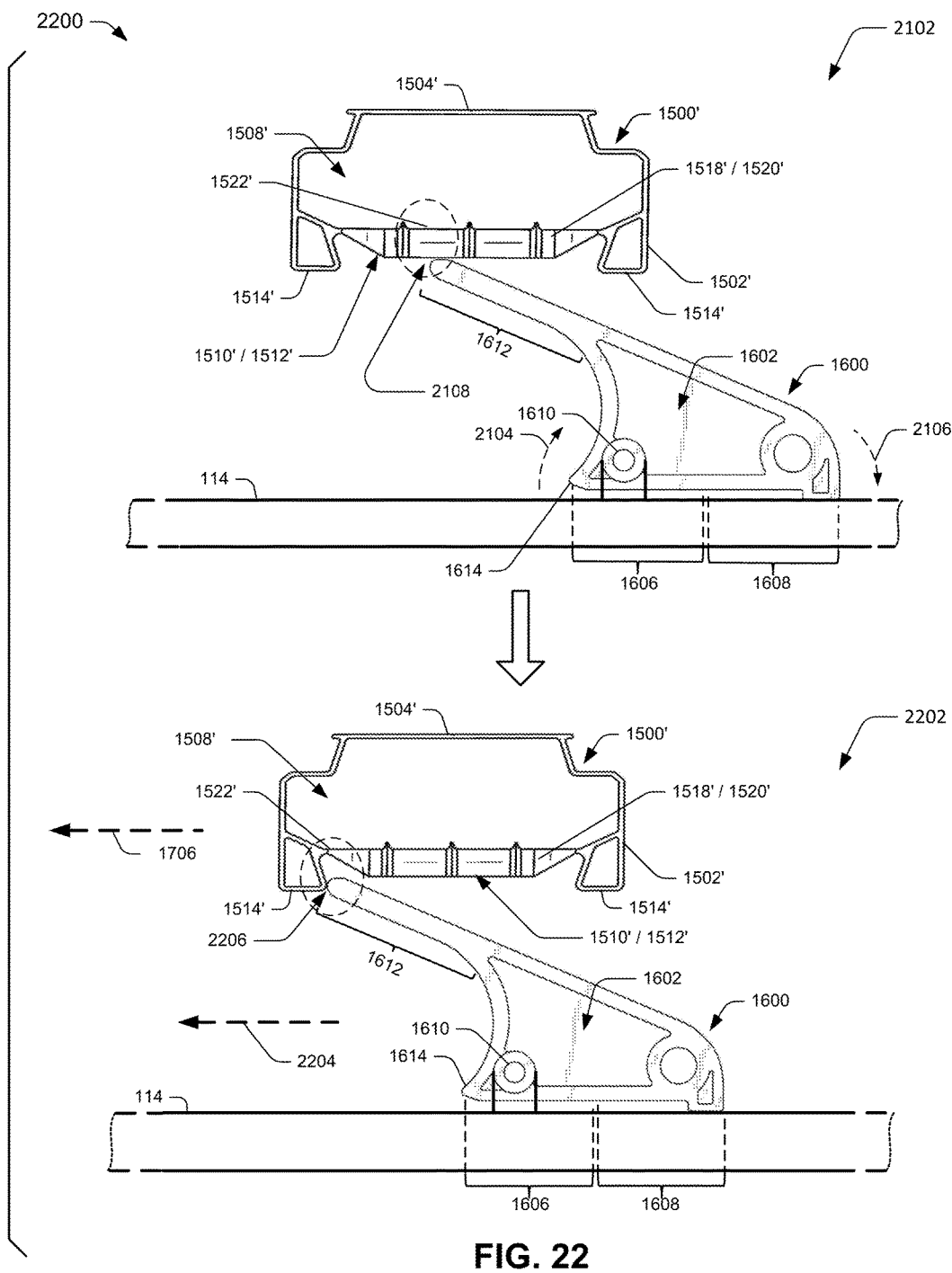

FIG. 22 depicts an example scenario 2200 for returning the engagement device 1600 to the first member position in accordance with one or more implementations. The scenario 2200, for instance, represents a scenario where the engagement device 1600 and the elongated member 114 move from the second member position, such as the position 2102, towards the first member position, such as the position 2202. The depictions of the growing trough 1500' and the engagement device 1600 in the scenario 2200 show a schematic view of growing trough 1500' and the engagement device 1600. In at least some implementations, the scenario 2200 represents a continuation of the scenario 2100, described above.

For instance, as described herein, the sensor component 404 is configured to cease movement of the actuator component 402 when the actuator component 402 satisfies a movement threshold representing a maximum displacement distance of the actuator component 402 during the movement. In various implementations, the maximum displacement distance corresponds to the elongated member 114 and the engagement device 1600 reaching the second member position, such as the position 2102. Accordingly, once the actuator component 402 satisfies a movement threshold, the actuator component 402 automatically returns to an original state corresponding to the first member position, which in turn moves the elongated member 114 and the engagement device 1600 back to the first member position.

During movement of the engagement device 1600 in scenario 2200, the engagement device 1600 engages the growing trough 1500', as depicted in the position 2202. In particular, engagement device 1600 engages with the growing trough 1500' such that engagement device 1600 slidably engages 2108 with the growing trough 1500'. For instance, the capture member 1612 of the engagement device 1600 contacts the base 1502' of the growing trough 1500' without disturbing the position of the growing trough 1500' on gutter assembly 106 as the elongated member 114 and the engagement device 1600 moves in direction 2204 towards the first member position. Although the capture member 1612 is shown engaging with the slope portions 1518' and/or 1520', it should be noted that the capture member 1612 may be configured to engage with the underneath portion 1522' of the growing trough 1500'. For example, the capture member 1612 may be configured at a length that enables it to reach the underneath portion 1522', such the engagement 2108 is located at a point on the underneath portion 1522' (e.g., within the dotted oval).

As illustrated, the engagement device 1600 engages with the growing trough 1500' such that the growing trough 1500' may move in direction 1706. For instance, when the elongated member 114 moves from the second member position to the first member position, the engagement device 1600 simultaneous moves from the second member position towards the first member position, which in turn, causes the capture member 1612 to engage 2206 with one of the support members 1514'. Although the capture member 1612 is shown engaging with at least one of the support members 1514' below the slope portions 1518' and/or 1520', it should be noted that the capture member 1612 may be configured to engage with the underneath portion 1522' of the growing trough 1500'. For example, the capture member 1612 may be configured at a length that enables it to reach the underneath portion 1522', such that the engagement 2206 is located at a point on the underneath portion 1522' (e.g., within the dotted oval). Accordingly, the engagement device 1600 and/or the capture member 1612 applies an engagement force on at least one of the support members 1514' of growing trough 1500' to move the growing trough 1500' from a first position to a second position in direction 1706.

Figure 23:
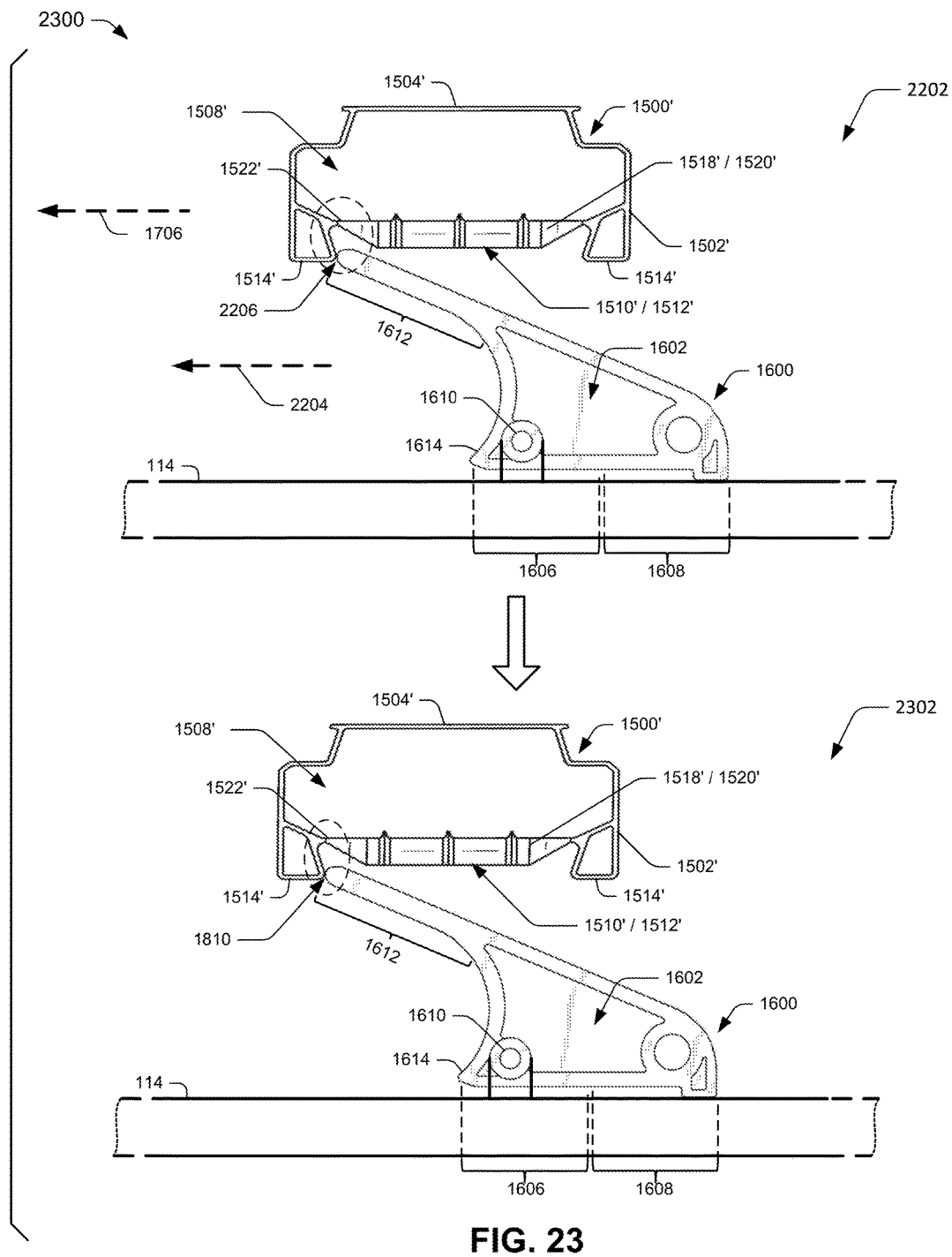

FIG. 23 depicts an implementation scenario 2300 for further movement of the engagement device 1600 and engagement with growing trough 1500' in accordance with one or more implementations. The depictions of the growing trough 1500' and the engagement device 1600 in the scenario 2300 show a schematic view of the growing trough 1500' and the engagement device 1600. In at least some implementations, the scenario 2300 represents a continuation of the scenario 2200, described above.

In the scenario 2300, the engagement device 1600 further moves in direction 2204 from the position 2202, introduced above with reference to FIG. 22, to the first member position, the position 2302. As the elongated member 114 further moves towards the first member position, such the position 2302, the engagement device 1600 further moves in direction 2204.

During movement of the engagement device 1600 in scenario 2100, the engagement device 1600 engages the growing trough 1500', as depicted in the position 2202. In particular, the capture member 1612 engages 2206 with one of support members 1514'. For instance, the engagement device 1600 and/or the capture member 1612 applies an engagement force on at least one of the support members 1514 of the growing trough 1500 to move the growing trough 1500 from a first position to a second position in direction 1706.

As illustrated, the engagement device 1600 engages with the growing trough 1500' until the engagement device 1600 reaches the first member position, such as the position 2302. For instance, when the actuator component 402 returns to the original state, the elongated member 114 and the engagement device 1600 have returned to the first member position and stop moving. As a result returning to the first member position, the engagement device 1600 no longer applies an engagement force on at least one of the support members 1514' large enough to alter the growing trough 1500' from its resting position on the gutter assembly 106. In various implementations, the capture member 1612 still maintains contact 1810 with at least one of the support members 1514'. Although the capture member 1612 is shown engaging with at least one of the support members 1514' below the slope portions 1518' and/or 1520', it should be noted that the capture member 1612 may be configured to engage with the underneath portion 1522' of the growing trough 1500'. For example, the capture member 1612 may be configured at a length that enables it to reach the underneath portion 1522', such that the contact 1810 is located at a point on the underneath portion 1522' (e.g., within the dotted oval). Moreover, in the position 2302, the growing trough 1500' is now located in the position on the gutter assembly 106 previously occupied by the growing trough 1500 before it was removed. Additionally, in the position 2302, the growing trough 1500' is at the front of the hydroponic growing system 100.

Referring to FIG. 24, for example, a method 2400 of moving at least one trough (e.g., growing trough 1500) in a hydroponic growing system 100 according to the implementations described herein facilitates efficient plant growth and/or harvest in accordance with one or more of the herein-defined actions.

At block 2402, the method 2400 may optionally receive, from at least one growing trough detection component, an indication representing a removal of at least one growing trough from a support portion of a gutter of the hydroponic growing system. For example, as described herein, the automation component 410 may receive, from the automated triggering component 520, an indication representing a removal of at least one growing trough of the one or more growing troughs 102 from a support portion 1104 of a gutter 1302 of the gutter assembly 106 within the hydroponic growing system 100.

At block 2404, the method 2400 may trigger, by an automation component, an actuator component to move at least one elongated member of the hydroponic growing system between a first member position and a second member position, the at least one elongated member supporting one or more engagement devices configured to engage with the at least one growing trough. For instance, as described herein, the automation component 410 may trigger an actuator component 402 to move or shift at least one elongated member 114 of the hydroponic growing system 100 between a first member position and a second member position, the at least one elongated member 114 supporting one or more engagement devices 110 configured to engage with the at least one growing trough (e.g., growing trough 1500). In some implementations, triggering the actuator component 402 to move the at least one elongated member 114 between the first member position and the second member position may include triggering the actuator component 402 in response to receiving the indication representing the removal of the at least one growing trough (e.g., growing trough 1500).

At block 2406, the method 2400 may move, by an actuator component, the at least one elongated member between the first member position and the second member position. For example, as described herein, the actuator component 402 may be configured to move the at least one elongated member 114 between the first member position and the second member position in response to receiving the indication representing the removal of the at least one growing trough (e.g., growing trough 1500).

Figure 25:
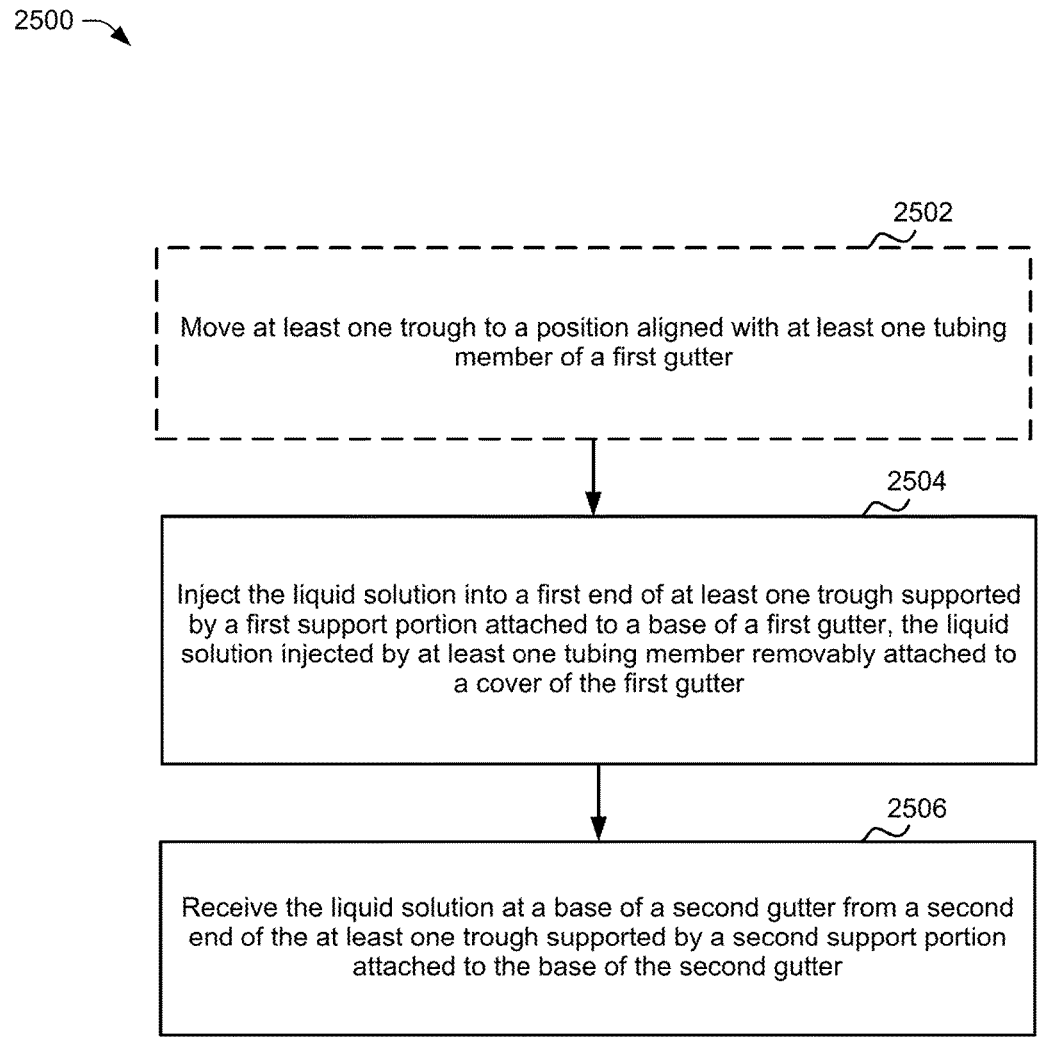
FIG. 25 is a flow diagram of an example of a method of moving at least one trough in the hydroponic growing system.

Referring to FIG. 25, for example, a method 2500 of managing flow of a liquid solution in a hydroponic growing system 100 according to the implementations described herein facilitates efficient plant growth and harvest in accordance with one or more of the herein-defined actions.

At block 2502, the method 2500 may move at least one trough to a position aligned with at least one tubing member of a first gutter. For example, as described herein, the automation assembly 108 may be configured to move at least one trough from the one or more growing troughs 102 to a position aligned with at least one tubing member 1006 of a first gutter 1302.

At block 2504, the method 2500 may inject the liquid solution into a first end of at least one trough supported by a first support portion attached to a base of the first gutter, the liquid solution injected by at least one tubing member removably attached to a cover of the first gutter. For instance, as described herein, the nutrient module 1316 may be configured to inject the liquid solution 1304 into a first end (e.g., end portion 1204) of at least one growing trough 1202 supported by a first support portion (e.g., support portion 1104) attached to a base 1112 of the first gutter (e.g., gutter 1302), the liquid solution injected by at least one tubing member 1006 removably attached to a cover 1106 of the first gutter 1302.

At block 2506, the method 2500 may receive the liquid solution at a base of a second gutter from a second end of the at least one trough supported by a second support portion attached to the base of the second gutter. For example, as described herein, a base of a second gutter (e.g., gutter 1312) of the gutter assembly 106 disposed on an opposite side of the hydroponic growing system 100 (e.g., as shown in FIG. 1-1), may receive the liquid solution from a second end 1512 of the at least one trough growing 1500 supported by a second support portion attached to the base of the second gutter (e.g., gutter 1312).

Figure 26:
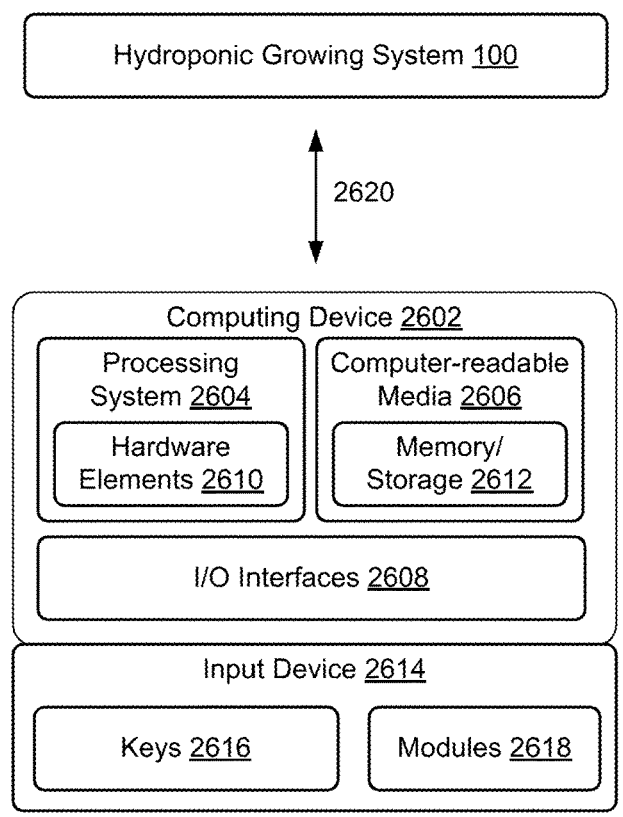
FIG. 26 is a schematic diagram of example components of the computing device of the hydroponic growing system.

FIG. 26 illustrates an example system 2600 that includes the hydroponic growing system 100, as described herein, and an example computing device 2602 that is representative of one or more computing systems and/or devices that may communicate with hydroponic growing system 100 via communication path or channel 2620, which may be wired or wireless. In at least some implementations, the computing device 2602 represents an implementation of or otherwise may include the automation components discussed above. The computing device 2602 may be, for example, be configured to perform any or some of the actions or procedures as described herein, for example, with respect to FIGS. 24 and 25.

The example computing device 2602 as illustrated includes a processing system 2604, one or more computer-readable media 2606, and one or more I/O interface 2608 that are communicatively coupled, one to another. Although not shown, the computing device 2602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2604 is representative of functionality to perform one or more operations using hardware. Accordingly, the processing system 2604 is illustrated as including hardware element 2610 that may be configured as processors, functional blocks, and so forth. This may include implementation in hardware as an application specific integrated circuit or other logic device formed using one or more semiconductors. The hardware elements 2610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 2606 is illustrated as including memory/storage 2612. The memory/storage 2612 represents memory/storage capacity associated with one or more computer-readable media. The memory/storage component 2612 may include volatile media (such as random access memory (RAM)) and/or nonvolatile media (such as read only memory (ROM), Flash memory, optical disks, magnetic disks, and so forth). The memory/storage component 2612 may include fixed media (e.g., RAM, ROM, a fixed hard drive, and so on) as well as removable media (e.g., Flash memory, a removable hard drive, an optical disc, and so forth). The computer-readable media 2606 may be configured in a variety of other ways as further described below.

Input/output interface(s) 2608 are representative of functionality to allow a user to enter commands and information to computing device 2602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2602 may be configured in a variety of ways to support user interaction.

The computing device 2602 is further illustrated as being communicatively and physically coupled to an input device 2614 that is physically and communicatively removable from the computing device 2602. In this way, a variety of different input devices may be coupled to the computing device 2602 having a wide variety of configurations to support a wide variety of functionality. In this example, the input device 2614 includes one or more keys 2616, which may be configured as pressure sensitive keys, mechanically switched keys, and so forth.

The input device 2614 is further illustrated as include one or more modules 2618 that may be configured to support a variety of functionality. The one or more modules 2618, for instance, may be configured to process analog and/or digital signals received from the keys 2616 to determine whether a keystroke was intended, determine whether an input is indicative of resting pressure, support authentication of the input device 2614 for operation with the computing device 2602, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2610 and computer-readable media 2606 are representative of modules, programmable device logic and/or fixed device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2610. The computing device 2602 may be configured to implement particular instructions and/or functions corresponding to the software and/or hardware modules. Accordingly, implementation of a module that is executable by the computing device 2602 as software may be achieved at least partially in hardware, e.g., through use of computer-readable storage media and/or hardware elements 2610 of the processing system 2604. The instructions and/or functions may be executable/operable by one or more articles of manufacture (for example, one or more computing devices 2602 and/or processing systems 2604) to implement techniques, modules, and examples described herein.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

Implementations discussed herein include:

Example 1

A hydroponic growing system, comprising: a base configured to support one or more components; a gutter assembly removably attached the base, the gutter assembly configured to manage flow of a liquid solution to the one or more components of the hydroponic growing system; at least one growing trough movably engaged to the gutter assembly and configured to hold one or more plants, the at least one growing trough movable along a direction perpendicular to a flow direction of the liquid solution in the at least one growing trough; and an automation assembly movably engaged with the at least one growing trough, the automation assembly configured to move the at least one trough from a first position on the gutter assembly to a second position on the gutter assembly.

Example 2

A hydroponic growing system as described in example 1, wherein the gutter assembly includes a first gutter and a second gutter, the first gutter configured to movably engage a first end portion of the at least one growing trough and provide the liquid solution to the at least one growing trough, the second gutter configured to movably engage a second end portion of the at least one growing trough and receive the liquid solution from the at least one growing trough.

Example 3

A hydroponic growing system as described in one or more of examples 1 or 2, wherein the gutter assembly includes at least one tubing member removably attached to the first gutter and configured to provide the liquid solution to the at least one growing trough via the first gutter, the automation component configured to move the at least one growing trough from the first position on the gutter assembly to the second position on the gutter assembly to align with the at least one tubing member located at the second position on the gutter assembly.

Example 4

A hydroponic growing system as described in one or more of examples 1-3, wherein the gutter assembly includes a nutrient module removably attached to the at least one tubing member and configured to pump the liquid solution through the at least one tubing member.

Example 5

A hydroponic growing system as described in one or more of examples 1-4, wherein the gutter assembly includes at least one drain member removably attached to the second gutter and configured to drain the liquid solution received at the second gutter from the at least one growing trough.

Example 6

A hydroponic growing system as described one or more of examples 1-5, wherein the at least one growing trough includes an interior portion configured to support a flow of the liquid solution, a first end portion providing access to the interior portion, and a second end portion opposite the first end portion and providing access to the interior portion.

Example 7

A hydroponic growing system as described in one or more of examples 1-6, wherein the at least one growing trough is arranged at an angle with respect to the base such that the liquid solution flows from the first end portion to the second end portion.

Example 8

A hydroponic growing system as described in one or more of examples 1-7, wherein the automation assembly includes at least one automation component and at least one actuator component, the at least one automation component removably attached to the at least one actuator component triggering the at least one actuator component to automatically move at least one elongated member supporting one or more engagement devices between a first member position to a second member position.

Example 9

A hydroponic growing system as described in one or more of examples 1-8, wherein the automation assembly includes at least one sensor component removably attached to the actuator component, the at least one sensor component configured to cease movement of the actuator component when the actuator component satisfies a movement threshold representing a maximum displacement distance of the actuator component during the movement.

Example 10

A hydroponic growing system as described in one or more of examples 1-9, wherein the actuator component automatically returns to an original state corresponding to the first member position upon the actuator component satisfying the movement threshold.

Example 11

A hydroponic growing system as described in one or more of examples 1-10, wherein the actuator component includes at least one magnet slidably engaged with the actuator component, the at least one sensor module configured to cease movement of the actuator component when the actuator component satisfies the movement threshold based on a location of the at least one magnet with respect to the actuator component.

Example 12

A hydroponic growing system as described in one or more of examples 1-11, wherein moving the at least one elongated member between the first member position and the second member position causes at least one growing trough to move from a first position on a gutter assembly to a second position on the gutter assembly.

Example 13

A hydroponic growing system as described in one or more of examples 1-12, wherein the at least one elongated member includes at least one gap portion component configured to extend a spacing distance between two or more growing troughs, the gap portion component including a retractable element that moves between a first retractable position and a second retractable position.

Example 14

A hydroponic growing system as described in one or more of examples 1-13, wherein moving the at least one elongated member between the first member position and the second member position causes the one or more engagement devices to slidably engage with the at least one growing trough when moving from the first member position to the second member position.

Example 15

A hydroponic growing system as described in one or more of examples 1-14, wherein moving the at least one elongated member between the first member position and the second member position causes the one or more engagement devices to engage with the at least one growing trough to move the at least one growing trough from a first position on a gutter to a second position on the gutter when moving the one or more engagement devices from the second member position to the first member position.

Example 16

A hydroponic growing system as described in one or more of examples 1-15, wherein the at least one automation component receives a triggering indication causing the at least one automation component to trigger the actuator component to move the at least elongated member between the first member position to the second member position.

Example 17

A hydroponic growing system as described in one or more of examples 1-16, wherein the at least one automation component corresponds to a hydraulic pump configured to provide liquid to the at least one actuator component to move the at least elongated member between the first member position to the second member position.

Example 18

A hydroponic growing system as described in one or more of examples 1-17, wherein the at least one automation component corresponds to a pneumatic pump configured to provide gas or air to the at least one actuator component to move the at least elongated member between the first member position to the second member position.

Example 19

A hydroponic growing system as described in one or more of examples 1-18, wherein the actuator component corresponds to at least one of a hydraulic component, a pneumatic component, or an electromechanical actuator.

Example 20

A hydroponic growing system as described in one or more of examples 1-19, further comprising an automated triggering component in communication with or communicatively coupled or connected to the automation assembly, the automation assembly configured to automatically move the at least one growing trough from the first position on the gutter assembly to the second position on the gutter assembly in response to receiving a triggering signal from the automated triggering component.

Example 21

A hydroponic growing system as described in one or more of examples 1-20, further comprising a harvest determination component communicatively coupled to the automated triggering component, the harvest determination component configured to monitor the one or more plants and determine whether to prompt the automated triggering component to transmit the triggering signal to the automation assembly.

Example 22

A hydroponic growing system as described in one or more of examples 1-21, wherein the automated triggering component is further configured to: determine whether the at least one growing trough is removed from the hydroponic growing system; and transmit the triggering signal to the automation assembly to automatically move at least a second growing trough from the first position on the gutter assembly to the second position on the gutter assembly based on a determination that the at least one growing trough is removed from the hydroponic growing system.

Example 23

An automation assembly, comprising: an actuator component configured to move at least one elongated member supporting one or more engagement devices between a first member position and a second member position; and an automation component removably attached to the actuator component, the automation component configured to trigger the actuator component to move the at least one elongated member between the first member position and the second member position.

Example 24

An automation assembly as described in example 23, further comprising at least one sensor component removably attached to the actuator component, the at least one sensor component configured to cease movement of the actuator component when the actuator component satisfies a movement threshold representing a maximum displacement distance of the actuator component during the movement.

Example 25

An automation assembly as described in examples 23 or 24, wherein the actuator component automatically returns to an original state corresponding to the first member position upon the actuator component satisfying the movement threshold.

Example 26

An automation assembly as described in examples 23-25, wherein the actuator component includes at least one magnetic element slidably engaged with the actuator component, the at least one sensor component configured to cease movement of the actuator component when the actuator component satisfies the movement threshold based on a location of the at least one magnet with respect to the actuator component.

Example 27

An automation assembly as described in examples 23-26, wherein moving the at least one elongated member between the first member position and the second member position causes at least one growing trough to move from a first position on a gutter to a second position on the gutter.

Example 28

An automation assembly as described in examples 23-27, wherein the at least one elongated member includes at least one gap portion component configured to extend a spacing distance between two or more growing troughs, the gap portion component including a retractable element that moves between a first retractable position and a second retractable position.

Example 29

An automation assembly as described in examples 23-28, wherein moving the at least one elongated member between the first member position and the second member position causes the one or more engagement devices to slidably engage with the at least one growing trough when moving from the first member position to the second member position.

Example 30

An automation assembly as described in examples 23-29, wherein moving the at least one elongated member between the first member position and the second member position causes the one or more engagement devices to engage with the at least one growing trough to move the at least one growing trough from a first position on a gutter to a second position on the gutter when moving the one or more engagement devices from the second member position to the first member position.

Example 31

An automation assembly as described in examples 23-30, wherein the at least one automation component receives an indication causing the at least one automation component to trigger the actuator component to move the at least elongated member between the first member position and the second member position.

Example 32

An automation assembly as described in examples 23-31, wherein the at least one automation component corresponds to a hydraulic pump configured to provide liquid to the at least one actuator component to move the at least elongated member between the first member position and the second member position.

Example 33

An automation assembly as described in examples 23-32, wherein the at least one automation component corresponds to a pneumatic pump configured to provide gas to the at least one actuator component to move the at least elongated member between the first member position and the second member position.

Example 34

An automation assembly as described in examples 23-33, wherein the actuator component corresponds to at least one of a hydraulic cylinder, a pneumatic cylinder, or an electro-mechanical actuator.

Example 35

An automation assembly for facilitating movement of at least one growing trough within a hydroponic growing system, comprising: at least one sensing component configured to detect a removal of at least one growing trough from a support portion of a gutter of the hydroponic growing system; an actuator component configured to move at least one elongated member supporting one or more engagement devices between a first member position and a second member position; and an automation component removably attached to the actuator component, the automation component configured to cause the actuator component to move the at least elongated member between the first member position and the second member position in response to detecting the removal of the at least one growing trough from the support portion of the gutter.

Example 36

An automation assembly as described in example 35, wherein moving the at least one elongated member between the first member position and the second member position causes the one or more engagement devices to slidably engage with the at least one growing trough when moving from the first member position to the second member position.

Example 37

An automation assembly as described in examples 35 or 36, wherein moving the at least one elongated member between the first member position and the second member position causes the one or more engagement devices member to engage with the at least one growing trough to move the at least one growing trough from a first position on a gutter to a second position on the gutter when moving the one or more engagement devices member from the second member position to the first member position.

Example 38

An automation assembly as described in examples 35-37, wherein the at least one automation component corresponds to a hydraulic pump configured to provide liquid to the at least one actuator component to move the at least elongated member between the first member position and to the second member position.

Example 39

An automation assembly as described in examples 35-38, wherein the at least one automation component corresponds to a pneumatic pump configured to provide gas to the at least one actuator component to move the at least elongated member between the first member position and to the second member position.

Example 40

An automation assembly as described in examples 35-39, wherein the actuator component corresponds to at least one of a hydraulic cylinder, a pneumatic cylinder, or an electro-mechanical actuator.

Example 41

A method of moving at least one trough in a hydroponic growing system, comprising: triggering, by an automation component, an actuator component to move at least one elongated member of the hydroponic growing system between a first member position and a second member position, the at least one elongated member supporting one or more engagement devices configured to engage with the at least one growing trough; and moving, by an actuator component, the at least one elongated member between the first member position and the second member position.

Example 42

A method as described in example 41, further comprising receiving, from at least one detection component, an indication representing a removal of the at least one growing trough from a support portion of a gutter of the hydroponic growing system, wherein triggering the actuator component to move the at least one elongated member between the first member position and the second member position includes triggering the actuator component in response to receiving the indication representing the removal of the at least one growing trough.

Example 43

A gutter, comprising: a base including an interior portion configured to retain a liquid solution; a support portion attached to the base and configured to provide support for at least one growing trough; and a cover attached to the base and configured to minimize light exposure into the interior portion and at an end portion of the at least one growing trough.

Example 44

A gutter as described in example 43, further comprising at least one tubing member removably attached to the gutter and configured to provide the liquid solution to the at least one growing trough.

Example 45

A gutter as described in examples 43 or 44, wherein the cover includes an opening for receiving the at least one tubing member, the at least one tubing member aligned with the at least one growing trough such that the liquid solution is received within an interior portion of the at least one growing trough.

Example 46

A gutter as described in examples 43-45, wherein the base is further configured to capture the liquid solution that flows from the end portion of the at least one growing trough.

Example 47

A gutter as described in examples 43-46, further comprising a nutrient module removably attached to the at least one tubing member and configured to pump the water solution through the at least one tubing member to the at least one growing trough.

Example 48

A gutter as described in examples 43-47, wherein the gutter is disposed or configured at an angle with respect to a horizontal axis.

Example 49

A gutter as described in examples 43-48, wherein the support portion permits or supports the growing trough to traverse or move in a horizontal direction with respect to the base.

Example 50

A gutter as described in examples 43-49, her comprising at least one drain member removably attached to the base and configured to drain the liquid solution flowing to the base from the at least one growing trough.

Example 51

A gutter as described in examples 43-50, further comprising a cover plate located at one or both ends of the gutter and configured to retain the liquid solution within the interior portion.

Example 52

A gutter as described in examples 43-51, wherein the support portion is attached to or formed at a first side of the base opposite a second side of the base including the cover.

Example 53

A gutter as described in examples 43-52, further comprising two or more tubing members removably attached to the gutter, wherein each tubing member is separated by a distinct distance with respect to another tubing member.

Example 53

A gutter assembly, comprising: a first gutter disposed at a first end of a growing system, the first gutter including: a first base including an interior portion and configured to retain a liquid solution; a first support portion attached to the base and configured to provide support for a first end of at least one growing trough; and a first cover attached to the base and configured to minimize light exposure into the interior portion and at the first end portion of the at least one growing trough; and a second gutter disposed at a second end opposite the first end of the growing system, the second gutter including: a second base including an interior portion and configured to retain a liquid solution; a second support portion attached to the base and configured to provide support for a second end of at least one growing trough; and a second cover attached to the base and configured to minimize light exposure into the interior portion and at the second end portion of the at least one growing trough.

Example 54

A gutter assembly as described in example 53, wherein the first gutter further includes at least one tubing member removably attached to the first cover and configured to provide the liquid solution to the first end of at least one growing trough.

Example 55

A gutter assembly as described in examples 53 or 54, wherein the second base of the second gutter is configured to receive the liquid solution exiting from the at least one trough.

Example 56

A gutter assembly as described in examples 53-55, wherein the first gutter includes a nutrient module removably attached to the at least one tubing member and configured to pump the liquid solution through the at least one tubing member to the at least one growing trough.

Example 57

A gutter assembly as described in examples 53-56, wherein at least one of the first gutter or second gutter is disposed at an angle with respect to a horizontal axis.

Example 58

A gutter assembly as described in examples 53-57, wherein the growing trough traverses along the first support portion and the second support portion in a horizontal direction with respect to the first base and the second base.

Example 59

A gutter assembly as described in examples 53-58, wherein the second gutter includes at least one drain member removably attached to the base and configured to drain the liquid solution flowing to the base from the at least one growing trough.

Example 60

A gutter assembly as described in examples 53-59, wherein the first support portion is attached to a first side of the first base opposite a second side of the first base including the first cover, and wherein the second support portion is attached to a first side of the second base opposite a second side of the second base including the second cover.

Example 61

A method of managing flow of a liquid solution in a growing system, comprising: injecting the liquid solution into a first end of at least one trough supported by a first support portion attached to a base of a first gutter, the liquid solution injected by at least one tubing member removably attached to a cover of the first gutter; and receiving the liquid solution at a base of a second gutter from a second end of the at least one trough supported by a second support portion attached to the base of the second gutter.

Example 62

A growing trough, comprising: a base configured to provide support; a cover portion connected to the base and including one or more openings configured to hold at least a plant, the cover portion and the base forming an interior portion configured to support a flow of liquid solution; a first end portion of the base providing access to the interior portion; and a second end portion of the base opposite the first end portion and providing access to the interior portion.

Example 63

A growing trough as described in example 62, wherein one of the first end portion or the second end portion receives the liquid solution such that the liquid solution flows within the interior portion towards an other one of the first end portion or the second end portion.

Example 64

A growing trough as described in examples 62 or 63, wherein the growing trough is arranged at an angle with respect to a support structure engaged with the base such that the liquid solution flows from one of the first end portion or the second end portion to an other of the first end portion or the second end portion.

Example 65

A growing trough as described in examples 62-64, wherein the support structure corresponds to at least one gutter assembly.

Example 66

A growing trough as described in examples 62-65, wherein the support structure includes a first gutter of a gutter assembly moveably engaged with the first end portion and a second gutter of the gutter assembly moveably engaged with the second end portion.

Example 67

A growing trough as described in examples 62-66, wherein the liquid solution exits from at least one of the first end portion into the first gutter assembly or the second end portion into the second gutter assembly.

Example 68

A growing trough as described in examples 62-67, wherein a bottom portion of the base is configured to slide along the support structure in a direction perpendicular to a flow direction of the liquid solution within the interior portion.

Example 69

A growing trough as described in examples 62-68, wherein a bottom portion of the interior includes at least one ridge configured to distribute the flow of the liquid solution.

Example 70

A growing trough as described in examples 62-69, wherein the at least one ridge extends from the opening of the first end portion to the opening of the second end portion.

Example 71

A growing trough as described in examples 62-70, wherein the growing trough is movable along a direction perpendicular to a flow direction of the liquid solution within the interior portion.

Example 72

A growing trough as described in examples 62-71, wherein the opening of the first end portion and the second end portion is perpendicular or on a different plane with respect to the one or more openings of the cover portion.

Example 73

A growing trough as described in examples 62-72, wherein the interior portion corresponds to a hollow interior portion.

Example 74

A growing trough as described in examples 62-73, wherein the one or more openings provide access to the interior portion.

Example 75

A growing trough as described in examples 62-74, wherein each of the one or more openings include a distinct or identical geometrical shape.

Example 76

A growing trough as described in examples 62-75, wherein the base includes at least two elongated support members each located at opposite edges of the base.

Example 77

A growing trough as described in examples 62-76, wherein one of the at least two elongated support members is configured to engage at least one engagement device moving between a first position to a second position, the at least one engagement device configured to move the growing trough.

Example 78

A growing trough as described in examples 62-77, wherein the contact occurs when the at least one engagement device moves from a first position to a second position, wherein the growing trough maintains a position during the contact.

Example 79

A growing trough as described in examples 62-78, wherein the contact occurs when the at least one engagement device moves from the second position toward the first position, wherein the growing trough moves in a direction of the first position.

Example 80

A growing trough, comprising: a base configured to provide support; a top portion connected to the base and including one or more openings each configured to receive at least one soil pod, the top portion and the base forming a hollow interior portion supporting a flow of water solution and including at least a portion of the at least one soil pod; a first end portion of the base providing access to the hollow interior portion; and a second end portion of the base opposite the first end portion and providing access to the hollow interior portion.

Example 81

A growing trough, comprising: a base configured to provide support; a cover portion connected to the base and including at least one opening configured to receive and hold at least one plant, the cover portion and the base forming an interior portion permitting flow of a liquid solution and including at least a portion of the at least one plant within the interior portion; a first end portion of the base providing access to the interior portion; and a second end portion of the base opposite the first end portion and providing access to the interior portion.

Example 82

An engagement device, comprising: a base configured to rotate about an axis, a first portion of the base including a pivot member configured to engage with a securing component to rotate the base about the axis; a second portion of the base weighted greater than the first portion of the base; and a capture member extending from the base, the capture member configured to engage with at least one trough during at least one of two movement events.

Example 83

An engagement device as described in example 82, wherein the at least two movement events includes moving the device in a first direction causing the capture member to slide along or underneath a base of the at least one trough, the sliding of the capture member causing the pivot member to rotate as the capture member slidably contacts the base portion of the at least one trough.

Example 84

An engagement device as described in examples 82 or 83, wherein rotating the pivot member causes the first portion of the base and the capture member to rotate in a downward direction about the axis and causes the second portion to rotate in an upward direction about the axis.

Example 85

An engagement device as described in examples 82-84, wherein rotating in the downward direction does not exceed a downward rotation threshold representing a maximum rotation angle of the engagement device with respect to the axis.

Example 86

An engagement device as described in examples 82-85, wherein the capture member slides along the base portion of the at least one trough while the at least one trough maintains a resting position.

Example 87

An engagement device as described in examples 82-86, wherein the at least two movement events includes moving the device in a second direction causing the capture member to engage a base portion of the at least one trough and apply an engagement force on a base portion of the at least one trough to move the at least one trough from a first position to a second position.

Example 88

An engagement device as described in examples 82-87, wherein the engagement force prevents the pivot member from rotating about the axis.

Example 89

An engagement device as described in examples 82-88, wherein the second portion of the base is configured to maintain a resting position while moving the engagement device in the second direction.

Example 90

An engagement device as described in examples 82-89, wherein the second portion of the base is configured in an elevated position with respect to an elongated member while moving the engagement device in the second direction.

Example 91

An engagement device as described in examples 82-90, wherein the resting position corresponds to a bottom surface of the second portion of the base contacting a surface of the elongated member.

Example 92

An engagement device as described in examples 82-91, wherein the pivot member removably attaches the device to an elongated member via the securing component, and wherein the elongated member is configured to move the engagement device in at least one of a first direction or a second direction opposite the first direction.

Example 93

An engagement device as described in examples 82-92, wherein moving in the first direction includes moving the device from a first position towards the at least one trough located at a second position such that the capture member slides along a base portion of the at least one trough, and wherein moving in the second direction includes moving the device towards the first position such that the capture member engages the base portion of the at least one trough to move the at least one trough towards the second position.

Example 94

An engagement device as described in examples 82-93, wherein the engagement device is configured to sequentially move in the first direction and then the second direction.

Example 95

An apparatus, comprising: an elongated member; at least one engagement device moveably attached to the elongated member, each engagement device including: a base configured to rotate about an axis; a first portion of the base including a pivot member configured to engage with a securing component to rotate the based about the axis; a second portion of the base weighted greater than the first portion of the base; and a capture member extending from the base, the capture member configured to engage with at least one trough during at least one of two movement events.

Example 96

An apparatus as described in example 95, wherein the at least two movement events includes moving the device in a first direction causing the capture member to slide along or underneath a base portion of the at least one trough, the sliding of the capture member causing the pivot member to rotate as the capture member slidably contacts the base portion of the at least one trough.

Example 97

An apparatus as described in examples 95 or 96, wherein the at least two movement events includes moving the device in a second direction causing the capture member to engage a base portion of the at least one trough and apply an engagement force on a base portion of the at least one trough to move the at least one trough from a first position to a second position.

Example 98

An apparatus as described in examples 95-97, wherein the pivot member removably attaches the device to an elongated member via the securing component, and wherein the elongated member is configured to move the device in at least one of a first direction or a second direction opposite the first direction.

Example 99

An apparatus as described in examples 95-98, wherein moving in the first direction includes moving the device from a first position towards the at least one trough located at a second position such that the capture member slides along a base portion of the at least one trough, and wherein moving in the second direction includes moving the device towards the first position such that the capture member engages the base portion of the at least one trough to move the at least one trough towards the second position.

Example 100

An apparatus as described in examples 95-99, wherein the engagement device is configured to sequentially move in the first direction and then the second direction.

Example 101

An apparatus as described in examples 95-100, wherein the second portion of the base is configured to maintain a resting position while moving the engagement device in the second direction.

Example 102

An apparatus as described in examples 95-101, wherein the second portion of the base is configured in an elevated position with respect to an elongated member while moving the engagement device in the second direction.

Example 103

An engagement device, comprising: a base configured to rotate about an axis, a pivot member configured to engage with a securing component to rotate the base about the axis; a first portion of the base having a mass greater than a second portion distinct from the first portion; and a capture member extending from the base, the capture member configured to engage with at least one trough during at least one of two movement events.

What is claimed is:

1. A gutter, comprising:
   a base including a first side wall, a second side wall, and an interior portion configured to retain a liquid solution, wherein the first side wall is opposite the second side wall;
   a support portion attached to the base and extending upward from the first side wall, the support portion configured to removably contact and support at least one growing trough and the support portion including a curved surface covered in a material that permits the at least one growing trough to slidably engage with the support portion such that the at least one growing trough moves in a horizontal direction with respect to the base;
   a cover attached to and extending an entire length of the base, the cover having a first cover portion extending upward from the second side wall and a second cover portion extending over at least a portion of the base, wherein the cover is configured to minimize light exposure both into the interior portion and at an end portion of the at least one growing trough; and
   a stopper directly attached to the first cover portion and extending towards the interior portion such that the second cover portion extends above the stopper, the stopper configured to maintain a gap between the cover and the at least one growing trough.

2. The gutter of claim 1, further comprising at least one tubing member removably attached to the gutter and configured to provide the liquid solution to the at least one growing trough.

3. The gutter of claim 2, wherein the cover includes an opening for receiving the at least one tubing member, the at least one tubing member aligned with the at least one growing trough such that the liquid solution is received within an interior portion of the at least one growing trough.

4. The gutter of claim 2, further comprising a nutrient module removably attached to the at least one tubing member and configured to pump the liquid solution through the at least one tubing member to the at least one growing trough.

5. The gutter of claim 1, wherein the interior portion of the base is further configured to capture the liquid solution that flows from the end portion of the at least one growing trough.

6. The gutter of claim 1, wherein the gutter is configured at an angle with respect to a horizontal axis.

7. The gutter of claim 1, further comprising at least one drain member removably attached to the base and configured to drain the liquid solution flowing to the base from the at least one growing trough.

8. The gutter of claim 1, further comprising a cover plate located at one or both ends of the gutter and configured to retain the liquid solution within the interior portion.

9. The gutter of claim 1, further comprising two or more tubing members removably attached to the gutter, wherein each tubing member is separated by a distinct separation distance with respect to another tubing member of the two or more tubing members.

10. The gutter of claim 9, wherein the two or more tubing members include a first group of tubing members separated from each other at a first separation distance and a second group of tubing members separated from each other at a second separation distance, the first distance differing from the second distance.

11. The gutter of claim 9, wherein the distinct separation distance between each tubing member of the two or more tubing members increases towards a harvest direction from a first end of the gutter to a second end of the gutter, the first end of the gutter being opposite the second end of the gutter.

12. The gutter of claim 1, wherein the stopper includes a covered portion comprised of a material that permits the at least one growing trough to slidably engage with the stopper.

13. The gutter of claim 12, wherein the stopper and the covered portion are curved.

14. The gutter of claim 1, wherein the base includes a top cover attached to both the first side wall and the second side wall, the top cover configured to prevent entry of material or substances not including the liquid solution from entering the interior portion of the base.

15. A gutter assembly, comprising:
a first gutter disposed at a first end of a growing system, the first gutter including:
a first base including a first side wall, a second side wall, and an interior portion and configured to retain a liquid solution, wherein the first side wall is opposite the second side wall;
a first support portion attached to the base and extending upward from the first side wall, the first support portion configured to removably contact and support a first end of at least one growing trough and the first support portion including a curved surface covered in a material that permits the at least one growing trough to slidably engage with the first support portion such that the at least one growing trough moves in a horizontal direction with respect to the first base;
a first cover attached to and extending an entire length of the first base, the first cover having a first cover portion extending upward from the second side wall and a second cover portion extending over at least a portion of the first base, wherein the first cover is configured to minimize light exposure both into the interior portion and at the first end portion of the at least one growing trough; and
a first stopper directly attached to the first cover portion and extending towards the interior portion such that the second cover portion extends above the first stopper, the first stopper configured to maintain a gap between the first cover and the at least one growing trough; and
a second gutter disposed at a second end opposite the first end of the growing system, the second gutter including:
a second base including a first side wall, a second side wall, and an interior portion and configured to retain a liquid solution, wherein the first side wall of the second base is opposite the second side wall of the second base;
a second support portion attached to the second base and extending upward from the first side wall of the second base, the second support portion configured to removably contact and support a second end of the at least one growing trough and the second support portion including a curved surface covered in a material that permits the at least one growing trough to slidably engage with the second support portion such that the at least one growing trough moves in a horizontal direction with respect to the second base;
a second cover attached to and extending an entire length of the second base, the second cover having a first cover portion extending upward from the second side wall of the second base and a second cover portion extending over at least a portion of the second base, wherein the second cover is configured to minimize light exposure both into the interior portion of the second base and at the second end portion of the at least one growing trough; and
a second stopper directly attached to the first cover portion of the second cover and extending towards the interior portion of the second base such that the second cover portion of the second cover extends above the second stopper, the second stopper configured to maintain a gap between the second cover and the at least one growing trough.

16. The gutter assembly of claim 15, wherein the first gutter further includes at least one tubing member removably attached to the first cover and configured to provide the liquid solution to the first end of the at least one growing trough.

17. The gutter assembly of claim 16, wherein the second base of the second gutter is configured to receive the liquid solution exiting from the at least one growing trough.

18. The gutter assembly of claim 16, wherein the first gutter includes a nutrient module removably attached to the at least one tubing member and configured to pump the liquid solution through the at least one tubing member to the at least one growing trough.

19. The gutter assembly of claim 15, wherein at least one of the first gutter or the second gutter is disposed at an angle with respect to a horizontal axis.

20. The gutter assembly of claim 15, wherein the second gutter includes at least one drain member removably attached to the second base and configured to drain the liquid solution flowing to the second base from the at least one growing trough.

* * * * *